United States Patent [19]

VanderDrift

[11] Patent Number: 5,455,945
[45] Date of Patent: Oct. 3, 1995

[54] SYSTEM AND METHOD FOR DYNAMICALLY DISPLAYING ENTERING, AND UPDATING DATA FROM A DATABASE

[76] Inventor: Richard VanderDrift, 130 Magnolia Ave., Larkspur, Calif. 94939

[21] Appl. No.: 63,905

[22] Filed: May 19, 1993

[51] Int. Cl.⁶ .................................................. G06F 17/30
[52] U.S. Cl. ................... 395/600; 364/974.1; 364/974.6; 364/963; 364/DIG. 2
[58] Field of Search .............................................. 395/600

[56] References Cited

U.S. PATENT DOCUMENTS

| | | | |
|---|---|---|---|
| 4,805,099 | 2/1989 | Huber | 364/300 |
| 4,894,771 | 1/1990 | Kunii et al. | 395/600 |
| 4,918,593 | 4/1990 | Huber | 364/200 |
| 4,939,689 | 7/1990 | Davis et al. | 364/900 |
| 4,985,863 | 1/1991 | Fujisawa et al. | 364/900 |
| 5,025,396 | 6/1991 | Parks et al. | 364/518 |
| 5,040,132 | 8/1991 | Schuricht et al. | 364/523 |
| 5,047,918 | 9/1991 | Schwartz et al. | 395/600 |
| 5,355,472 | 10/1994 | Lewis | 395/600 |
| 5,369,761 | 11/1994 | Conley et al. | 395/600 |

FOREIGN PATENT DOCUMENTS

| | | | |
|---|---|---|---|
| 0316957 | 5/1989 | European Pat. Off. | G06F 15/20 |
| 9000776 | 1/1990 | WIPO | G06F 15/40 |

OTHER PUBLICATIONS

N. Yankelovich et al. "Reading and Writing the Electronic Book" IEEE Computer, pp. 15–30, 1985.
J. Conklin "Hypertext: An Introduction and Survey" IEEE Computer, pp. 17–41, 1987.
N. Yankelovich et al. "Intermedia: The Concept and the Construction of a Seamless Information Environment" IEEE Computer, pp. 81–95, 1988.
Michael Stonebraker, "Future Trends in Data Base Systems," Department of Electrical Engineering and Computer Sciences, University of California Berkeley, pp. 1–2, 7–11, No. Date.
C. J. Date, "An Introduction To Database Systems," vol. 1, Fifth Edition, Addison Wesley, Feb., 1991, pp. 683–685, 700–704.

*Primary Examiner*—Thomas G. Black
*Assistant Examiner*—Peter Y. Wang
*Attorney, Agent, or Firm*—Greg T. Sueoka

[57] ABSTRACT

A system for extracting and dynamically displaying data from a database comprises a central processing unit, an input device, a program memory, a display device, a printer, mass storage, and a network. The program memory comprises management records for retrieving and updating information in the database, and dynamic documents for presenting database information to the user. The information from one or more underlying commercial databases is structured and reorganized into management records. The management records interact with the dynamic documents to reformat the data into the form desired by the user. Both the management records and dynamic documents are also used to execute operations on the data in the database such as sorts, filters, and logical and mathematical functions. The present invention also include a plurality of unique methods for extracting and updating data in the underlying databases. These methods include: a method for defining a point of view for viewing the data, a method for generating the language codes of production databases for extracting the data from the underlying databases, a method for assembling the data extracted from the underlying database into management records, a method for reorganizing the data in management records into any form of dynamic documents, and methods for displaying and printing dynamic documents.

33 Claims, 43 Drawing Sheets

Figure 19A

Create A Management Record & Default Dynamic Document

| Dynamic Document & Management Record Definition |
|---|

File  Edit  Navigat  Pane  Field  Values  Filter  Funct  Format  Help

Record/ Document...  + - lov  filtr  sort

*Management Record*
*Dynamic Document*
Description
User set

Panes...
| < > ^ v | add OK | cncl | define rcrd | filtr | sort | funct | hook |

| Primary record name | Levl | Pane styl | Positn | Maintain | # rows |
|---|---|---|---|---|---|
|  |  |  |  |  |  |

Fields...
| ^ v | add OK | cncl | funct | filtr | field |

| Rcrd pane | Record | Field | Display | Prompt | Maintain | Default |
|---|---|---|---|---|---|---|
|  |  |  |  |  |  |  |

Fig. 19B
Filter Definition

| Filter Definition | | | | | | | | | |
|---|---|---|---|---|---|---|---|---|---|
| File | Edit | Navigt | Pane | Field | Value | Filtr | Funct | Formt | Help |

| Filters | | |
|---|---|---|
| Name | On? | Description |
|  |  |  |

| Filter Rules | | | | | | | |
|---|---|---|---|---|---|---|---|
| And/Or | ( | Record | Field | Operand | Val/Doc | Group | ) |
|  |  |  |  |  |  |  |  |

Fig. 19C
Sort And Total Definitions

Sort Definition

| File | Edit | Navigt | Pane | Field | Value | Filtr | Funct | Formt | Help |

Sorts...

| Name | On? | Description |
|---|---|---|
| | | |

Sort Rules

| Record Name | Field Name | Sort Level | Ascnd/ Dscend | Header | |
|---|---|---|---|---|---|
| | | | | | |

Group By Rules

| Record Name | Field Name | Operand | |
|---|---|---|---|
| | | | |

Spreadsheet Style Function Definition

Fig. 19E
Function Definition

Filter Definition

File  Edit  Navigt  Pane  Field  Value  Filtr  Funct  Formt  Help

*Dynamic Document...*

Name
Mangement Record
Virtual Dynamic Document
Record
Field

| *Function Steps* | | | | | | |
|---|---|---|---|---|---|---|
| Step # | ( | Action | ) | Param1 | Param2 | Param3 | Param4 |
| | | | | | | | |

Define Hook Between Two Records

Coordinate Windows

SYSTEM AND METHOD FOR DYNAMICALLY DISPLAYING ENTERING, AND UPDATING DATA FROM A DATABASE

BACKGROUND OF THE INVENTION

1. Field of the Invention

The present invention relates generally to systems and methods for interfacing with and using commercial databases. Still more particularly, the present invention relates to systems and methods that allow the user to easily modify the display format, functions, and filters operating upon database information extracted from a plurality of persistent data stores.

2. Description of the Related Art

Databases have long been used by companies to store and analyze various types of information critical to the operation of a company. The source of the information in such databases is data from forms such as invoices and purchase orders. This data is first decomposed into rigid, predetermined structures that are easy for computers to access such as database tables, files, and objects. Typically, these predetermined structures are organized in a technical manner by computer programmers. The organization of the data in the predetermined structures is driven by the need to efficiently use memory, to maximize the efficiency of operations on the data, and to maintain data integrity. While such a technical point of view of data organization may be ideal for the storing and processing the data, this technical view of the data bears very little resemblance to organization of the data in real world forms from which they were extracted and the format that non-technical users are accustom to encountering. Therefore, it is very difficult for a user unfamiliar with the database's underlying organization structure (e.g., a manager) to understand and manipulate the data. In most cases, the user is forced to learn the underlying structure of the database, which for the business user, has no meaning. In other instances, the business/non-technical user must consult a programmer or other person with knowledge of database to obtain and format the desired information from the database. Thus, the databases presently available remain very difficult for the business person or non-technical user to operate, and there is a need for a system that presents the data in familiar formats that are very pliable.

Another problem with current databases is that each database has its own language that is used to formulate queries, to update records, and to perform functions on the data in the database. For example, there are a number of database programs such as Dbase, Paradox, SQL, and IMS. Each program has different syntax, schemes, and languages for operating the database. The user must specify actions such as sorts and queries in a programming language, a natural language, or a "point and click" version of the language. Moreover, each user must have an understanding of basic programming concepts necessary to use the language of the database. This requires knowing computer programming principles generally, as well as those principles dominant in database programming. A particular problem exists where a company is utilizing one type of database for sales, while utilizing another type of database for manufacturing, since a non-technical business user may be forced to learn two languages and two underlying database structures. Thus, there is a need for a system that eliminates the user's need to understand programming while allowing the user to interact with the database.

Therefore, there is a need for a system that both allows the user to view and update database information in formats to which the user is accustomed, and allows the user to manipulate the data and perform actions without a significant knowledge of databases and their operation.

SUMMARY OF THE INVENTION

The present invention overcomes the limitations and shortcomings of the prior art with a system and methods for dynamically displaying, entering, and updating a persistent data store. The system of the present invention advantageously comprises a central processing unit, an input device, a program memory, a display device, a printer, mass storage, and a network. The program memory preferably comprises management records for retrieving and updating information in the database or file, and dynamic documents for presenting database information to the user. The information from one or more underlying commercial databases is structured and reorganized into management records. Each of the management records includes references to specific components of the underlying database stored as primary records. These management records interact with the dynamic documents to reformat the data into the form desired by the user. Both the management records and dynamic documents are also used to execute operations on the data in the database such as sorts, filters, and logical and mathematical functions. The dynamic documents present information to the user in the format desired. The dynamic documents are easy for the user to modify and provide a user interface for extracting or updating information in the database that requires little understanding of the database.

The present invention also include a plurality of unique methods for extracting and updating data and management records used to access underlying databases according to the present invention. These methods include: a method for defining a point of view for viewing the data, a method for generating the language codes of production databases for extracting the data from the underlying databases, a method for assembling the data extracted from the underlying database into management records, a method for reorganizing the data in management records into any form of dynamic documents, and methods for displaying and printing dynamic documents. The present invention also includes other methods for generating the codes to update the underlying source databases and other databases to reflect changes input through dynamic documents.

BRIEF DESCRIPTION OF THE DRAWINGS

FIGS. 19A through 19G are exemplary embodiments of windows for dynamic documents.

DETAILED DESCRIPTION OF THE PREFERRED EMBODIMENT

Figure 1:
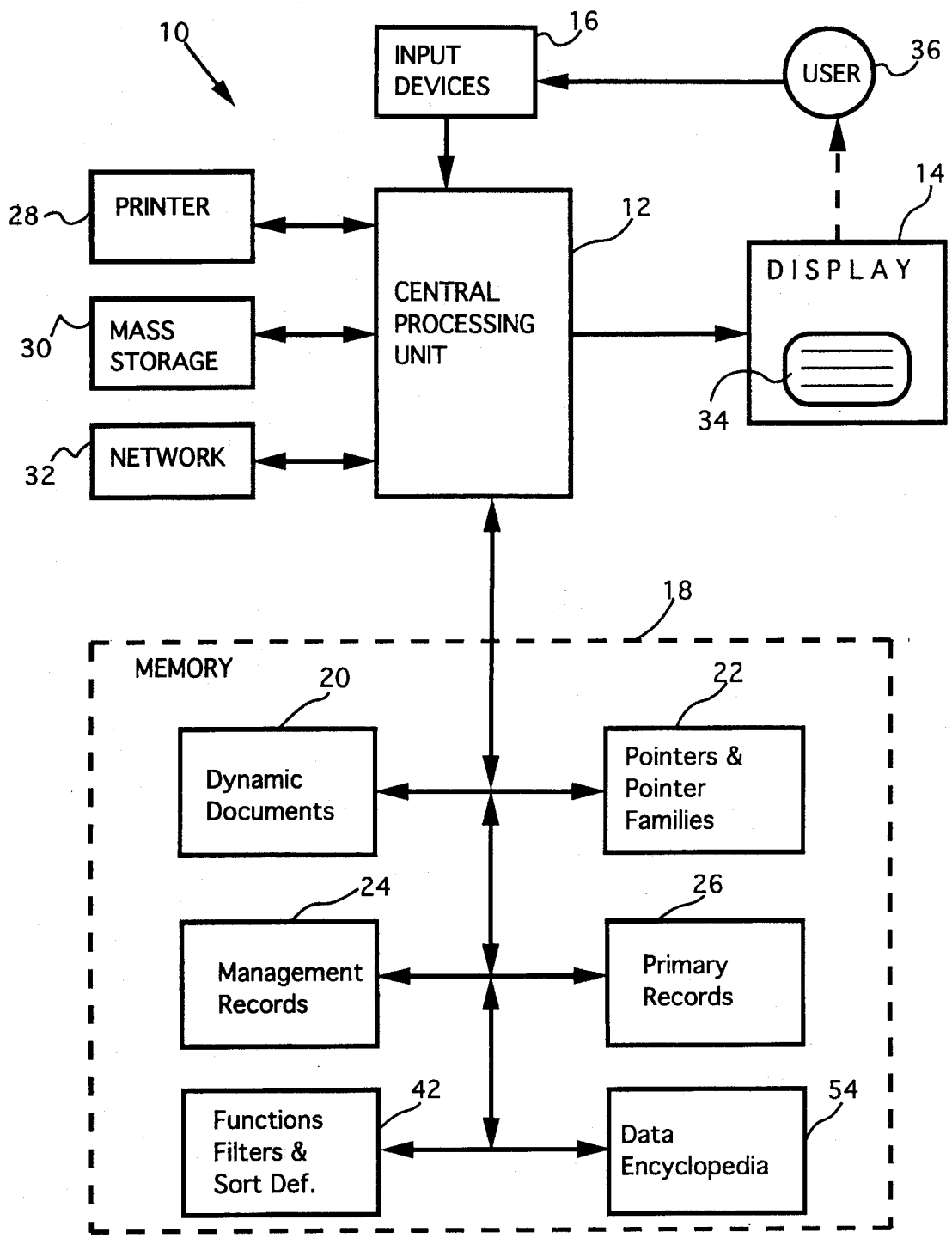
FIG. 1 is a block diagram of a preferred embodiment of the system for extracting and dynamically displaying data in accordance with the present invention.

In accordance with the present invention, a system 10 for dynamically displaying, entering, and updating a database or file is shown in FIG. 1. A central processing unit (CPU) 12 connects with a display device 14, an input device 16, and a program memory 18. The CPU 12 is also coupled to a printer 28, mass storage 30, and a network 32 in a conventional manner. Underlying or production databases and data stores 38, 40 are stored in mass storage 30 or can be accessed through the network 32. The underlying databases 38, 40 are preferably read into the system and stored as primary records 26 in memory 18. The memory 18 also stores a dynamic document (DD) 20, a management record (MR) 24, pointers & pointer families 22, and functions, filters & sorts 42 along with an operating system. The CPU 12, under the guidance of instructions received from the program memory 18 and from the user through the input device 16, creates management records (MRs) 24 and dynamic documents (DDs) 20, updates the underlying database 38, 40 and displays data on the display device 14. The methods of the present invention preferably extract data from the underlying databases 38, 40, perform functions and filters on the data, and store the extracted data as primary records 26 in the program memory 18. The MRs 24 are then further processed with other routines in memory 18 to be displayed as DDs 20 that include a user interface to display information on the display 14. Those skilled in the art will be aware that various equivalent combinations of devices can achieve the same results when used in accordance with the present invention. For example, while the memory blocks are shown as separate, they can easily comprise different regions of a contiguous space in memory.

Figure 2:
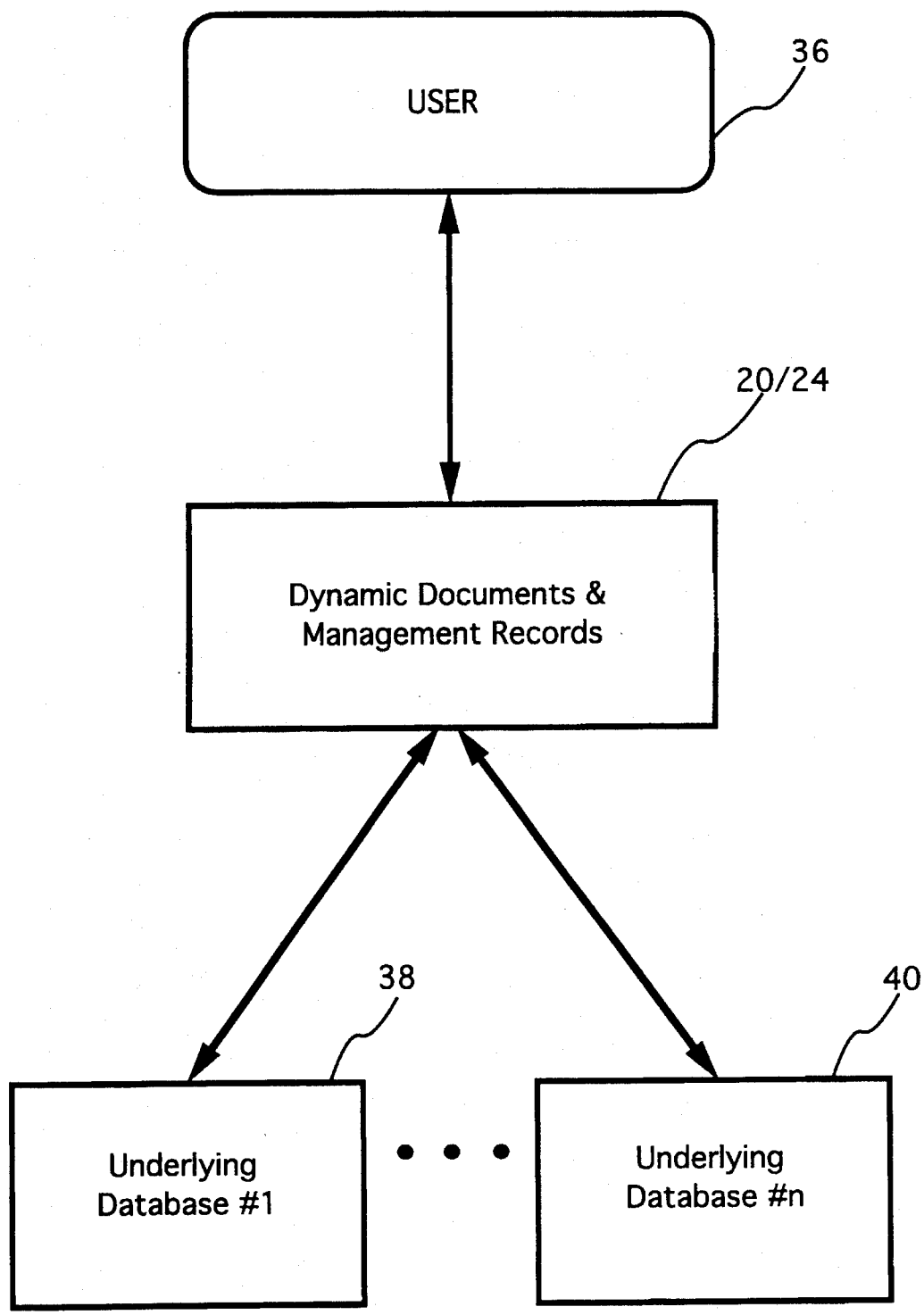
FIG. 2 is a graphical representation illustrating the context in which the system and methods of the present invention operate.

Referring now to FIG. 2, the context in which the system and methods of the present invention operate will be described. As has been noted above, the present invention overcomes the problems associated with presently available underlying source or other production databases 38, 40. In particular, the present invention removes the problems of interfacing with databases 38, 40 by providing DDs 20 and MRs 24. ADD 20 is a mechanism for displaying, manipulating, and printing MRs 20, and for mapping how changes to the MRs 24 should update one or more databases 40 other than the underlying databases 38. The DDs 20 provide user interfaces as well as display and organization rules for displaying the data to the user 36. In the preferred embodiment, a DD 20 has the form of window on the display device 14 with a hierarchy of display panes. (See FIGS. 19A through 19G) Each pane is used to display one or more Management Record Type's (MRT's) Primary Record Types (PRTs). The present invention also includes procedures for entering data changes using DDs 20. As will be described, the process for modifying data with DDs 20 is very simple for the user, and a change entered with a DD 20 automatically updates the MRs 24 to update other related MR's in the underlying source database 38, 40 and any target databases with new information.

The present invention interfaces with the underlying databases 38, 40 by grouping the data stored in the databases 38, 40 into recognizable business objects referred to as "management records" (MRs) 24. Examples of business objects that are modeled as MRs 24 with the present invention include, but are not limited to: invoices, bills of material, purchase orders, price books, forecasts, and fund transactions. The present invention advantageously works in conjunction with underlying databases 38, 40 to reconstitute data stored therein into a structure recognizable by the business person (i.e., management records). The user can define functions (calculations), filters (selection criteria), sorts, and DDs 20 (display and organization rules) over MRs 24. (See Appendix A for an example of a management record definition and other definitions).

Figure 3:
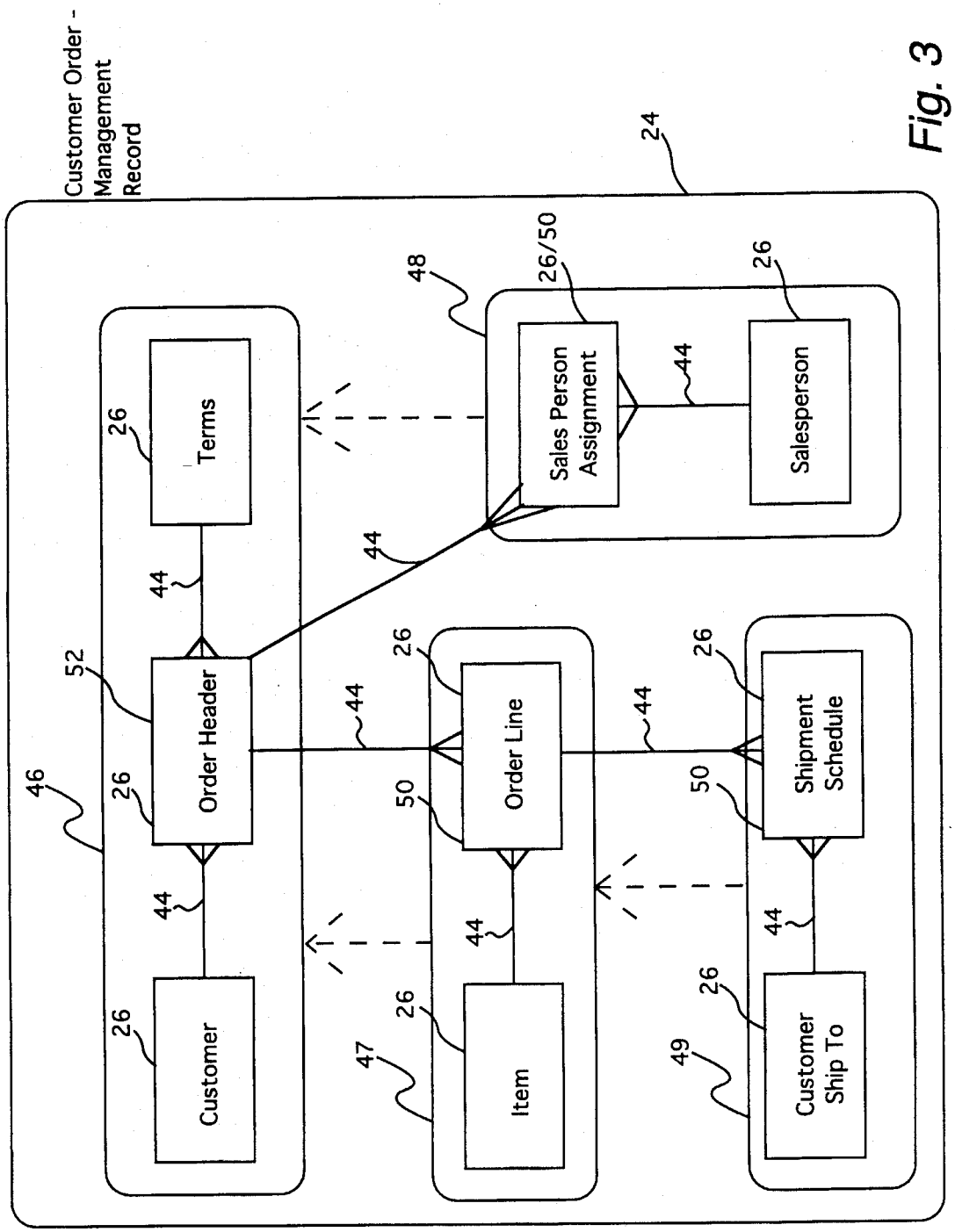
FIG. 3 is a graphical representation of an exemplary embodiment for a management record.
Figure 4A:
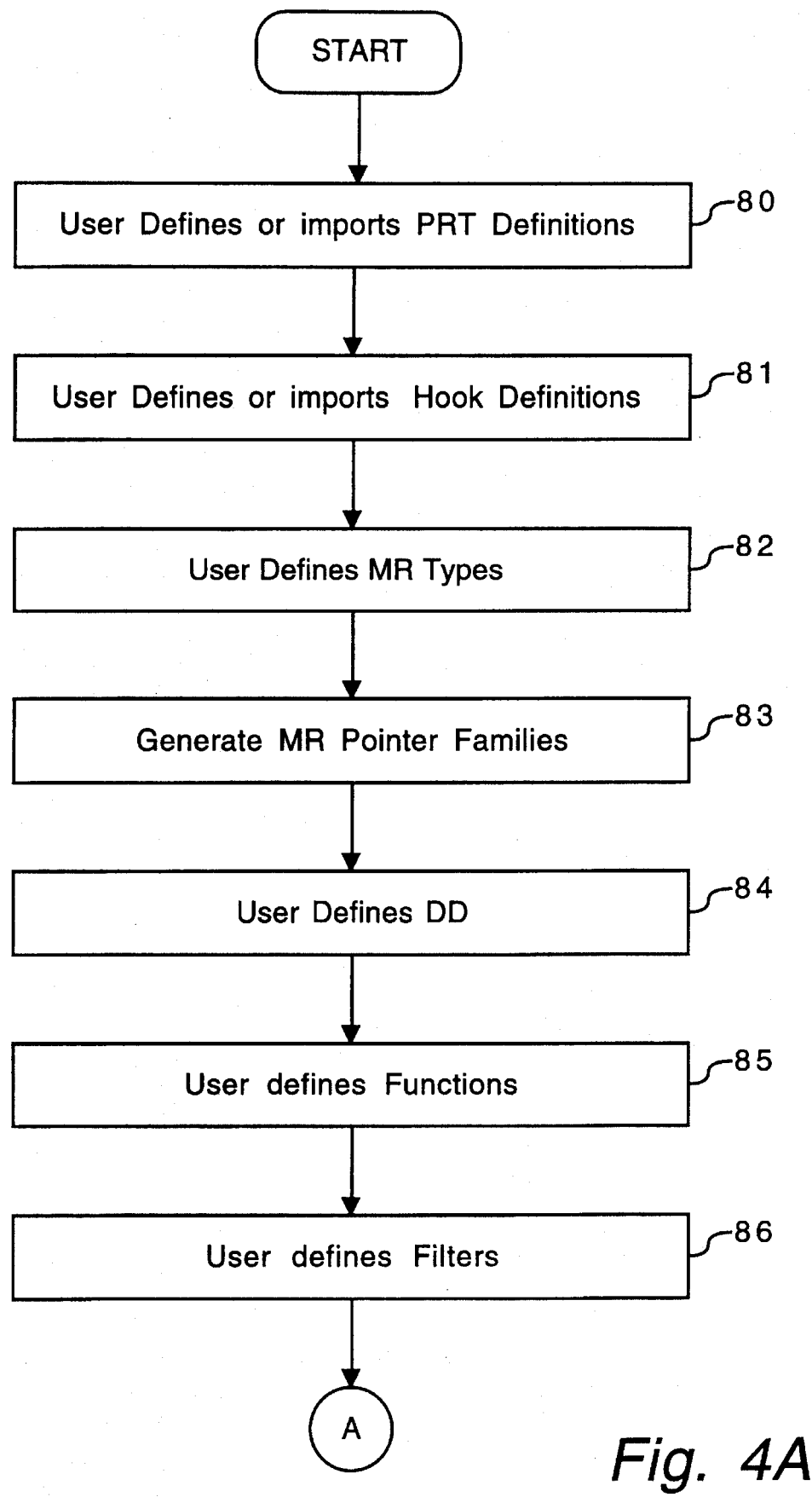
FIGS. 4A, 4B, 4C, 4D, 4E and 4F are a flowchart of an overview of the preferred method for initializing and operating the system in accordance with the methods of present invention.
Figure 4B:
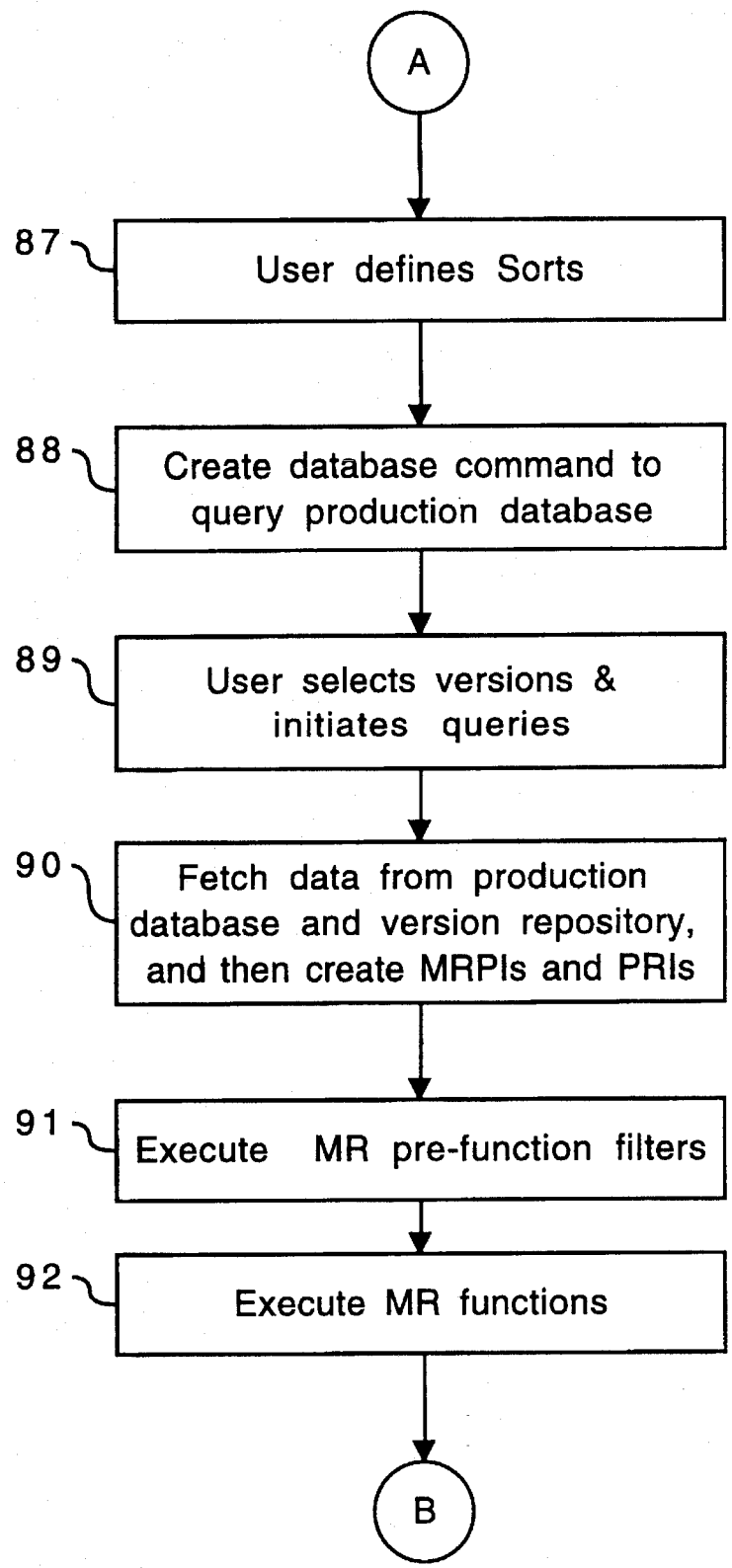
Figure 4C:
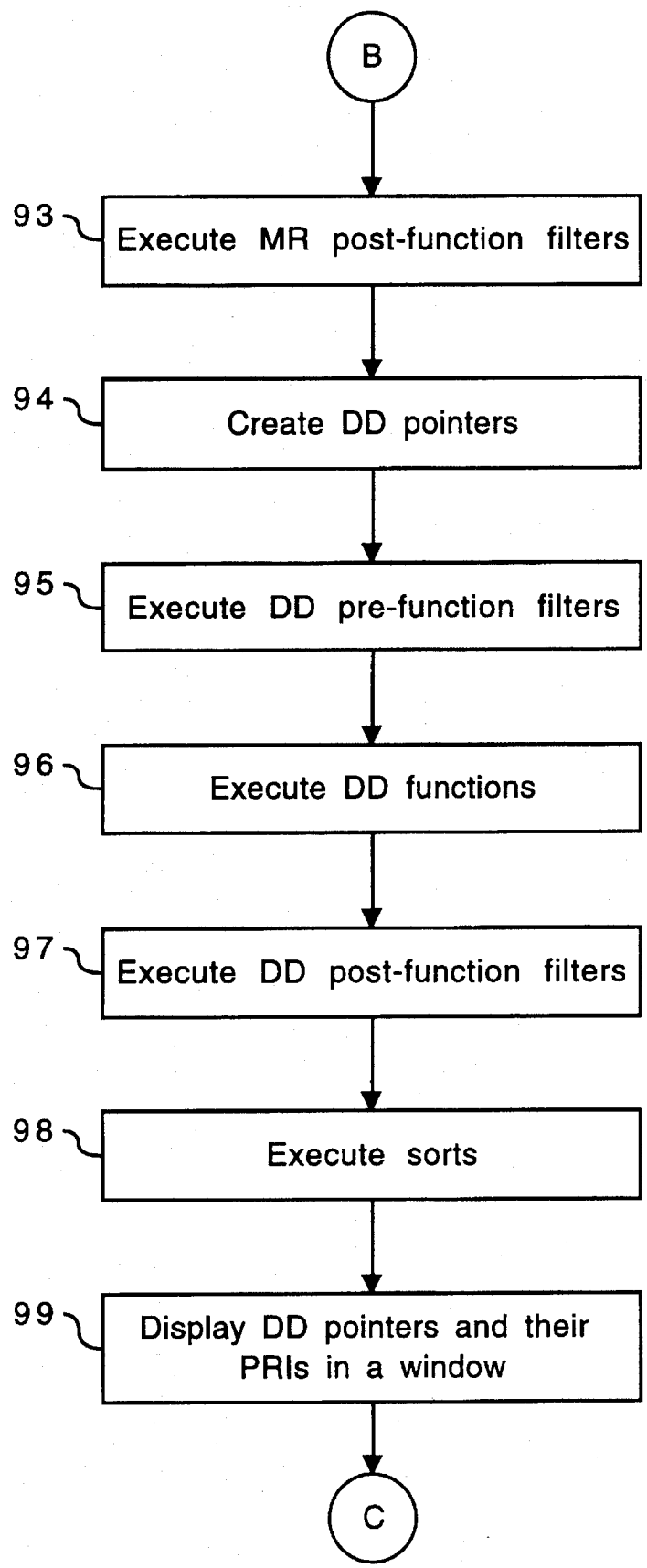
Figure 4D:
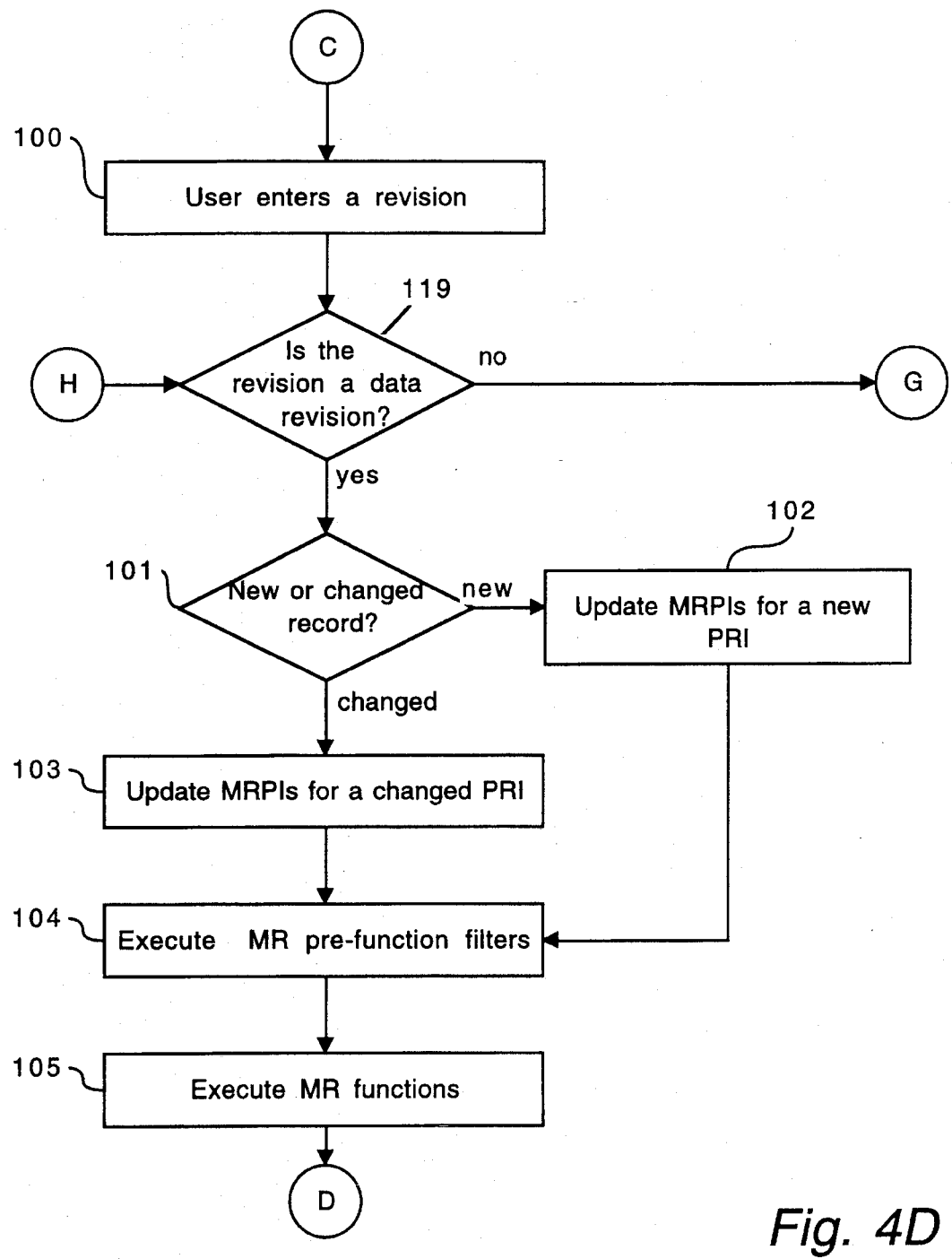
Figure 4E:
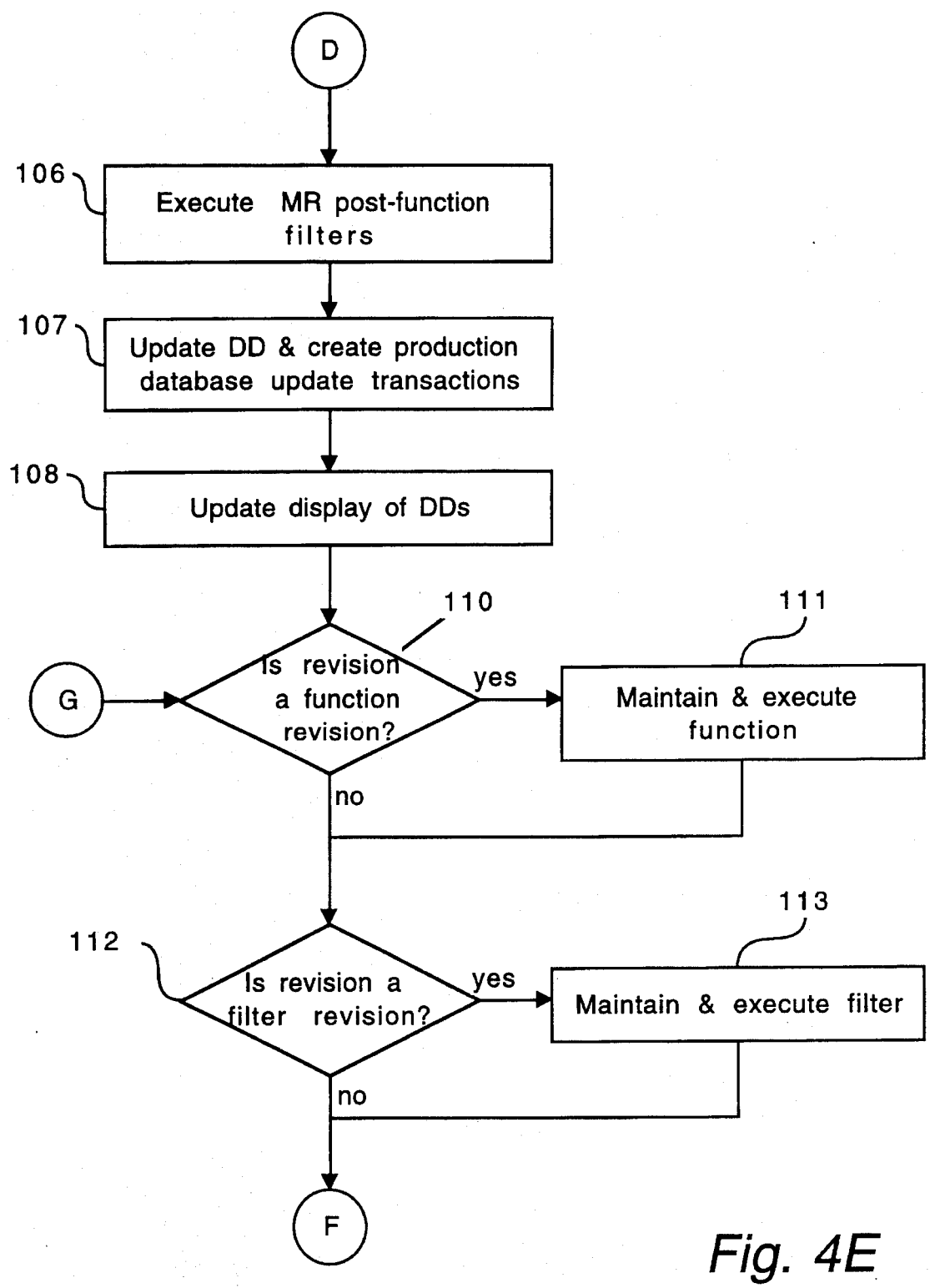
Figure 4F:
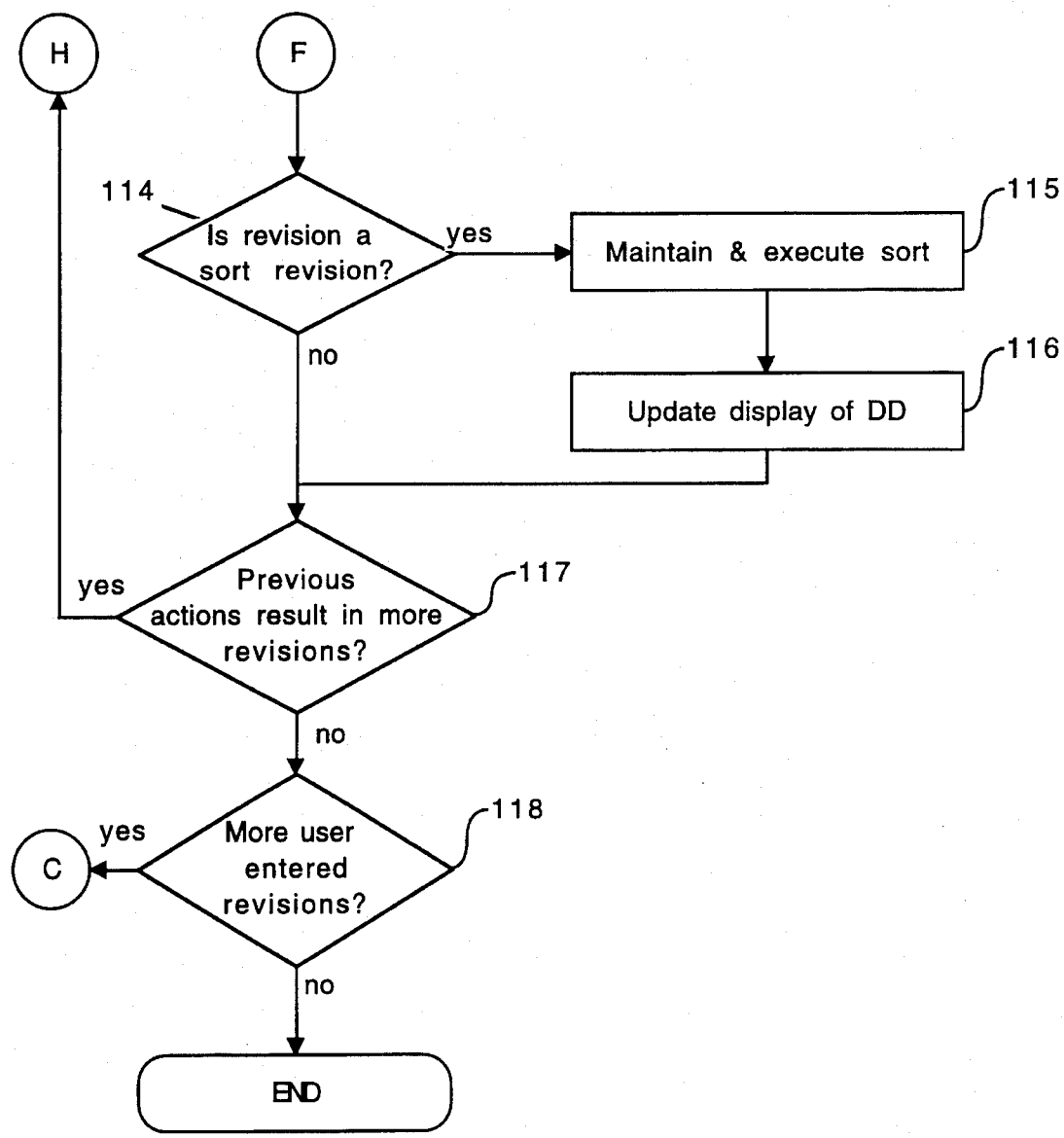

A "management record" (MR) 24 is a user defined collection of "primary records" 26 all of which are "hooked" 44 to each other either directly or indirectly (through another primary record 26 which is in the MR 24). One and only one of the primary records 26 uniquely defines a single instance of a MR 24. In other words, each instance of this primary record is part of a different MR. Each MR can have only one instance of this primary record, but possibly many instances of the primary record could exist in other MRs. In the example of FIG. 3, the Order Header is the primary record that uniquely defines the MR 24.

A primary record 26 is the source of data for management records 24, and includes any conventional storage methods used by underlying databases 38, 40 such as files, objects, tables, arrays, and views.

A "hook" or the term "hooked" refers to any of the methods used in underlying databases 38, 40 for linking or showing relationships between data stored in different primary records 26. Such hooks 44 include pointers and foreign keys, and the present invention uses which ever form is used by the underlying commercial database 38, 40. A hook 44 typically provides a one to many relationship between a parent record and a child record. As shown in FIG. 3, the hooks 44 are represented by lines where a single occurrence of a connecting line attaches to the parent, and multiple occurrence of the connecting line attach to child. A hook not only specifies which parts of each Primary Record Type (PRT) point to each other, but also specifies the number of hooks 44 any particular instance of one PRT can and must have with the instances of the other PRT that are a part of the hook 44. (See Record Layouts in the Appendix A.)

It should be understood that management records 24 are different than a views in a relational database. A relational view "joins" multiple tables into a single virtual table. For example, a view constructed from a customer table with say 100 rows, a customer contact table with an average of 5 contacts per customer, and a customer sites table with an average of 3 sites per customer will contain 1500 rows (100×5×3). Each row will have the columns from all three tables. In stark contrast, management records 24 are not a merger of individual table rows into a new table. Each management record 24 is the appropriate number of row(s) from each of the tables (100 in the above example). Thus, management records 24 are drastically smaller in size than views. Moreover, management records 24 can be defined by a user and created dynamically using hooks 44. Once created, the changes to management records 24 can be used to change not only the management record 24, but also the underlying database 38, 40 tables. This is not possible with conventional relational database views that are the joins of multiple tables.

Management records 24 also have significant advantages over conventional hierarchical databases hierarchies and object database composite objects. Hierarchies are predetermined, typically by a system administrator, and the pointers between the individual records are manually maintained by the users. Family trees (which do not show spouses) are examples of hierarchies. The relationships are rigid and only movement from parent to child and visa versa is permitted. Any new hierarchy is empty until parent and child records are explicitly linked to each other either manually or by writing a custom program to build the links. Management records 24, on the other hand, automatically populate a hierarchy of primary record pointers using hooks according to definitions set by the user. Also, unlike in a hierarchical database where relationships are rigid, a primary record 26 which is a parent in a specific hook can be the child in a management record 24. For example in FIG. 3, customer order header is typically a child record type to a customer in a hierarchical or object oriented database. With the present invention, the user defines a customer order management record 24 that includes both the customer and customer order header as primary records 26. Since the customer order header would be the unique identifying record type for this management record 24, it is also the parent for the customer record type in this context (for this example, each order header "parent" would have only one customer "child"). The existing hooks are used to automatically generate the actual management records 24.

FIG. 3 illustrates an example of the pointer structure of the present invention that is used with the management record 24. The pointer structure is preferably used to improve the speed for processing filters, sorts and functions.

As has been noted above, one primary record 52, in this case order header, is used to uniquely identify the management record 24. Each primary record 26 is linked either directly or indirectly by hooks 44 to the order header primary record. The present invention also produces pointer families 46–49 to divide the primary records 26 in the management record 24 into groups. Each of the management record pointer families (MRPF) has a lead primary record 50 that directly or indirectly through another lead primary record 50 has a many to one relationship with the unique identifying primary record 24. The example of FIG. 3 will be used below to illustrate the operations performed by the present invention on management records 24.

Referring now to FIG. 4, an overview of the preferred method of present invention will be described. The preferred method begins with a series of steps in which the user inputs defining information. In step 80, the user defines or imports the primary record type (PRT) definitions. In step 81, the user defines or imports the hook definitions. The riser can manually define any hooks 44 (relationships) between primary records 26, however, more typically this will be done by automatically importing the production database's dictionary into a data encyclopedia 54 of the system. Users can specify additional hooks 44, especially those for tables in different databases. Next, in step 82, the user defines the management record 24. A user can include as many primary records 26 in a management record 24 as desired. To define a management record 24, the user selects a first PRT 26. After the user selects the PRT 26, the system presents the user with a list of all primary record types (PRTs) 26 which have a hook 44 with the first PRT 26 or any PRTs 26 in the list. The user then selects any of the listed PRT 26 for inclusion in the management record 24. After the user has completed selection of primary record types 26, the user specifies which one of the primary record types 26 selected is the unique identifier 52 for this Management Record Type (MRT) 24.

Next, the preferred method proceeds to step 83 where management record pointer families (MRPFs) are generated. Management record pointers are a new type of data structure for organizing data. Unlike pointers and foreign keys which are logically (and generally physically) part of the primary records, management record pointers are independent of the underlying primary records that comprise a management record. Besides containing the access path to the primary record instances (PRI) that comprise a single management record, they also store data created by functions and user entered information that applies only to the management record. As will be described with reference to FIG. 5 below, and as shown in FIG. 3, MRPFs are generated in order to increase the processing efficiency of the system. Users are unaware of pointer families. Each management record has one pointer family for the unique identifier primary record. Each primary record that is hooked directly to the unique identifier primary record and can have multiple instances for each instance of the unique identifier is called a pointer lead primary record, and defines its own pointer family. Likewise, each primary record whose hook allows it to have multiple instances has its own pointer family. Except for the unique identifier primary record type's pointer family, every pointer family is the child of another pointer family. Any specific management record pointer family (MRPF) can have more than one pointer instance (only the root family is limited to one pointer per management record). Each pointer family identifies the management record instance (MRI) it is for, the pointer lead primary record instance it is for, all single occurrence primary record instances which are hooked directly to that primary lead record instance or any other primary records in the family, and all parent family pointers. (See the Record Layout for Management Record Family Pointers in the Appendix A.)

In an alternate embodiment, instead of setting up pointer families, the present invention could establish pointers for each primary record in the management record. In other words, each primary record would constitute one separate family. Such an embodiment would be easier to develop, but a less efficient use of computer resources.

Once the MRPFs have been generated, the present method continues with additional input steps. The user defines dynamic documents, functions, filters, and sorts, respectively, in steps 84, 85, 86, and 87. These inputs represent the manipulation upon the data that user wants to perform. Then in step 88, the system generates a database command to query the underlying database 38, 40. This process is detailed below in FIG. 6A.

The process continues in step 89 with the user entering a version and initiating the query. When a user specifies the MRT on which to work, the user can specify either a new or existing version. Associated with each MRT are the versions of each of the PRTs that comprise the MRT. The use of different versions allows different users and/or the same user to make private and semiprivate changes to management records and the primary records of which they are made. Each version is not a copy of the base or original set, but is an overlay of just the differences that the present invention stores in relational database tables. Providing different versions does not update the production database nor the base copy of any replicated tables. The data administrator decides who can use different versions and on which primary record types. Any primary record type may be a candidate for multiple versions. Versions can be layered. Associated with each version is a list of the other versions that are overlaid upon the base data prior to the changes entered by a user using the current version. The present invention overlays versions in the sequence specified by the user. Maintaining multiple versions is accomplished by storing the user changes, not in the production database, but into similarly formatted tables in a relational database that is used as the present invention as the repository. (The version tables include version numbers as well as the fields of the production primary records.) The system creates these tables automatically using the primary record definitions which are also stored in the repository. When a user fetches data from the production database primary records, the present invention also fetches the rows in the corresponding version tables. Any record found in the version table replaces the corresponding record retrieved from the production database as they are read into memory. The present invention is able to select the proper version records because the SQL statement which fetches these records includes a filter to select only the version(s) the user specified. Users may also directly update the underlying primary records that correspond to the management record type's (MRT's) PRTs by specifying version number 0. If the user wishes to update any databases primary records besides those that are PRTs, the user can map DDs panes to the files of the database.

Then in step 90, the system fetches the data from the underlying database 38, 40 and version repository. The version repository contains data changes entered through dynamic documents that do not update the underlying database 38, 40. These changes to primary record types are stored in user defined sets and are only included in MRs when requested by the user. From the fetched data, the management record pointer instances (MRPIs) and Primary Record Instances (PRIs) are created. The preferred method, in step 91, next executes management record pre-function filters on the fetched data, as discussed below with reference to FIG. 8. Then in step 92, the management record functions are executed using the fetched and filtered data as described in FIG. 7 below. Next in step 93, management record post-function filters are executed. These filters are executed with a similar process used in step 91. Now that the data from the databases has been retrieved, the preferred method creates dynamic document pointers (DDP) for displaying the data in step 94 (See FIG. 9). As with management records, pre-function filters (See FIG. 18 and discussion below), functions (See FIG. 16 and discussion below), post-function filters, and sorts are executed in steps 95, 96, 97 and 98, respectively. Then in step 99, the dynamic document pointer's (DDP's) calculated fields, MRPF's calculated fields, and the PRIs are displayed in a window for the user to view.

The user can now enter revisions to update the data in the database, the management record, and the PRI in step 100. In step 101, the method first determines whether a record is new or the user is changing a portion of an existing primary record. If the revision is new information, the preferred method in step 102 updates the Management Record Pointer Instance (MRPI) for a new PRI as detailed with reference to FIG. 10 below, and proceeds to step 104. On the other hand, if the revision changes existing data, the MRPIs are updated in step 103 for a changed PRI as detailed in FIG. 11 below, and the method continues in step 104. Next, in step 104, the present invention executes management record pre-function filters for the revision. Then in step 105, the management record functions are executed using the revised data as described in FIG. 12 below. Next in step 106, the management record post-function filters are executed. Step 107 follows where the dynamic documents 20 are updated to reflect the revision, and a transaction to update the underlying database is created as described below in FIG. 17. Then in step 108, the dynamic documents 20 are used to update the display 14.

In step 110, the preferred method tests whether the revision is a function revision. If not, the process continues to step 112. However, if the revision is a function revision, the function is executed with the revision in step 111, and as described below with reference to FIG. 13. In step 112, the preferred method determines whether the revision is a filter revision. If not, the process continues to step 114. However, if the revision is a filter revision, the filter is re-executed using the revision in step 113, and as described below with reference to FIG. 14. Then in step 114, the preferred method test whether the revision is a sort revision. If not, the method continues to step 117. However, if the revision is a sort revision, the sort is executed in step 115, and the display of the dynamic document 20 is updated in step 116. In step 117, the preferred method tests if processing the revision as described above resulted in additional revisions to process. If there are, the method loops to step 119. If the revision did not generate other revisions, the method moves to step 118. In step 118, the method determines whether the user has entered additional revisions. If there are additional revisions to process, the method returns to step 100 and begins processing the revision; otherwise, the process is complete and ends.

The two primary ways to create the pointer families for a management record are top down and bottom up. The top down method is typically used for manually entering new management records, hierarchical database fetches or "querying by example" of a few management records. The bottom up method is used for fetching large numbers of management records from relational databases. In the top down method, pointers for the top level pointer family are first created, then the top level's children pointer families, then the top level's grandchildren pointer families, etc. In the bottom up method, the present invention constructs a single query (with outer join on the unique identifier primary record) for each management record pointer family tree (a tree is a leaf level MRPF and all its present MRPFs) and fetches the resulting single flat relational table. The present invention then converts each row of that table to a single pointer for the lowest family in the hierarchy. For each of the higher levels in the pointer family hierarchy, pointers are created by grouping the fetched relational table by the key field of the lead primary record for that pointer family.

Figure 5:
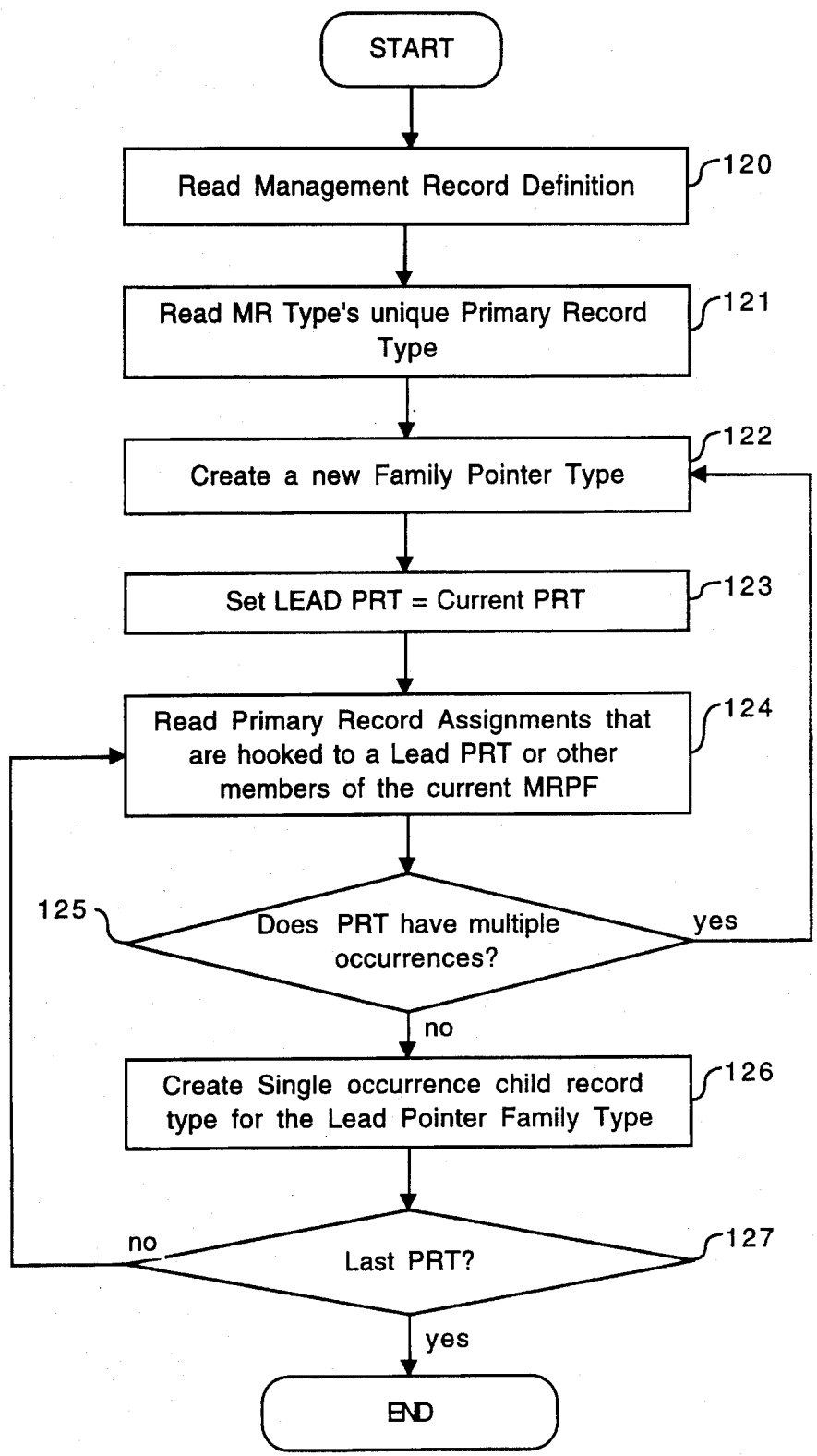
FIG. 5 is a flowchart of the preferred method for generating management record pointer families.

Referring now to FIG. 5, the preferred method for generating management record pointer families (MRPFs) will be described. The process begins in step 120 by reading the management record definition. In step 121, the unique identifying primary record for the management record 24 is read. Then in step 122, a new family pointer type is created. In step 123, a variable, "LEAD PRT," is set equal to the current PRT. In the initial pass of this step, the current PRT will be the unique identifying record. Next, in step 124, the primary records that are hooked directly to the PRT or other members of the current MRPF are read from the primary record assignments. Then in step 125, the method tests whether the PRT read in step 124 has multiple occurrences on its end of the hook. If the PRT read in step 124 has multiple occurrences then it forms its own pointer family, and it is a lead PRT in its own family. The process then returns to step 122 to construct a pointer family for this new lead pointer. If the PRT read in step 124 does not have multiple occurrences, then the process continues in step 126 where a single occurrence child record type is created and added to the LEAD PRT pointer family. Next in step 127, the method tests whether this is the last PRT in the management record 24. If not, the method returns to step 124 to read other PRTs that have not been associated with a pointer family. Otherwise, the process is complete and ends.

Figure 6A:
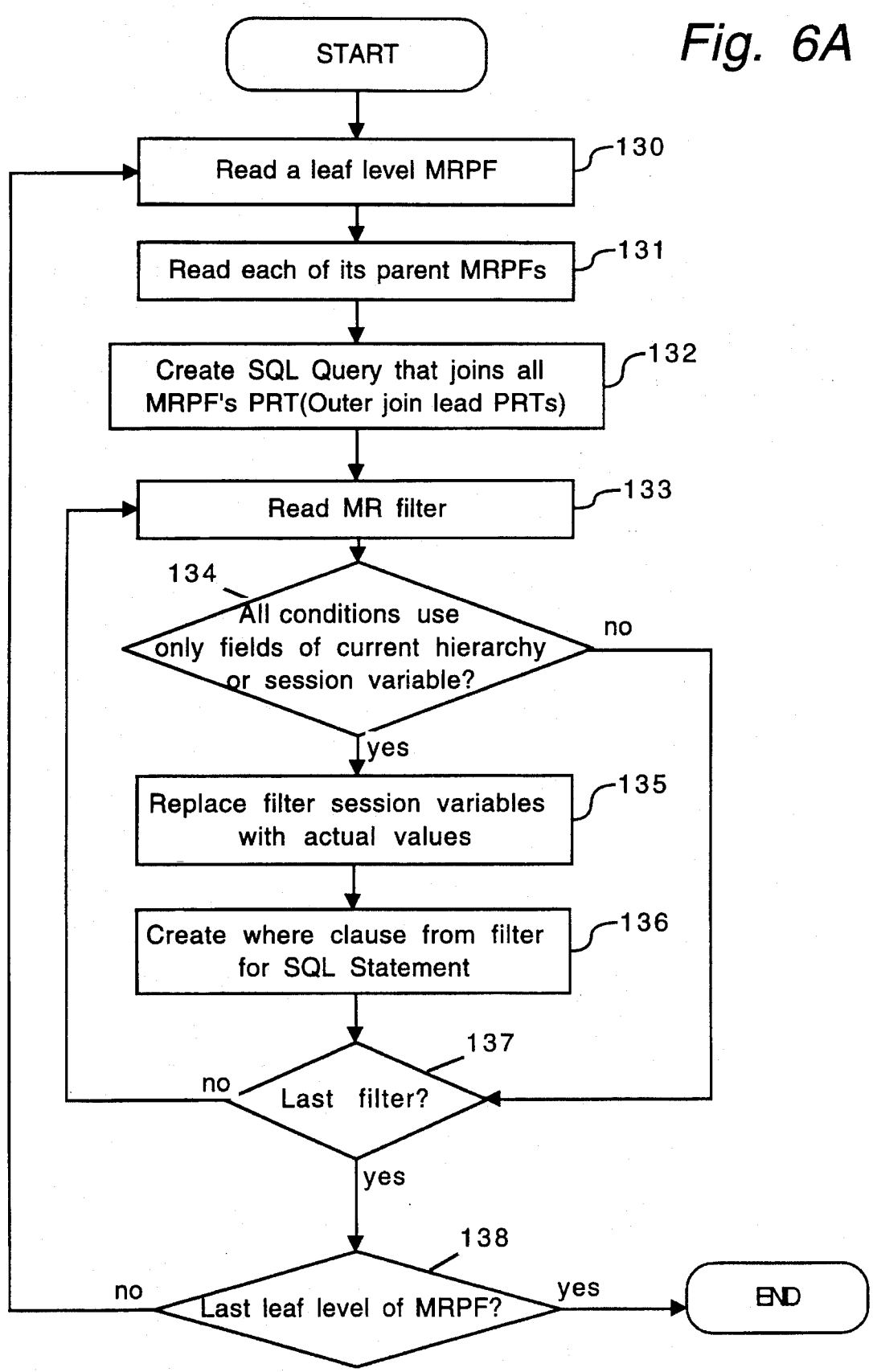
FIGS. 6A and 6B are a flowchart of the preferred method for fetching data from an underlying database and constructing management records.

Referring now to FIG. 6A, the preferred method for constructing a query to extract data from the underlying databases 38, 40 will be described. This process begins in step 130 by reading a leaf level MRPF. A leaf level MRPF is a pointer family that does not have any children. For example, the pointer families 48 and 49 are leaf level pointer families. Next, the ancestor MRPFs (i.e., parent, grandparent, etc.) for the leaf level MRPF read in step 130 are read. In step 132, a SQL query that joins all the read management record pointer families (MRPFs) PRT's is created. This join is an outer join of the lead PRTs). Then in step 133, a filter for the management record is read. Next in step 134, the process tests whether all conditions for this filter use only fields in the current hierarchy, or session variables of the current hierarchy. If the filter uses only fields that are in files being queried, the filter's conditions can be used in the query statement. If not, the process jump to step 137. Step 135 replaces the variables in the filter with the current value of these variables. Step 136 converts the filter into an SQL where clause. In step 137, the method determines whether this is the last filter to be executed. If not, the process loops to step 133, otherwise the process continues in step 138. In step 138, the method tests whether this is the last leaf level MRPF that must be processed. If not, the process loops to step 130, otherwise the process ends.

Figure 6B:
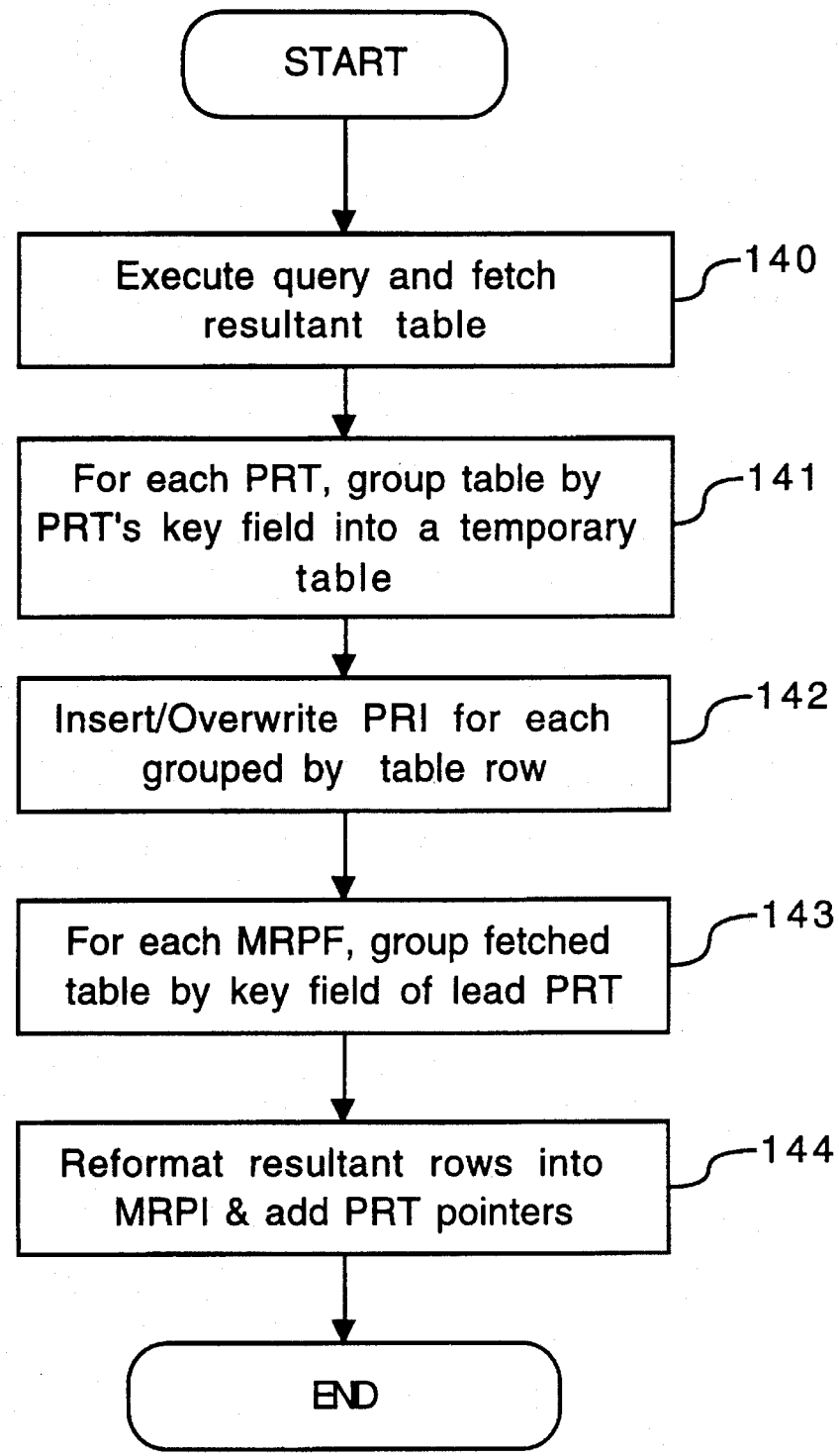

Once the query has been created it is executed in accordance with FIG. 6B. The process for executing the query first begins in step 140 by executing the formulated query and fetching the resultant table from the underlying database. For each PRT, the table is grouped by the Primary Record Type's (PRT's) key field into a temporary table in step 141. Then the PRIs are overwritten for each grouped by row table in step 142. For each of the MRPF, the fetched tables are grouped by key field of the lead PRT in step 143. Finally, in step 144, the resultant rows of the table are reformatted into a MRPI and the pointers to the PRT's pointers are added to the MRPI.

Figure 7A:
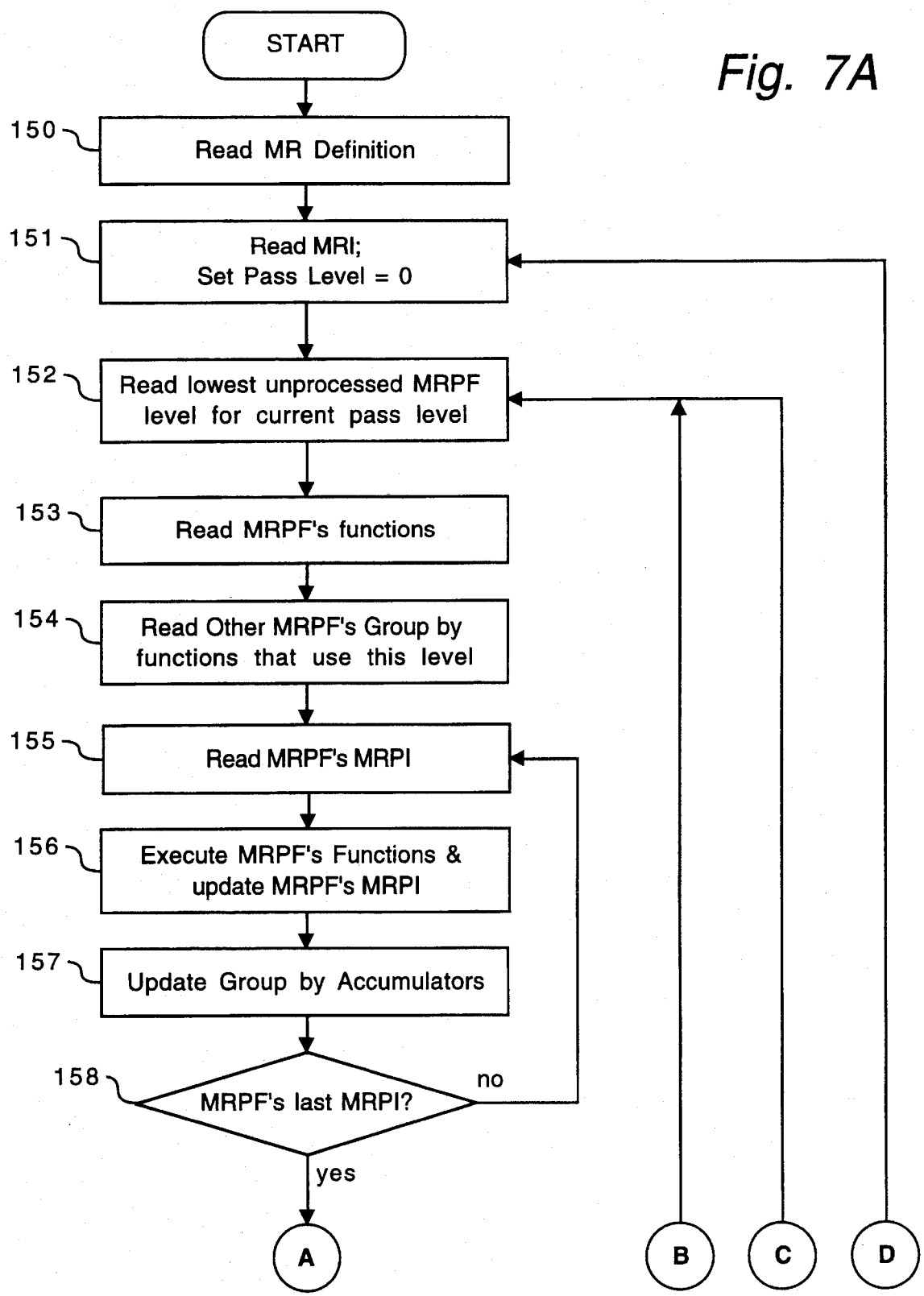
FIGS. 7A and 7B are a flowchart of the preferred method for executing functions for a new set of management records.
Figure 7B:
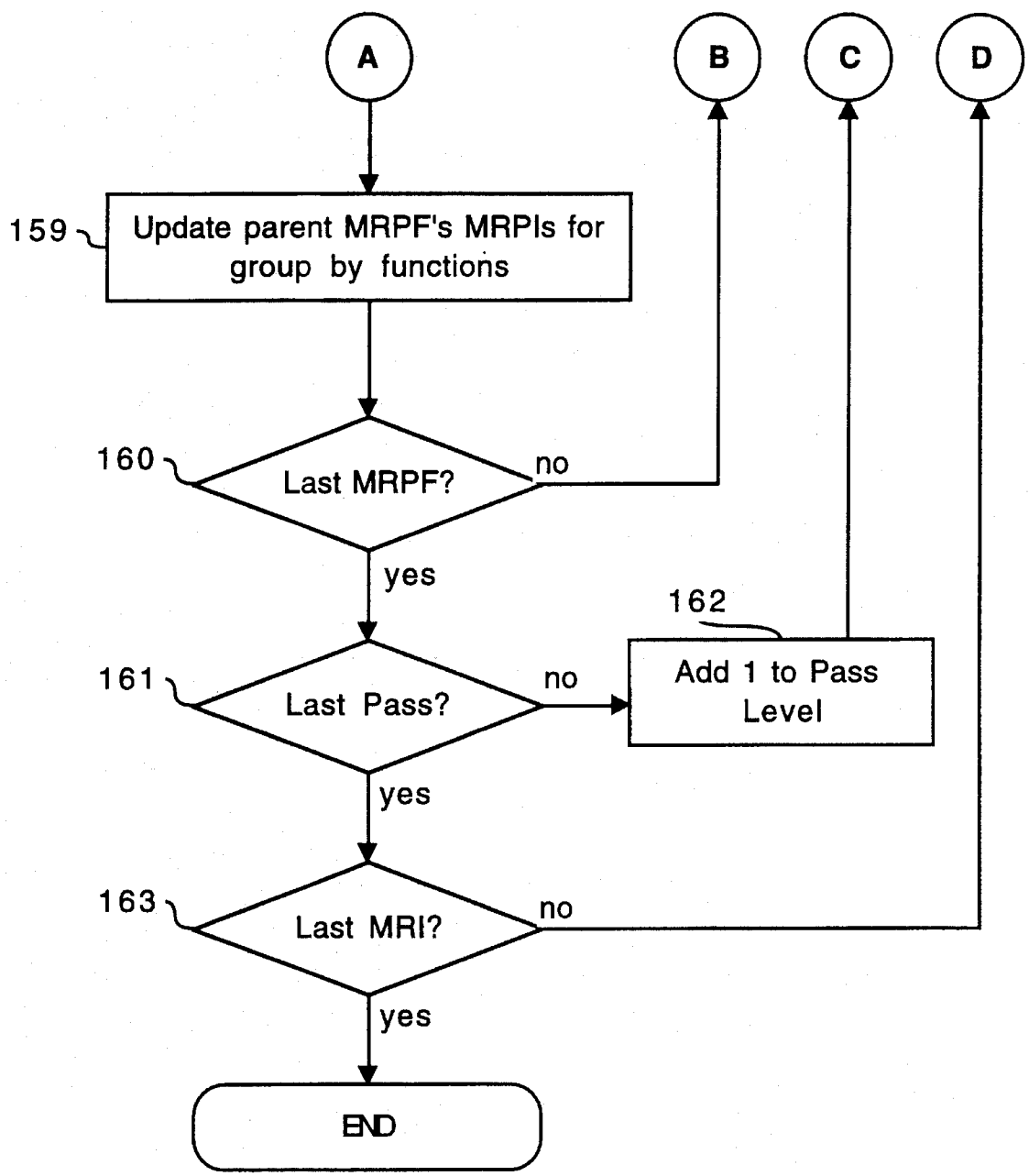

Referring now to FIGS. 7A and 7B, the preferred method for executing functions will be described. A function is one or more mathematical, financial, and statistical calculations performed using the fields of the management record's primary records. Examples of functions include: add, subtract, multiply, divide, round, test, join, summarize, generate a random number, log, remainder, and calculate present value. Examples of "group by functions" include: any occurrence, first occurrence, last occurrence, sum, average, count, maximum, minimum, standard deviation, variance, and net present value. The present invention is particularly advantageous because any combination of PRT fields and any MRPF calculated fields can be used in a function. If the field being used is not in the pointer family or one of the fore parents of the pointer family to which the results are assigned, the present invention requests that the user enter the "group by function" it should perform on that field prior to using it in the calculation. For example, if a user wishes to calculate an order discount by multiplying the order line dollar amounts by the order header discount and then store the results in the order header, the user would specify the "sum" group by function for the order line dollar amounts because order lines are children not fore parents of the order header where the result is stored.

The user specifies if particular functions should be executed prior to or after the filters are executed. If the user wants, for example, to not display tax order lines but wants to include the tax amount from those lines in the total order amount, the function to calculate total order amount from the order lines occurs prior to filtering out the tax order lines. If the user wants, for example, to not display tax order lines and does want to include the tax amount from those lines in the total order amount, the function is executed after filtering out the tax order lines.

The present invention attempts to minimize the time it takes to run the functions for a new set of management record instances (MRIs) by running each function only once and by reading each primary record instance (PRI) as few times as necessary. Because functions can include the results (calculated fields) of other functions, the present invention "restates" functions to improve calculation speed. The present invention first ensures that all functions are restated as only PRT fields and group by functions of PRT fields. Restatement eliminates (except for group by functions) one function being dependent upon another function because that function uses the result of the other function. Restatement occurs for each function when the user first defines (enters or maintains) it or one of its component functions. Besides replacing calculated fields with the fields from which they are calculated, the present invention also determines in which pass a specific function should be processed. For a particular MRI, the present invention must make multiple passes when a group by field from one level in the MRPF hierarchy is used in a function in another level in the MRPF hierarchy and the result of that function is used in another function in the original group by function hierarchy level. For each function, the present invention checks to see if that function is comprised of any function which uses a group by fields from a different hierarchy or uses a calculated field from a hierarchy level higher than the current level. If either of the above two conditions exist, the present invention adds one to the calculation pass sequence number. The present invention then runs the same routine on the subfunctions that meet the test conditions. The present invention continues this process until it has no more subfunctions to test. As a result of this process, each function has a pass sequence number.

As shown in FIGS. 7A and 7B, the method starts with step 150 in which the management record definitions are read. The present invention processes each MRI separately. Then, in step 151, a MRI is read and the pass sequence number is set equal to zero. In step 152, the method reads the lowest unprocessed MRPF level for this pass. First, the method executes for each management record pointer instance (MRPI) all the functions with a pass sequence number of zero at the same time. It starts with the MRPFs that are lowest in the management record hierarchy and works its way up. In step 153, the method reads the MRPF's functions. Then in step 154, the method reads other MRPF's group by functions that use this level. Group by functions are executed with the MRPF they summarize, not the MRPF where the result is stored. The MRPIs of the MRPF are then read in step 155. Then in step 156, the functions for this MRPF are executed and added to the MRPI. The group by accumulators are then updated. Group by accumulators store not only the results of the group by calculation, but also enough information to recalculate the amount without rereading all the MRPIs if one of the component MRPI changes. For example, a "mean" group by accumulator includes not only the means but also the total number of MRPIs. Next in step 158, the system determines whether the MRPI being used to execute the functions is the last MRPI for this MRPF. If not, the method returns to step 155, otherwise the process continues in step 159. In step 159, the group by results are added to the parent MRPI. Then in step 160, the method test whether this is the last MRPF for this management record. If not, the process loops to step 152 to process any unprocessed MRPFs, otherwise the process continues in step 161. In step 161, the method determines if this is the last pass. The higher the pass sequence number that a group by function has the latter it gets processed. The sequence number is based on the nesting of the group by function. If it is not the last pass, then 1 is added to the pass sequence number in step 162 and the method returns to step 152 for further processing. After each pass of all the MRPIs, the method executes the functions with the next highest pass sequence number until all functions are executed. However, if it is the last pass, the method continues in step 163 where the process tests whether this is the last MRI to perform functions for. If not, the process returns to step 151, otherwise the execution of the functions for the management record are complete.

The present invention also provides for manipulation of the data using filters. The filters of the present invention are advantageous because the user does not need to join the underlying tables together in his/her select statement. Users can select a subset of all possible management records and a subset of the MRPFs that comprise the selected management records. Section criteria are applied against any PRT or calculated field in the MRT. Where there could be multiple occurrences of the field in a MRT (such as quantities ordered on one customer order), the user must also specify a group by filter just as with functions. The present invention has the two special group by filters "any" and "all." The other selection criteria are: equal to, not equal to, greater than, less than, like, and exists in dynamic document X. Filters can be comprised of multiple selection criteria. The criteria can be nested and include AND/OR conditions. An example of a filter is give me all management records where the customer is in California, and the total of the order line amounts is greater than $10,000, and any of the Salespersons are in territory one, or the order is on hold.

Any number of filters for a MRT or its MRPFs can be active at any time. The user defines as many filters as he/she wishes and then activates and deactivates them whenever he/she wants. Filters are executed either when the MRIs are fetched by the production database or after they are stored in memory 18. The user specifies which filters should be part of the fetch. Because of performance concerns, fetches with group by functions cannot be used for fetches. The user can also indicate if the filter is for just temporarily hiding the data or for deleting the data. If a parent MRPI is filtered out, so are its children MRPIs. Filters for management records are handled exactly like filters on the top most MRPF in the hierarchy.

Figure 8A:
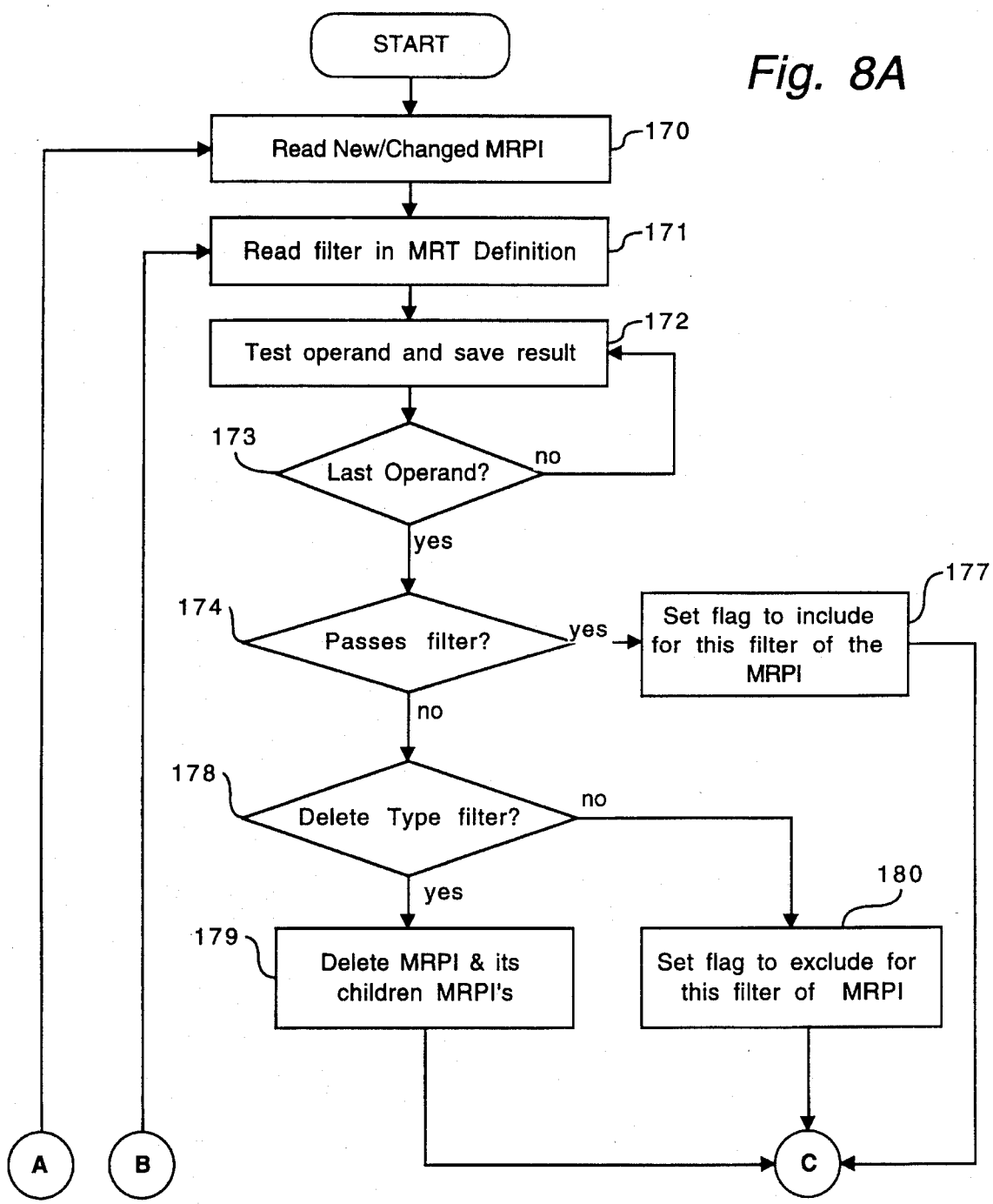
FIGS. 8A and 8B are a flowchart of the preferred method for executing a filter for any number of management records and their pointer families.
Figure 8B:
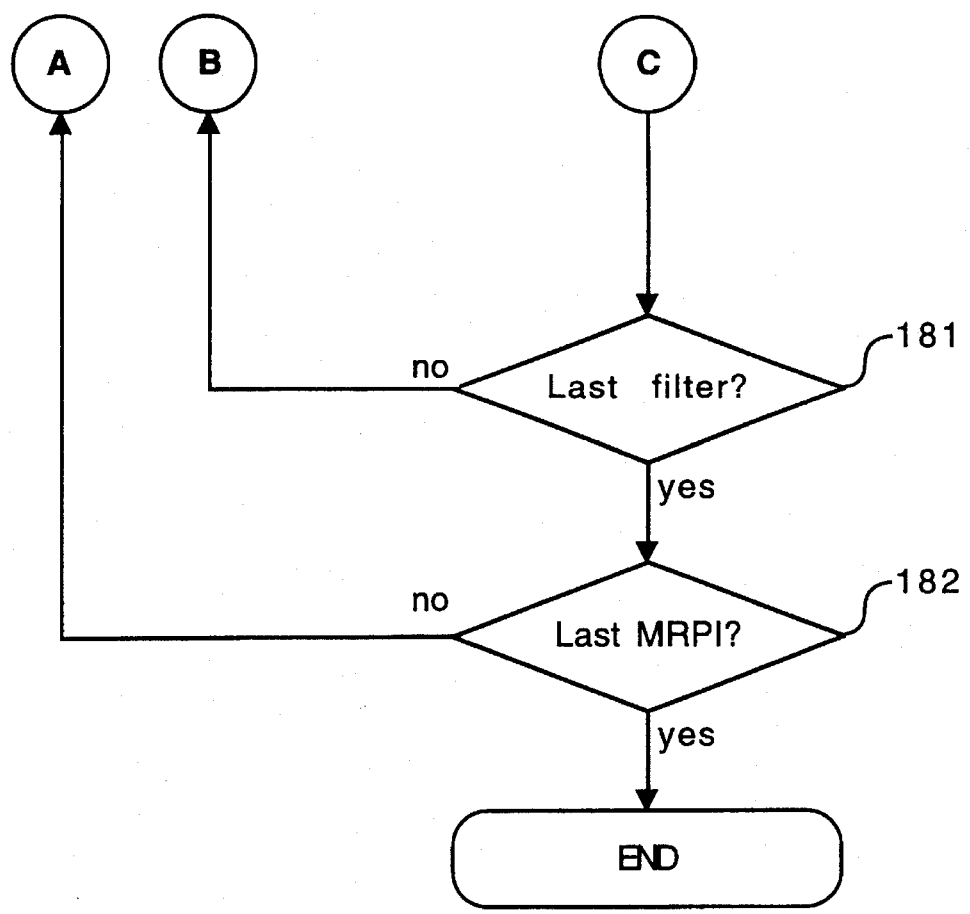

FIGS. 8A and 8B illustrate the preferred process for executing filters. The process begins by reading any new or changed MRPI in step 170. Then a filter from the MRT definition is read in step 171. Next, in step 172, an operand is tested, and the result is saved. Since all filters operate on fields in the MRPF or on fields which have been grouped by a function into the MRPF, each MRPI can be fully tested to see if it should be filtered out by reading only the MRPI's calculated fields and its PRT's PRI field values. For improved processing efficiency, the present invention executes all of a management record pointer instance's (MRPI's) filter tests one after the other. The operation tests are simple Boolean tests to see if the field's value equals the value stored in the filter, or stored in the specified variable, or is in the list (Dynamic Document) specified. The present invention stores the result (true or false) of each operation. The method then determines if this operand is the last operand to test in step 173. If not, the process returns to step 172 to test the next operand. If all the operands have been tested, then the process continues to step 174. In the step 174, the method looks at the results of each operand to determine if the entire filter results in a pass or fail. If the MRPI passed the filter, the method proceeds to step 177 where the method appends to the MRPI a flag for each filter indicating if the filter includes that particular MRPI. If the MRPI fails the filter, the method jumps to step 178 to evaluate the filter type. In step 178, further tests are performed to determine if the filter is a delete type. If the filter a delete type (i.e., MRPIs that are filtered out are deleted instead of not being displayed), the MRPI and its children MRPIs are immediately deleted in step 179 so no other filter need process them. Any MRPI that has any parent MRPI which is excluded is itself excluded. If the filter is not a delete type, then the flag is set to exclude in step 180 for this filter in the current MRPI's MRPF filter affects list. Any MRPI that is excluded by any active filter is not displayed in the currently open dynamic documents 20. Next, step 181 determines whether there are additional filters to be processed. If so the method loops to 171, otherwise the method tests whether this is the last MRPI to be processed in step 182. If there are more MRPIs to process, the method returns to step 170, otherwise, the process is complete.

As has been noted above, Dynamic Documents (DD) are used to display data base information to the user. Essentially, DDs are a rearranged and reformatted MRT. A DD is a window on the display device 14 comprised of a hierarchy of display panes. Each pane displays one or more of the MRT's PRTs and calculated fields. The user can define functions, sorts, and filters for each DD. A DD is also a tool for database administrators and system analysts to update multiple databases from a single change to one or more MRIs entered through any DD.

For non-source (target) data base updates, each DD pane will correspond to a single primary record although a DD pane can correspond to more than one primary record. All the fields targeted must come from the primary record's pane or one of its parent panes (using a child pane would require that the fields be grouped by). When the user enters changes to a MRI, the present invention automatically creates the production database Update Transactions (UTs) defined in the DD definition. Another process of the present invention applies the transaction to the appropriate production database. The advantage of using DDs to create multiple database update transactions is that the data relationships can be radically restructured from that of the MRT. Child records can become parents, records can share fields, calculated fields can be created, and sets of records can be summarized into single records and values.

The DDs are created by the user based on the types of information that the user wants to view and update. The user selects which of the PRTs in the MRT to include in the dynamic document pointer (DDP). Any PRT in the MRT can be used in the DDP and can be used more than once in a single DD. While the relationship between any two PRTs in a MRT is predefined by their shared hook, the relationship between any two PRTs in a DD is defined by the user. By putting a PRT in a parent hierarchy pane, the user is making that PRT the parent of all the PRTs in the children panes even if the PRTs have a different relationship in the MRT. This capability allows the user to represent the data in virtually anyway they want even though that representation is not supported by the production database in which the data is stored. For example, a customer order MRT that has its Items PRT hooked to its Order Lines PRT which in turn is hooked to its Order Header PRT and also has Salespersons separately hooked to its Order Header PRT, as described above with reference to FIG. 3, can have a DD where the Item PRT is in the top level pane and the Salesperson is in a child pane. In this example, the Item has become the parent of Salesperson. The DD displays in the top pane any Item used in any Customer Order MRT, and displays in the child pane all the Salespersons which sold that Item on any Customer Order.

When the user places a PRT in a DDP, the user gains access not only to the PRT's fields in that pane and any of its child panes, but also access to all the calculated field of the PRT's MRPF. These calculated fields are comprised of fields of the selected PRT and also any field from any other PRT in the MR. In the above example of the Items pane, the user could display the total amount ordered on all orders for each item even though the DD does not include the order lines or order header PRTs which are required for this calculation.

The user creates the DD Pane definition by entering the pane's name, its position in the pane hierarchy and then by selecting as many of the PRTs of the MRT that are to appear in the pane. The system then automatically joins the PRT's MRPIs together to create the DDPs. These DDPs are the DD equivalent of MRT's MRPIs. Each DDP corresponds to a single pane display row and can roll up into display subtotal rows.

The user specifies how to update production databases (other than the PRTs) by defining as many separated trans-actions types as desired. Then the system, for any single update to the DD, automatically creates Production Database Update Transactions Instances (UTs) and posts them to the appropriate database. Each Production Database Update Transaction Type (PDUTT) can update as many primary record types as the user wishes; the only restriction is that they all be in the same instance of a production database. A DD's PDUTTs are similar to its pane attributes and report attributes in that it formats the field into an output medium. One primary difference is that a PDUTT does not always request the current value; it can also get the amount a value has changed by as a result of a transaction, or a literal amount stored in the PDUTT. Also, a PDUTT is different in that its instances (UTs) are only created when the DDs underlying MRIs are changed. The user can have all MRI changes result in UTs or can limit them to only changes entered through the DD of the PDUTT, or only when the DD is active (i.e. opened by the user).

Figure 9A:
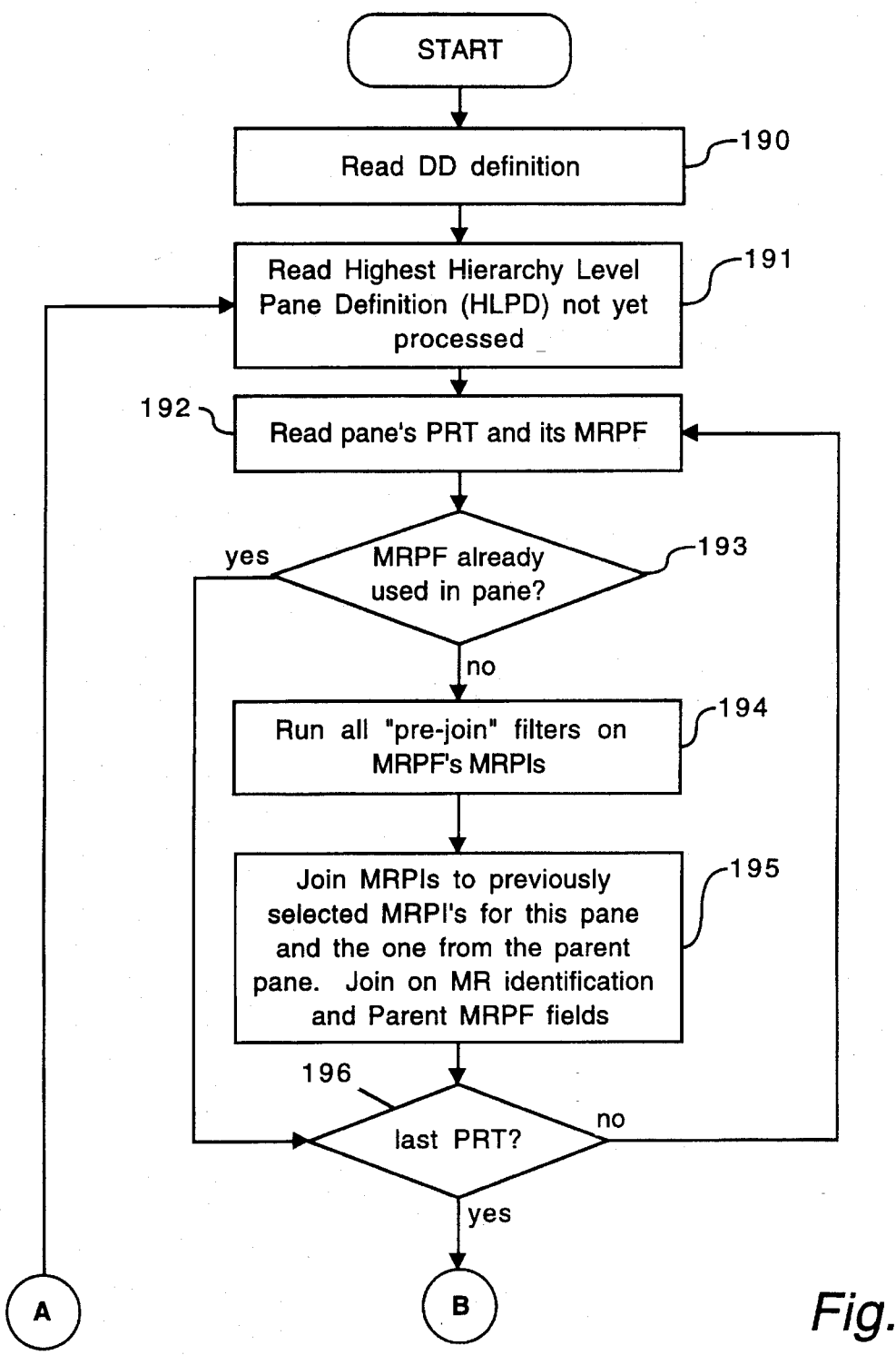
FIGS. 9A and 9B are a flowchart of the preferred method for creating a dynamic document pointer for a new set of dynamic documents.
Figure 9B:
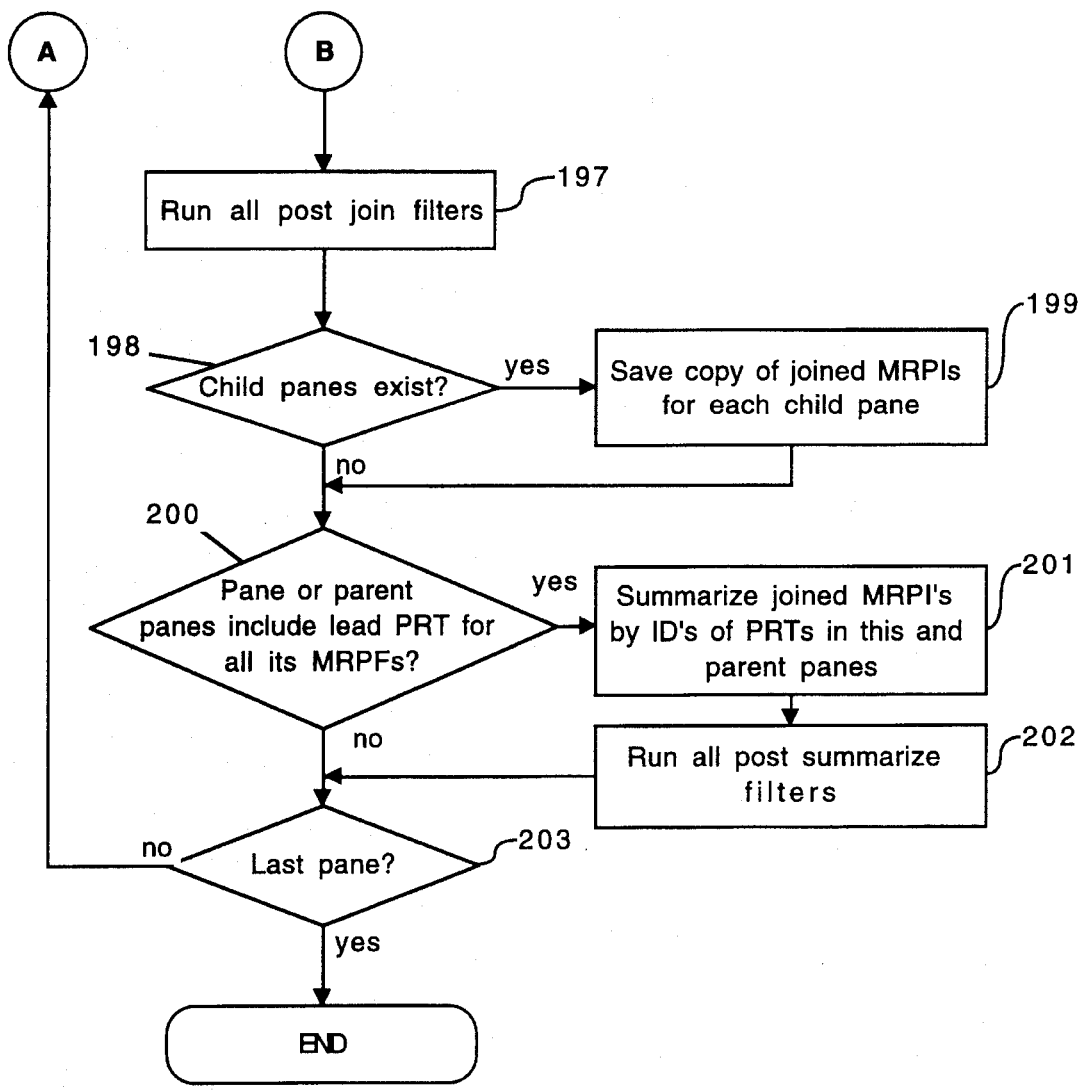

Referring now to FIGS. 9A and 9B, the preferred method for creating DDPs is described. First, the dynamic document 20 is read in step 190. Then the highest hierarchy level pane definition not yet processed is read in step 191. In step 192, the pane's PRT and MRPF are read. Next, the method tests whether the MRPF is already used in an existing pane in step 193. If so, the method jumps to step 196 and avoids having to initialize the pane. On the other hand, if the pane does not exist, it must be created. The method creates the pane in steps 194 and 195. In step 194, the method runs the pre-join filters on the MRPF's MRPIs. In step 195, the method joins the MRPIs to previously selected MRPI's for this pane, and the one from the parent pane. The panes are preferably joined on management record identification and parent MRPF ID fields. The method then continues in step 196. In step 196, the method determines if this is the last PRT to be processed. If not, the process returns to step 192 and reads other PRTs. Otherwise, the method continues in step 197. In step 197, the method runs all post join filters. Then in step 198, the method tests whether any child panes for this PRT exist. If there are child panes, the method saves a copy of the joined MRPI for each child pane and continues directly to step 200. If there are no child panes the method proceeds directly to step 200. In step 200, the method determines if this pane or its parent panes include lead PRT for all its MRPFs. If lead PRTs are included, the method executes steps 201 and 202. In step 201, the system summarized the joined MRPI's by identification of the PRTs in this and the parent panes. If all the panes include lead PRTs for each MRPF, the summarization step 201 would have no effect; that is why it is shipped. The system in step 202 then runs all post summarize filters, and moves to step 203. If lead pointers are not included, the method moves directly to step 203 and determines whether this is the last pane to modify. If not, the method loops to step 191, otherwise the process ends.

Figure 10:
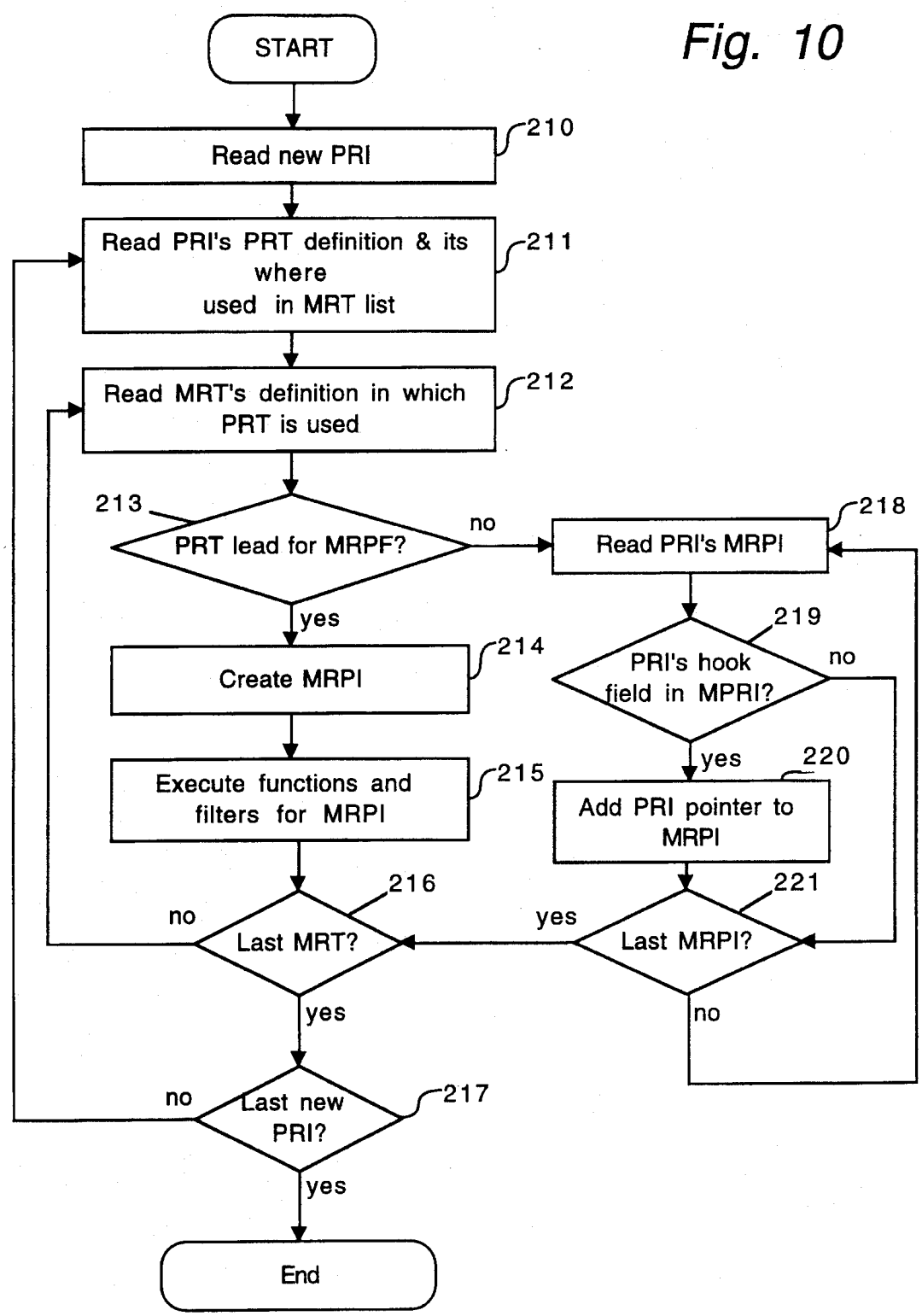
FIG. 10 is a flowchart of the preferred method for updating a management record for a new primary record instance.

FIG. 10 illustrates the preferred method for updating a management record for a new primary record instance. The method starts by reading the new PRI in step 210. Then in step 211, the PRT definition and the where used list of this PRI are read. Next in step 212, the definition of the MRT listed in the where used list of step 211 is read. Next, the method determines if the PRT is a lead PRT of a MRPF in step 213. If it is a lead PRT, the method continues in step 214 where a MRPI is created. Then in step 215, the function and filters for the MRPI are executed. If it determined not to be a lead PRT in step 213, then the MRPI of the MRPF is read in step 218. Then in step 219, the method tests if the PRI's hook field is in an MRPI. It will rarely be true because this means the PRI was then referenced before it was created. If so, the PRI pointer is added to the MRPI in step 220 and then method proceeds to step 221. If the PRI's hook field is not a MRPI, the method proceeds directly to step 221 where the method determine if this is the last MRPI to process. If there are addition MRPIs, the method returns to step 218 otherwise the method continues to step 216. In step 216, the method tests whether there are additional MRTs to process. If there are, the method jumps to step 212. If not, the method test for additional PRI to process in step 217. For any more PRI, the method returns to step 211, or else the process is completed.

Figure 11A:
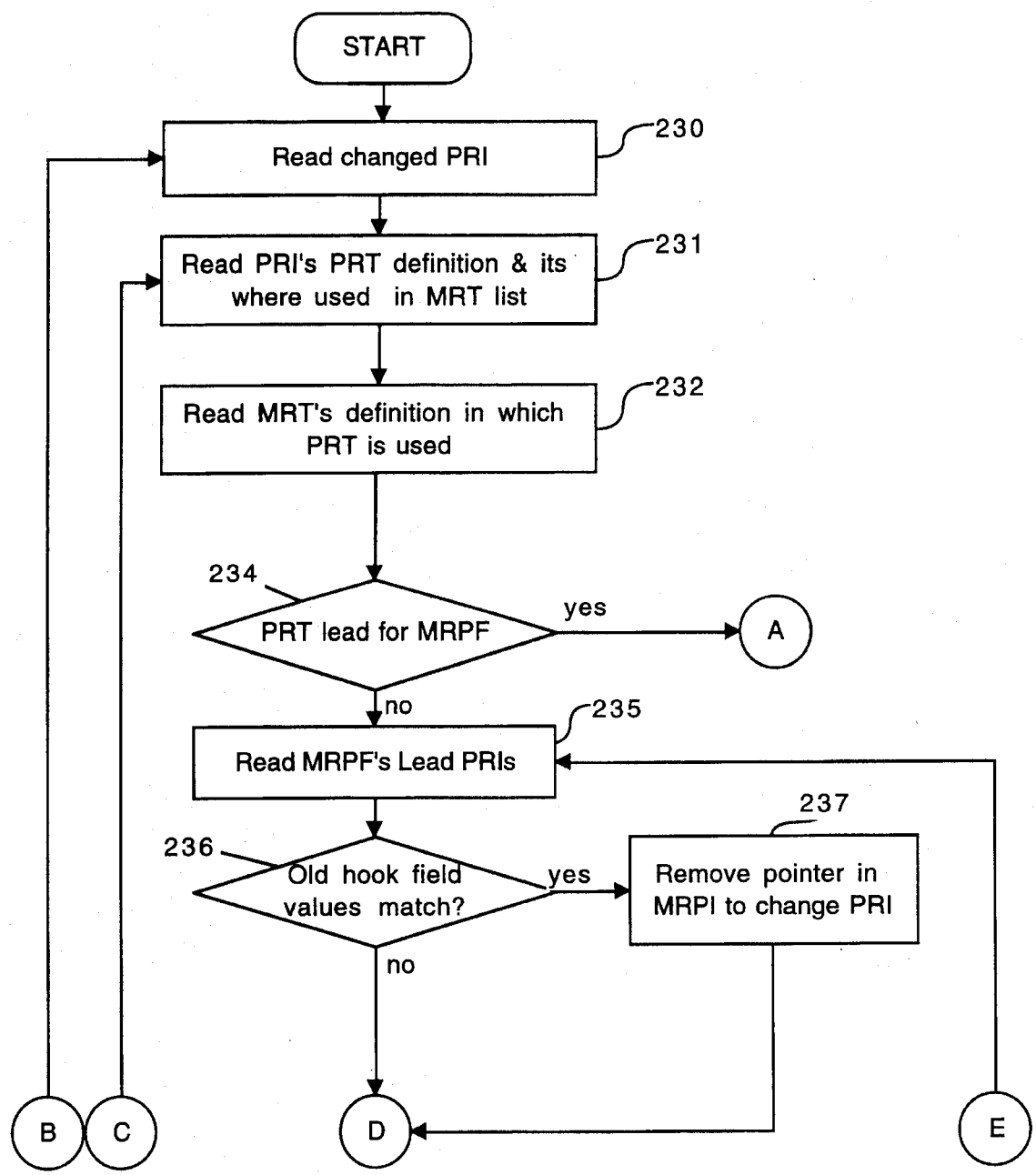
FIGS. 11A, 11B, and 11C are flowcharts of the preferred method for updating a management record pointer instance for a changed primary record instance.
Figure 11B:
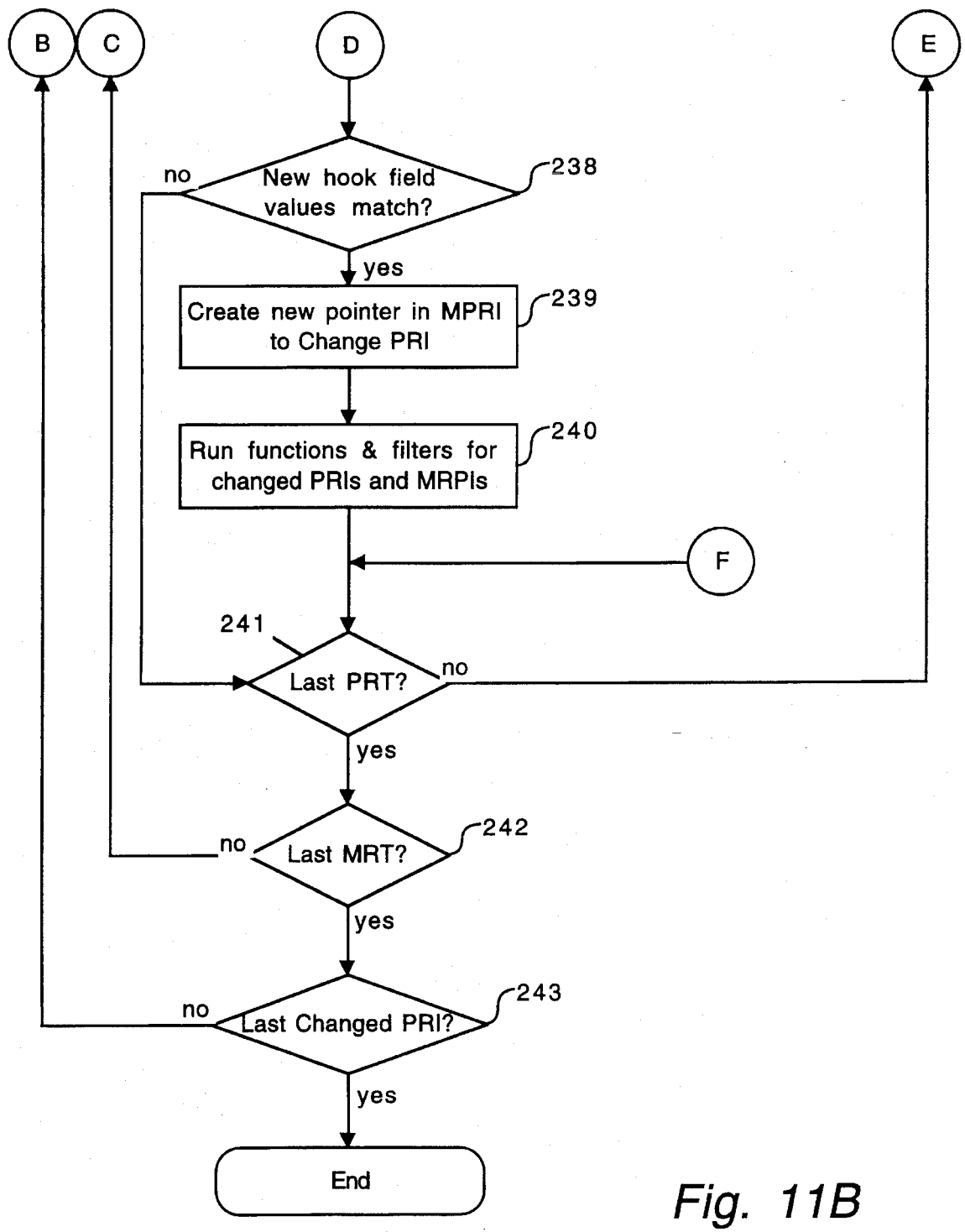
Figure 11C:
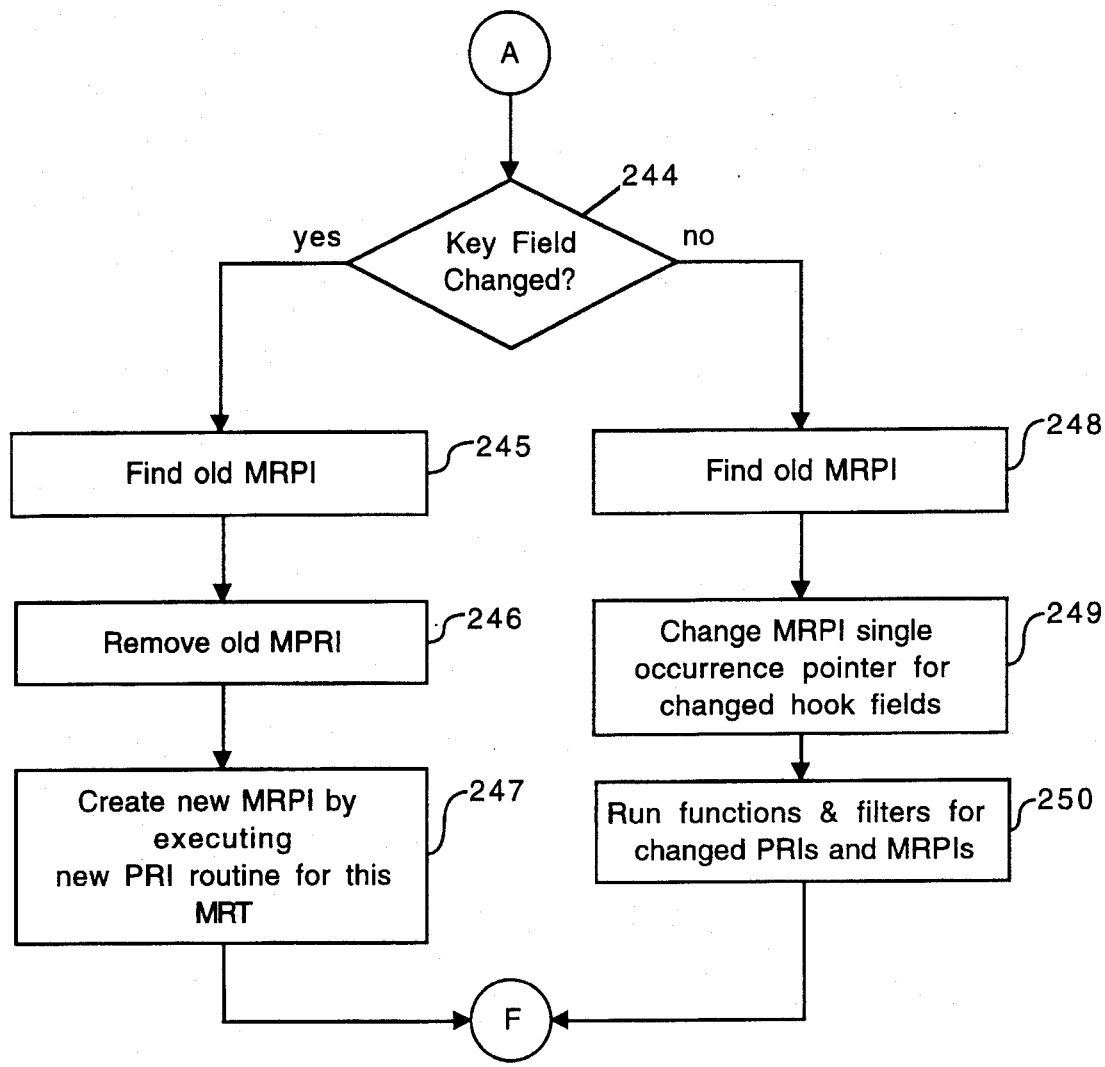

Referring now to FIGS. 11A, 11B, and 11C, the preferred method for updating a management record for a changed primary record instance is described. Similar to the method of FIG. 10, the process begins by reading the changed PRI in step 230, reading the PRT definition and the where used list of this PRI in step 231, and reading the definition of the MRT listed in where used list in step 232. The method next tests whether this a lead PRT for a MRPF in step 234.

If the PRT is a lead PRT for a MRPF, the method continues with step 244 of FIG. 11C. In step 244, the process determines if a key field was changed. If a key field was changed, the method executes step 245, 246 and 247, to respectively find the old MRPI, remove the old MRPI, and create a new MRPI by executing the new PRI routine of FIG. 17A for this MRT. However, if a key field was not changed, the method finds the old MRPI in step 248, changes the MRPI single occurrence pointer for the changed hook fields in step 249, and then runs the functions and filter for the changed PRIs and MRPIs. After competition of either branch, the method returns to step 241 of FIG. 11B.

Referring back to 11A, if the PRT is not a lead PRT for a MRPF, the method continues in step 235 by reading the lead PRIs for the MRPF. Then in step 236, the method compares the old hook fields values to determine if they match. If there is a match, the PRI is changed by removing the pointer in the MRPI in step 237 before proceeding to step 238. In step 238, the method tests if the new hook values match. If there is no match the method jumps to step 241. If there is a match, the PRI is changed by creating new pointer in the MRPI in step 239. Then the method runs the functions and filters for the changed PRIs and MRPIs in step 240. Then the method test whether the current process involves the last PRT, the last MRT or the last changed PRI in steps 241, 242, and 243, respectively. If this is not the last PRT of the last MRT for the last changed PRI, then the method loops to the appropriate step (i.e., steps 235, 231 and 230) for further processing.

Figure 12A:
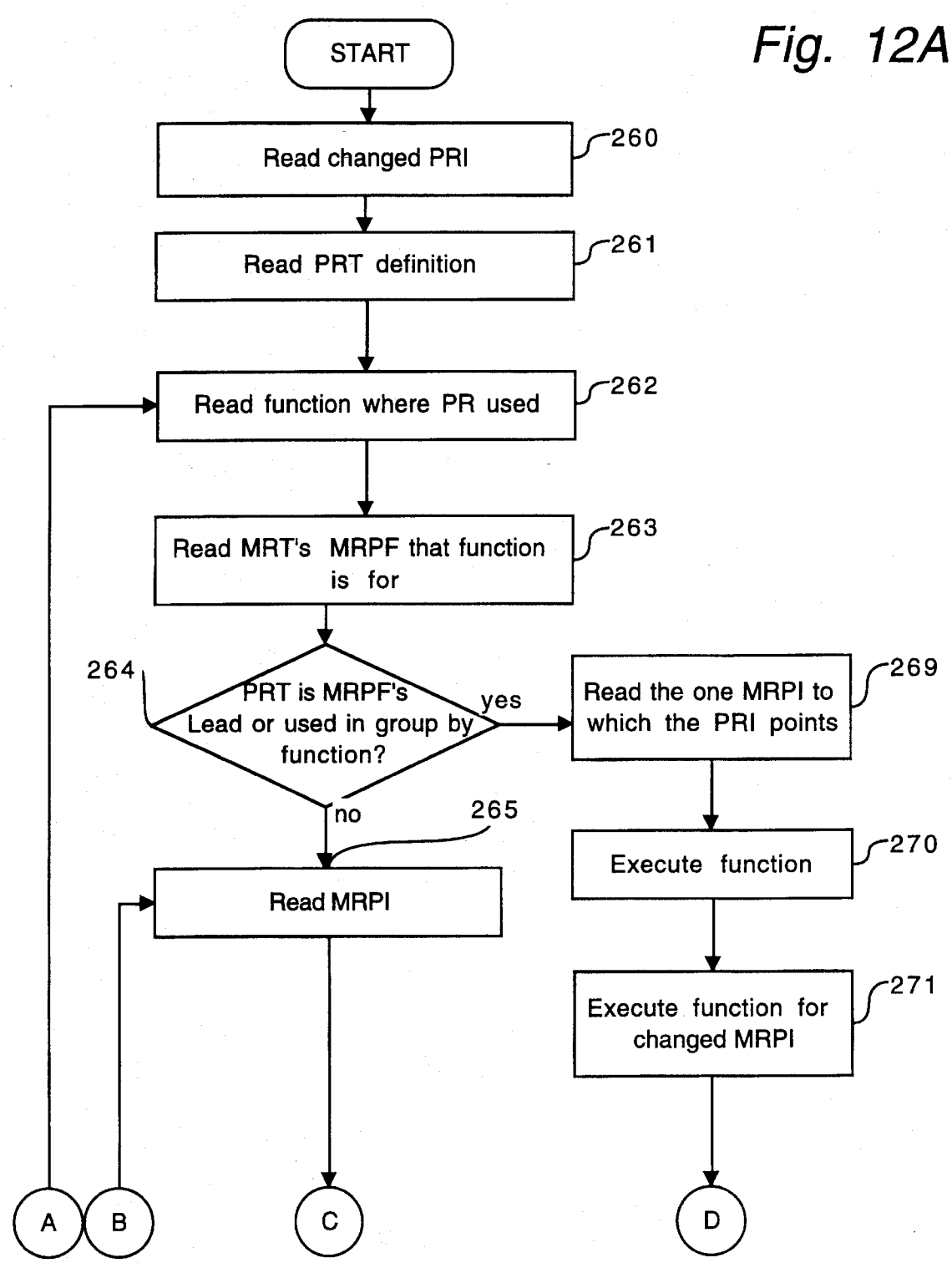
FIGS. 12A and 12B are a flowchart of the preferred method for executing a function for a changed primary record instance.
Figure 12B:
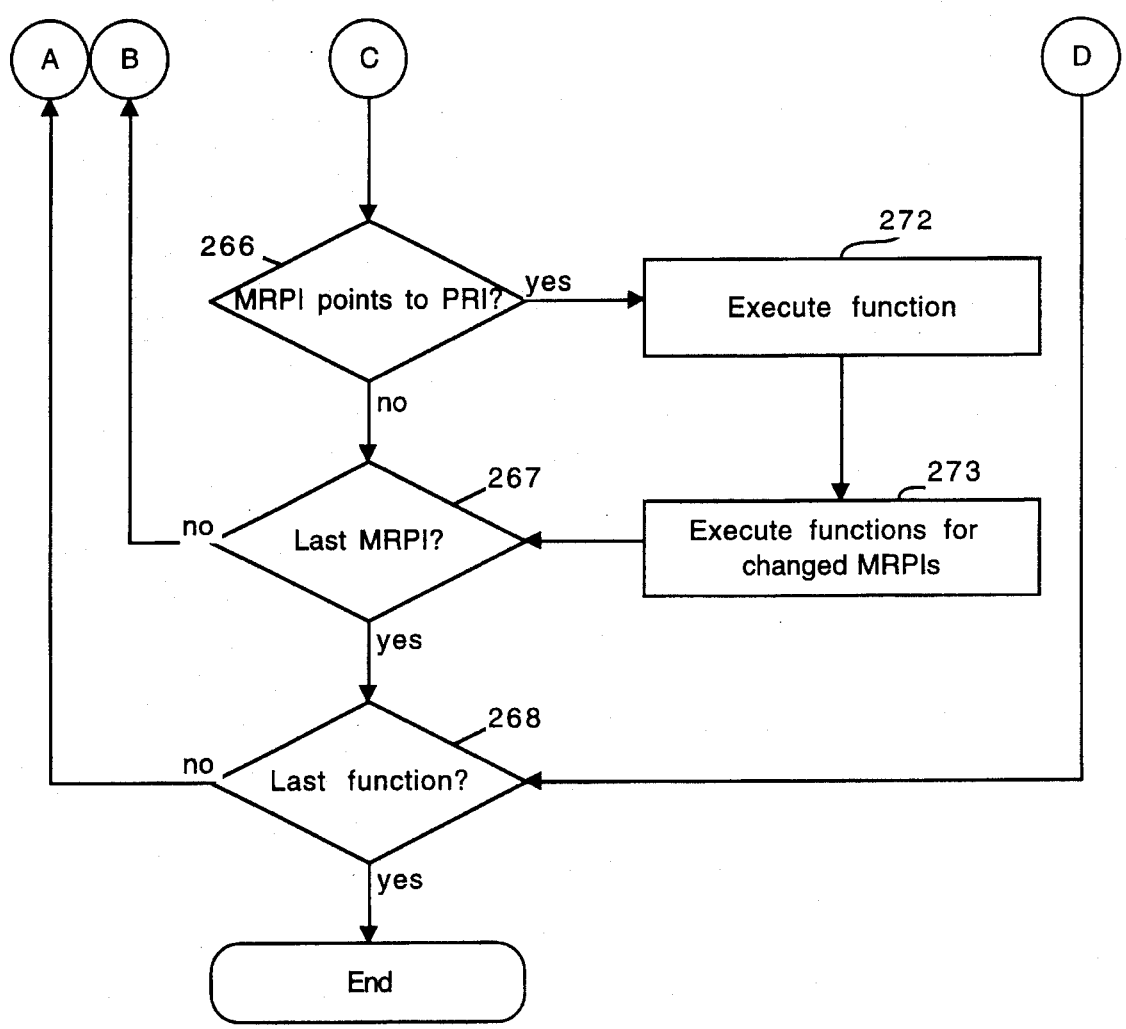

The preferred method for executing a function for a changed primary record instance is shown in FIGS. 12A and 12B. The present invention handles PRT fields that are used in a group by function or used in the function of a child MRPF specially for recalculation purposes. Whenever one of these PRT's fields change, present invention not only recalculates the functions for its own MRPIs but also recalculates the group by function value and the other functions in which it is used. In other words, present invention treats these field as calculated fields by finding where they are used and making sure that the additional appropriate recalculations take place. The present invention does this by keeping pointers to the group by functions and functions of the other MRPFs that use the field.

The preferred method begins by reading the PRI and the PRT definition in steps 260 and 261, respectively. Then in step 262, the function using the PRI is read. Next in step 263, the MRT's MRPF for the function is read. Whenever a PRT's PRI changes, the present invention finds the MRPFs that use that PRT and tests whether any of its functions use the changed fields. In step 264, the method determines if the PRT is a lead PRT of the MRPF or used in a group by function. If so, the method continues in step 269 by reading the MRPI to which the PRI points. In each MRPI, the present invention stores the MRPI for each MRPF parent. Each parent MRPI that has group by functions using any of the changed fields has its group by value recalculated. Recalculation does not require reprocessing of all the records which are included in the group. The present invention stores enough information about each group by field to recalculate the correct balance for the before and after image of the changed field. For example, for the average field, present invention also stores the number of values used as well as the actual average. New averages are calculated by multiplying the number of values times the average then subtracting the old value and adding the new value and then dividing by the stored number of values. Then the function is executed in step 270. There functions are executed in a conventional manner. The process is similar to that used in spreadsheets and third generation languages. In step 271, the functions for any changed MRPI are executed, after which the method jumps to step 268. However, if the PRT is not a lead PRT of a MRPF or in a group by function, the method proceeds to step 265 where the MRPI is read. Next, in step 266, the method tests whether the MRPI points to a PRI. Next, the present invention checks to see it any of the calculated fields that the present invention just updated are used in other group by functions. If so, it recalculates the group by value in the appropriate parent MRPF's MRPI. The present invention continues this loop of cascading group by executions until the set of calculated fields that are recalculated have no impact on any other function because those group by fields are not used in any other function. If it does point to a PRI, the function is executed in step 272, and the functions for any changed MRPI are executed in step 273. The method then continues in step 267 or arrived at step 267 directly from step 266. In step 267, the method tests whether there are any other MRPI for the changed PRI. If there are additional MRPIs, the method returns to step 265 to read another MRPI and process it as has been described above. If there are no more MRPIs, the method moves to step 268 and tests whether this is the last function for the modified PRI. If not, the method returns to step 262 to retrieve and process the next function. Once all the functions have been processed the present method is complete.

Generally functions are executed whenever the user accepts some changes made to a pane row. The user has the option of deferring the execution of the affected functions until he/she wishes. Deferring changes can speed up entry of changes. The present invention knows which other functions to run because whenever a function is defined or maintained, the present invention adds a pointer to the Where Used Pointers of the PRT Fields Definition and the Where Used Pointers of the Function Definition.

Figure 13:
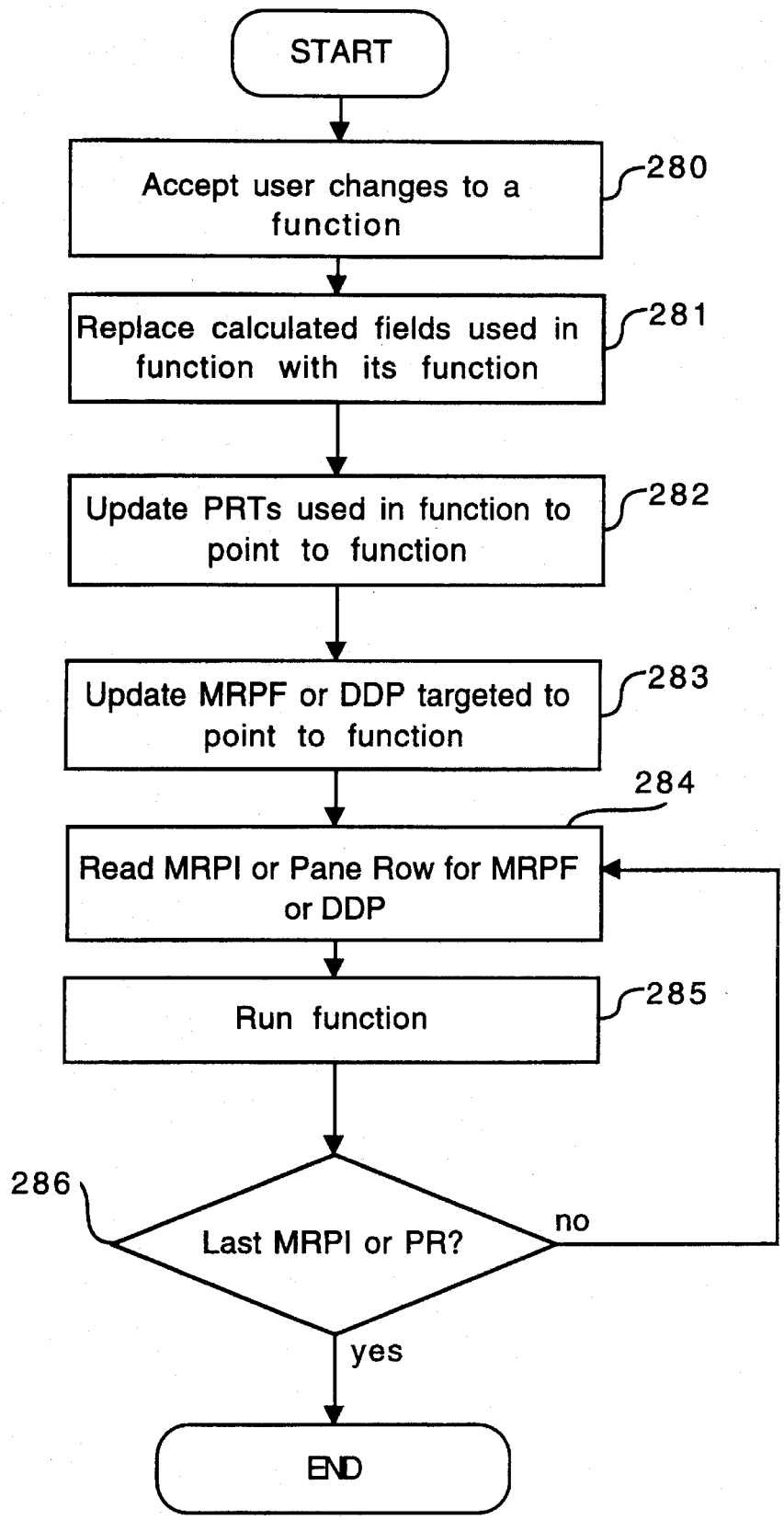
FIG. 13 is a flowchart of the preferred method for maintaining a function for a changed management record type or dynamic document.

FIG. 13 illustrates the preferred method for maintaining a function and its corresponding calculated fields in MRPIs and DDPs. The process begins by accepting user changes to the function in step 280. Then the method replaces the calculated fields used in the function with its function. Next, in step 282 the method updates the PRTs used in the function to point to the function. Then in step 283, the MRPF or the DDP targeted to point to the function are updated. In step 284 the MRPI, pane row for the MRPI, or the DDP is read. Finally, the function is run in step 285. Then the method tests for other MRPI or primary records affected by the function change and returns to step 284 to process them. Once all the MRPIs and PR have been processed, this method ends.

Figure 14:
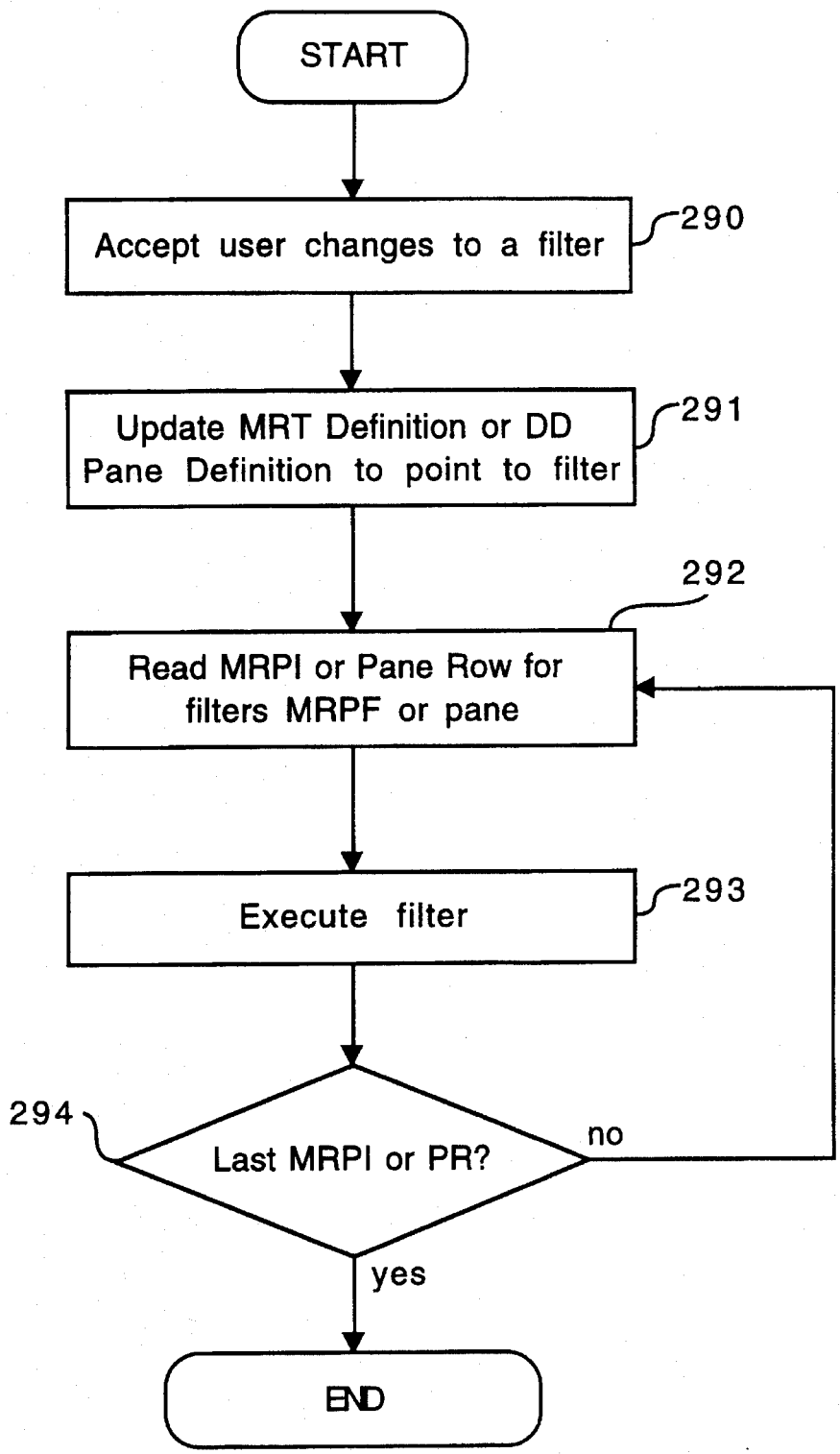
FIG. 14 is a flowchart of the preferred method for maintaining a filter definition for a changed management record type or dynamic document.

FIG. 14 illustrates the preferred method for executing a filter if the filter has been modified. The method starts by accepting the user's changes to the filter in step 290. Then in step 291, the method updates the MRT definition or dynamic document 20 pane definition to point to the filter. Next, the method reads a MRPF, a pane row, or a MRPI for filters pane in step 292. The filter is then executed with the changes in step 293. The method then test whether there are other MRPI or PR affected by the filter changes and then returns to step 292 to process them if they are present.

Figure 15A:
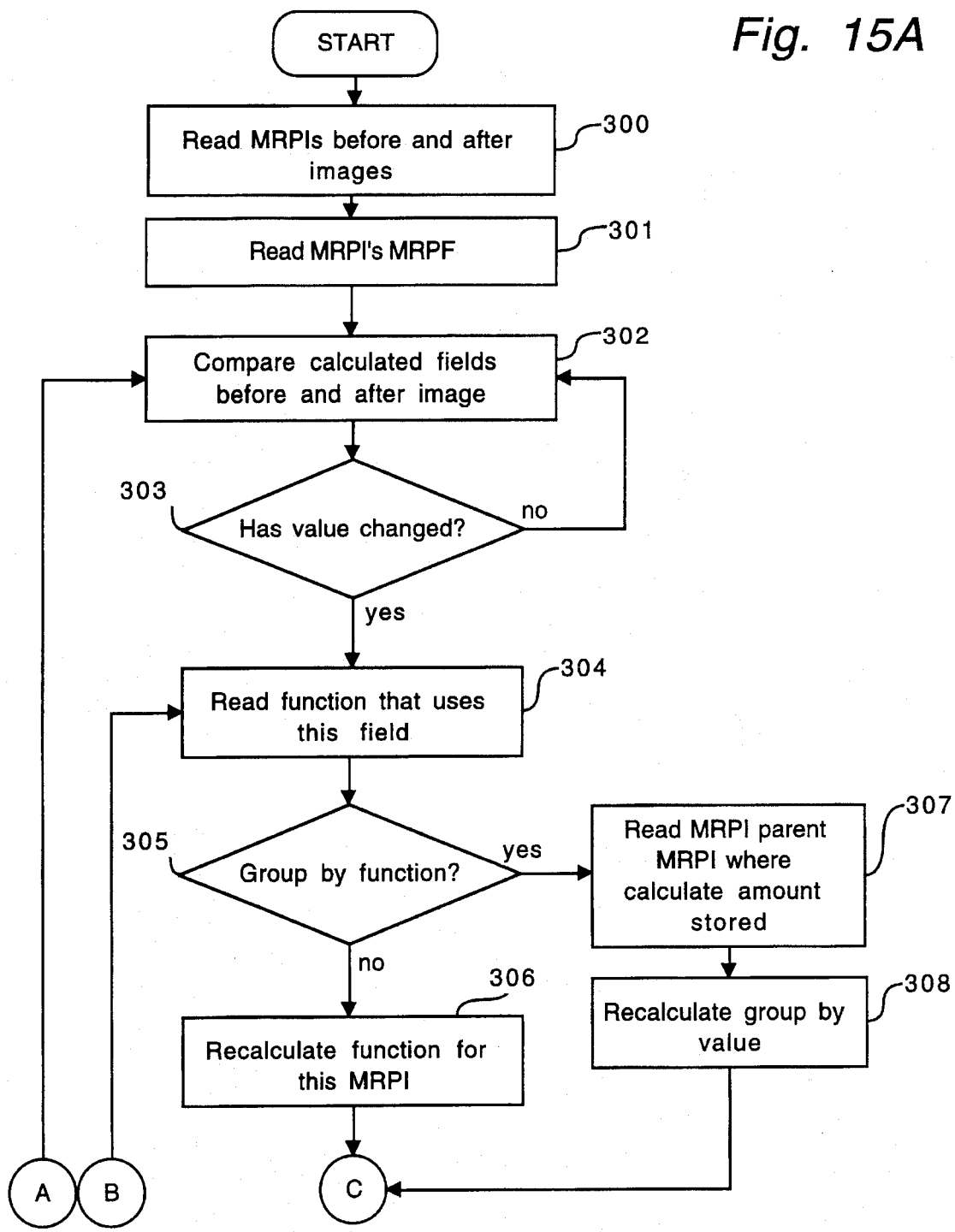
FIGS. 15A and 15B are a flowchart of the preferred method for executing a function for a changed management record pointer instance.
Figure 15B:
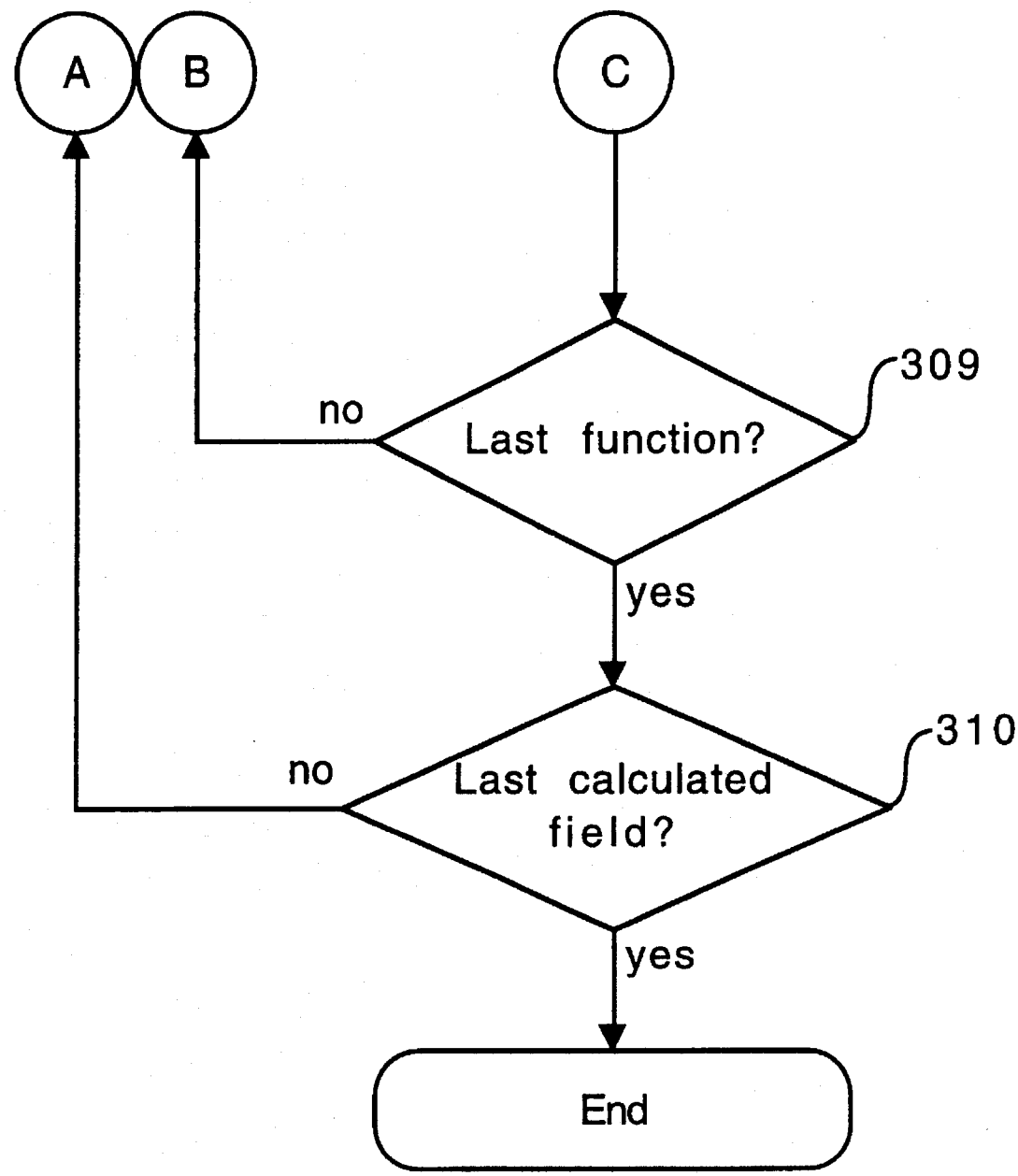

Referring now to FIGS. 15A and 15B, the preferred method for executing a function for a change to the MRPI, as used in FIG. 17 below, is described. In step 300, the images of the MRPIs before and after the changes to the MRPI are read. The present method preferably saves images of the MRPI whenever anything is changed. These images are saved until the changes have been processed. In step 301, the MRPF of the changed MRPI is read. Then in step 302, the calculated field of the before and after images are compared. In step 303, the method tests whether the value for each calculated image has changed. If there is no change, the method repeats step 302 to get the next calculated field. However, if there is a change, the method moves to step 304. In step 304, the function(s) that use this calculated field are retrieved. In step 305, the method tests whether any of the functions using this calculated field are group by functions. If a group by function is involved, the method first reads the MRPI's parent MRPI where the calculated amount is stored in step 307. Then in step 308, the group by value is recalculated. If a group by function is not involved, the method recalculates the function for this MRPI in step 306. Next in step 309, the method tests whether this is the last function affected by the change. If more functions are affected, the method returns to step 304 to process those other functions. Otherwise, the method continues to step 310 to determine if this is the last calculated field that has been modified. If there are more calculated fields to process the method returns to step 302. If not the process is complete and all the values are function value.

Figure 16A:
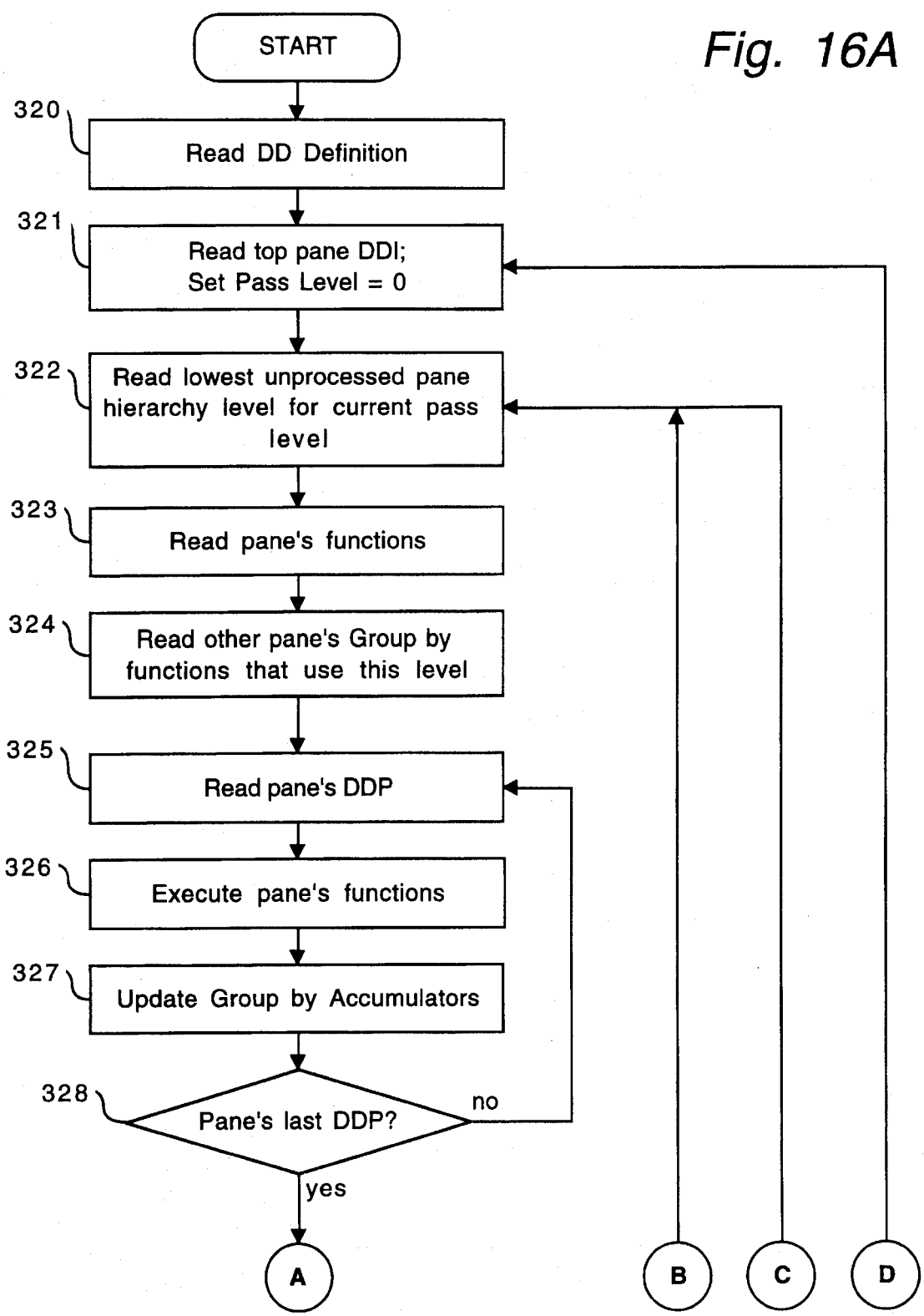
FIGS. 16A and 16B are a flowchart of the preferred method for executing a function for new dynamic document pointers.
Figure 16B:
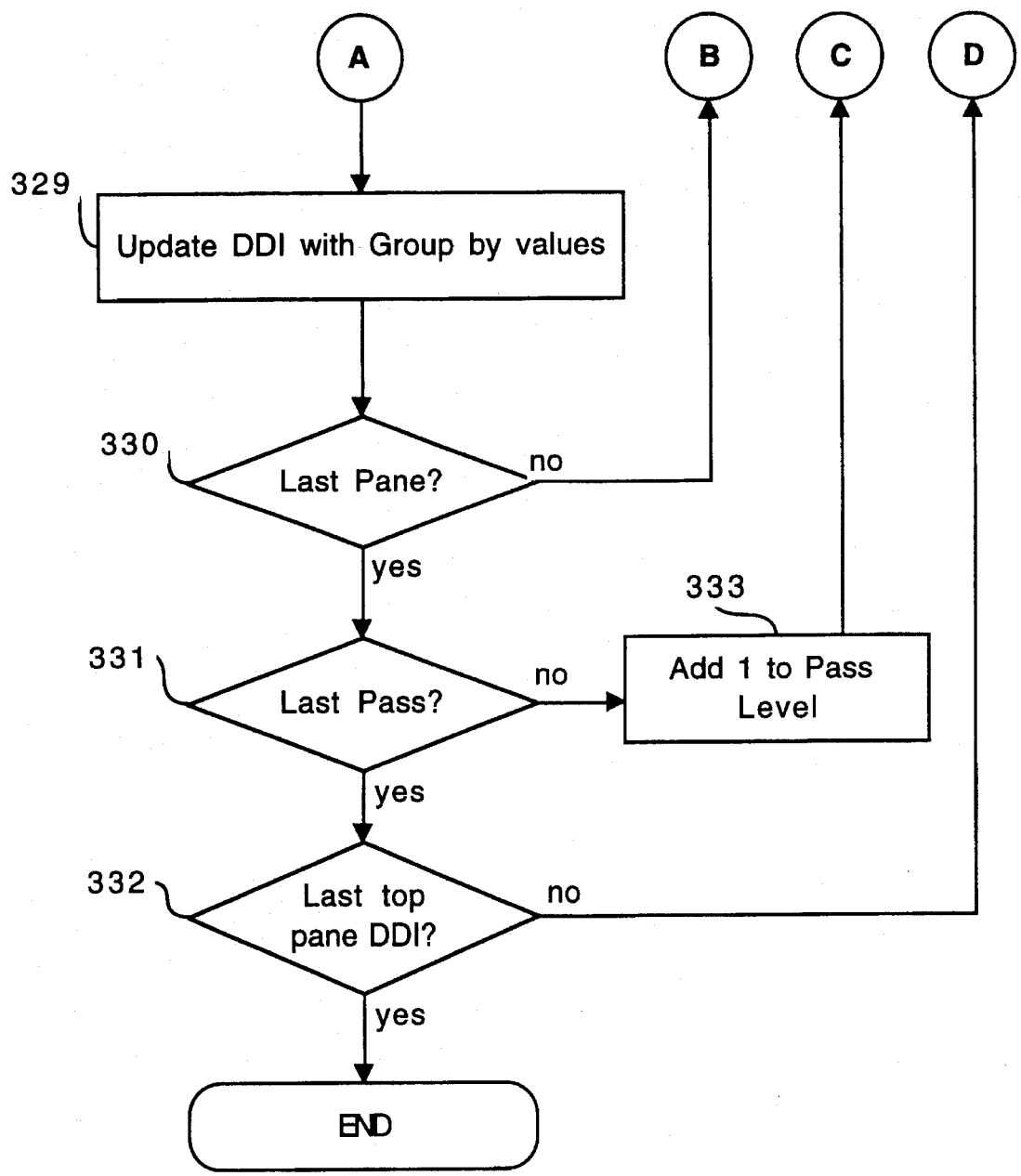

FIGS. 16A and 16B illustrate a preferred method for executing a filters for a new or changed set of DDPs. DD functions work almost identically to MR functions. The calculation logic is the same except DDPs correspond to MRPIs, Panes correspond to MRPFs, and top pane DDPs correspond to MRIs. MR functions are always executed prior to DD functions. Also, if a pane does not include in itself or its parents, the lead PRT for its own lowest level MRPFs, it must be summarized. Summarization is just the process of grouping then the pane and its parent panes. Calculated fields from the pane's MRPFs must be grouped by one of the standard group by operands (See Appendix A). The user specifies the group by operand when he/she defines the DD.

The method starts in step 320 with the dynamic document definition being read. The present invention processes each dynamic document instance (DDI) separately beginning with the lowest level panes in the pane hierarchy and working upward. In step 231, the top level pane DDI is read and the variable PASS LEVEL is set equal to zero. In step 322, the method reads the lowest unprocessed pane hierarchy level for this pass. In step 323, the method reads the pane's functions. Then in step 324, the method reads other pane's group by function(s) that use this level. Group by functions are executed with the pane they summarize not the pane where the result is stored. The DDPs for this pane are then read in step 325. Then in step 326, the function for this pane are executed. The group by accumulators are then updated in step 327. Next in step 328, the system determines whether the DDP being used to execute the functions is the last DDP for this pane. If not, the method returns to step 325, otherwise the process continues in step 329. In step 329, the group by accumulators values are added to the DDI. Then in step 330, the method test whether this is the last pane for this dynamic document 20. If not, the process loops to step 322 to process any unprocessed panes, otherwise the process continues in step 331. In step 331, the method determines if this is the last pass. If it is not the last pass, then 1 is added to the PASS LEVEL in step 332 and the method returns to step 322 for further processing. After each pass of all the DDI, the method executes the functions with the next highest pass sequence number until all functions are executed. However, if it is the last pass, the method continues in step 332 where the process tests whether this is the last top DDI to perform functions for. If not, the process returns to step 321, otherwise the execution of the functions for the dynamic document 20 are complete.

All changes to any data is entered by the user through DDs or fetches from a production database. All changes can affect multiple DDs and MRTs. For example, if the user changes a customer's discount percentage and multiple MRTs use that field in their calculations, the present invention must update many MRPIs and DDPs for that one change. Therefore, when the user enters a change, the present invention first updates the affected PRT and then the MRPIs and finally the DDPs that use that PRT. The updates to the MRPIs have been described above with reference to FIGS. 4 and 5. FIGS. 17A, 17B, 17C and 17D illustrate a preferred method for updating a dynamic document for a changed management record pointer instance and for updating target production databases. The first step in the method is to read all changed MRPIs and their changed PRIs, if any. In step 341, the before and after images are compared to determine which MRPI calculated fields, PRI fields, and MRPF PRI pointers have changed or if any MRPI calculated fields, PRI fields, and MRPF PRI pointers have been filtered in or out. Then in step 342, the method tests whether 1) there is a new or change pointer, or 2) there is a new or removed MRPI. If either a pointer or MRPI has been changed the method jumps to step 344, otherwise the method moves directly to step 345. In step 345, the method determines whether any changed fields are used in filters, group by functions, functions, sorts or database updates. If not, the method is finished processing, and ends. However, if the changed fields are used, they must be updated and the method proceeds to step 344. In step 344, a pending change flag is activated on all dynamic document pointer instances (DDPI) that are affected by the changed information. Next, in step 345, method runs all pre-function filters on the flagged DDPs as has been described above with reference to FIG. 15. Then in step 346, the functions are executed for all the flagged DDPs.

Figure 17A:
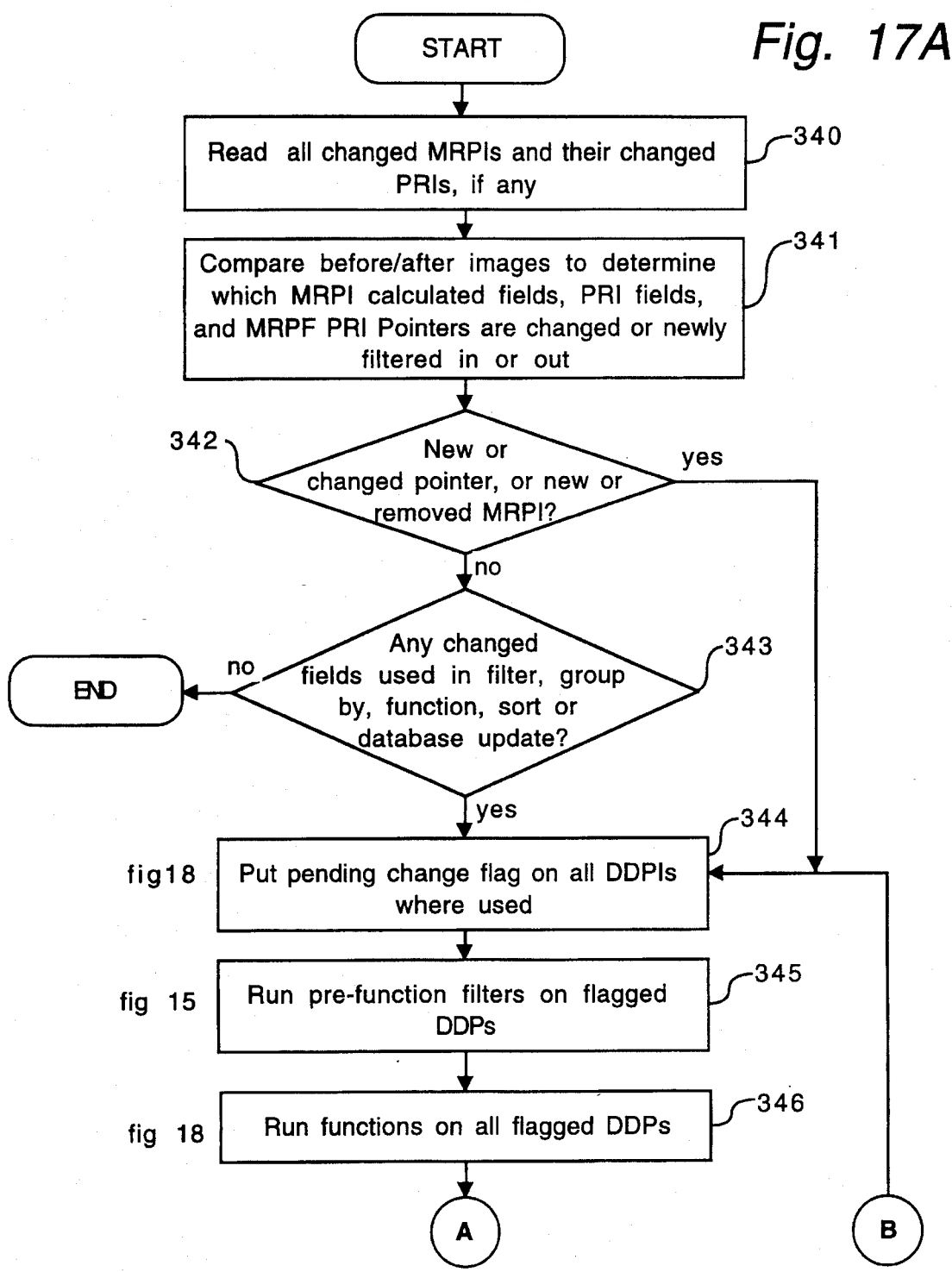
FIGS. 17A, 17B, 17C and 17D are a flowchart of the preferred method for executing a function for a new or changed set of dynamic document pointers.
Figure 17B:
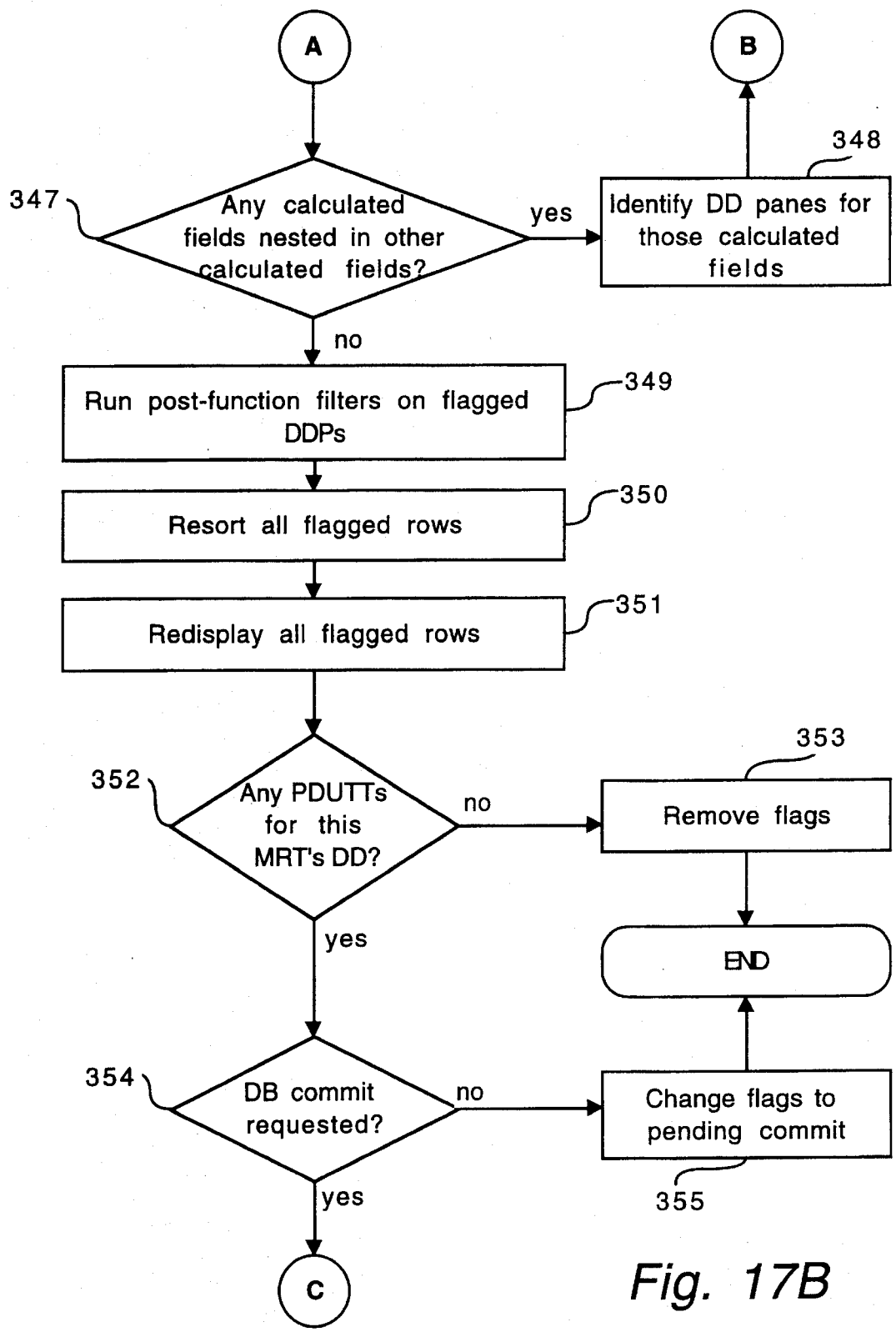
Figure 17C:
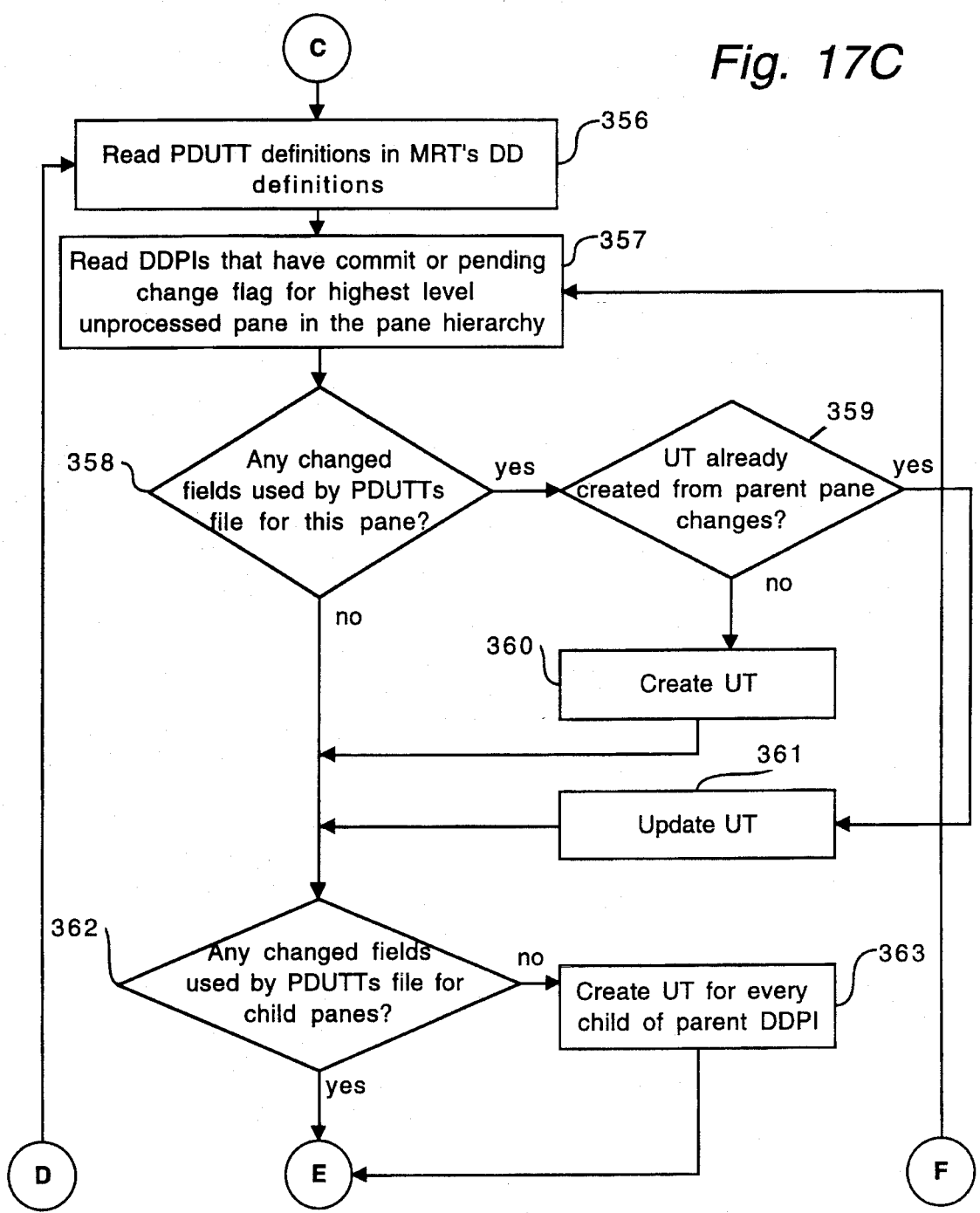
Figure 17D:
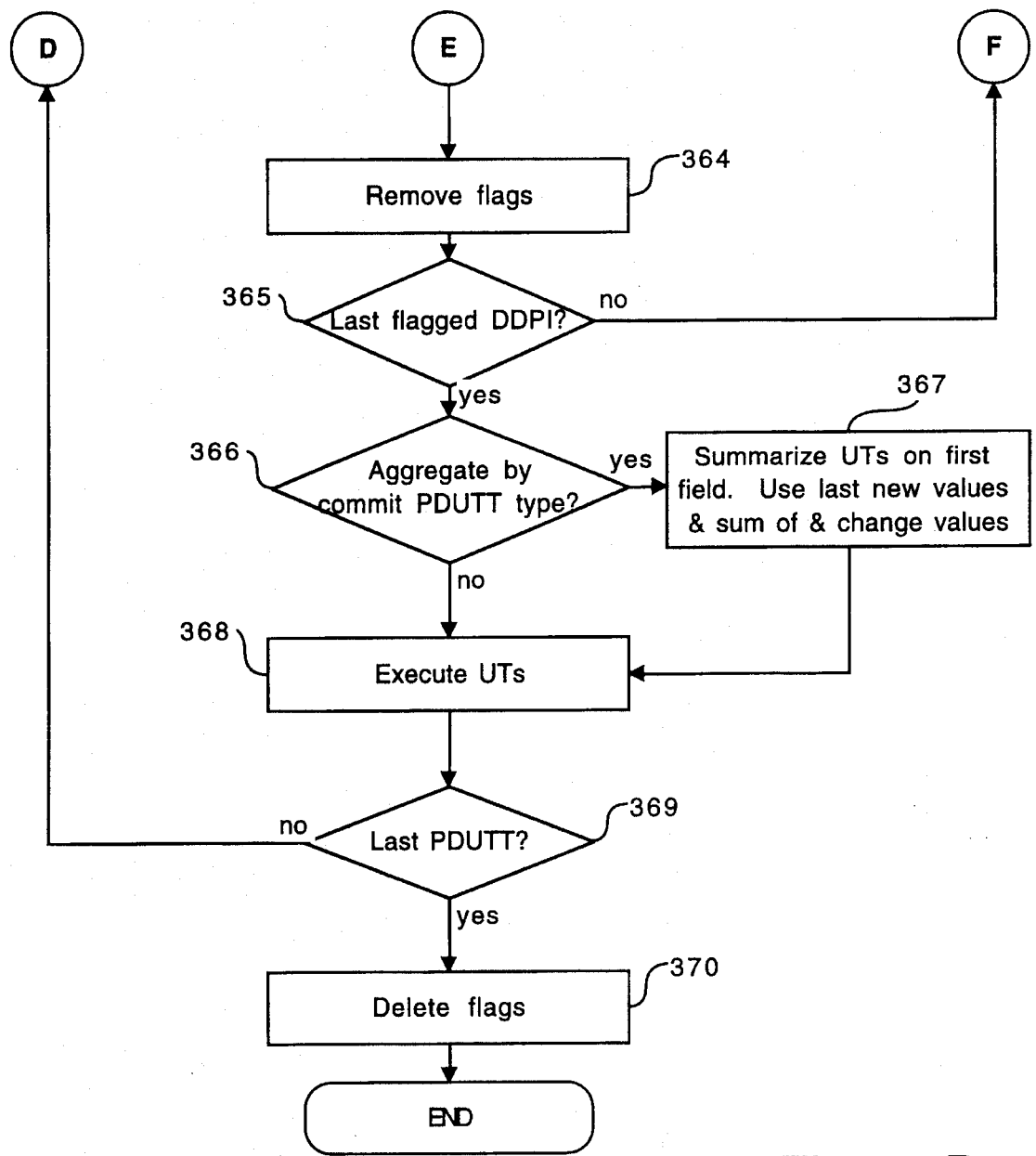

Referring now to FIG. 17B, the method determines, in step 347, whether any of the modified calculated fields are nested in other calculated fields. If the changes affect other calculated fields, the method identifies the dynamic document 20 panes for the affected calculated fields in step 348, and returns to step 344 for further processing. If no other calculated fields are affected, then post-function filters are run on the flagged DDPs in step 349. In step 350, all the flagged row are re-sorted. Then, the method re-displays all flagged rows in step 351.

Next, the method tests whether there are any production database update transaction types (PDUTT) for this MRT's dynamic document 20. For each DD that produces Production Database Update Transactions, the present invention creates UTs for the changed DDPIs. Since UTs are created when the user commits changes not when he/she accepts them (which generally happens more frequently), the present invention saves DDPI change flags for the next commit. If there are no updates, the flag(s) is removed in step 353 and the method ends. If there are updates to record to the database, the method moves to step 354 where the system tests for a database commit request. If there is no request to store the data, the flags are changed to pending commit in step 355, the method is finished. However, if the user has requested that the changes be committed to the underlying database, the method reads the PDUTT definitions from the MRT's dynamic document definition in step 356. When the user requests a commit, the present invention usually converts each flagged DDPI into one UT. A UT is not created whenever none of the changed fields are used in any of the PDUTTs. Multiple UTs are created when a changed DD pane field is used in a target database file/table/object associated with a lower level pane. For example, the invoice date field in the invoice header pane may be targeted to go into the targeted database table Invoice Lines which is assigned to the invoice lines pane—a child of the invoice header pane. In this example, the present invention will create a UT for every child DPI of the flagged DDPI. When the present invention copies PRI values to the UT fields it moves either the new value, the amount the value has changed because of the transaction (this option is only valid for number fields), or a literal stored in the PDUTT definition. Literals are usually used to identify the source of the transaction for the target database. Next, in step 357, the method reads the DDPIs that have commit or pending change flags activated for the highest level unprocessed pane in the pane hierarchy. Then in step 358, it is determined whether any changed fields are used by the PDUTTs file for this pane. If so, the method further determines if an update transaction (UT) has already been created for from the parent pane changes. If an UT has already been created, it is updated in step 361, before proceeding to step 362. If an UT has not been created, it is created in step 360, before proceeding to step 362. The method then moves to step 362 from either step 358, 360 or 361. In step 362, the method determines if any changed fields are used by the PDUTTs for child panes of this pane. If the changed fields are used by child panes, then an UT is created for every child pane of the DDPI in step 363 before moving to step 364. In step 364, all the commit and pending flags activated are removed. Then in step 365, the method tests whether this is the last flagged DDPI. If not, the method loops to step 357 for additional processing. Otherwise, step 366 is executed, and determines whether to aggregate by commit PDUTT type. The user defines whether the PDUTT is one that is aggregated by commits (as opposed to accepted transactions). Aggregation is a feature that minimizes the number of times a record/row/object in the underlying database is updated. If the user requests multiple changes to a database record, the changes are first grouped into a single transaction before updating the underlying database record. If the UTs are to be aggregated, the method summarizes UTs on the first field in step 367. The last new, sum of, and change values are used to summarize in step 367. Next, in step 368, the filters are executed on the UTs. The method then determines whether there are other PDUTTs to process. If there are, the method loops to step 356, otherwise the method finishes by deleting all the flags in step 370.

Figure 18A:
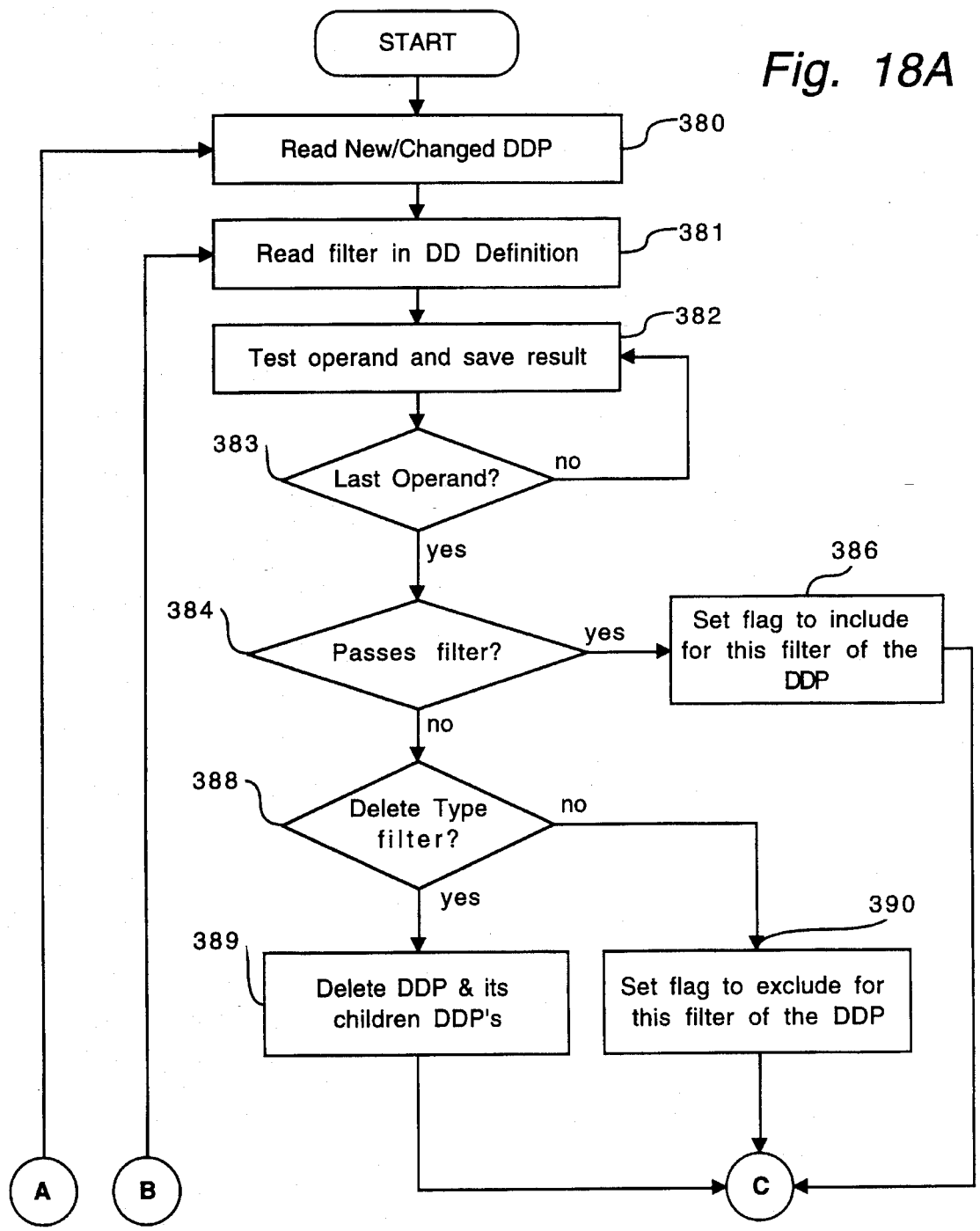
FIGS. 18A and 18B are a flowchart of the preferred method for executing a filter for a changed dynamic document pointer.
Figure 18B:
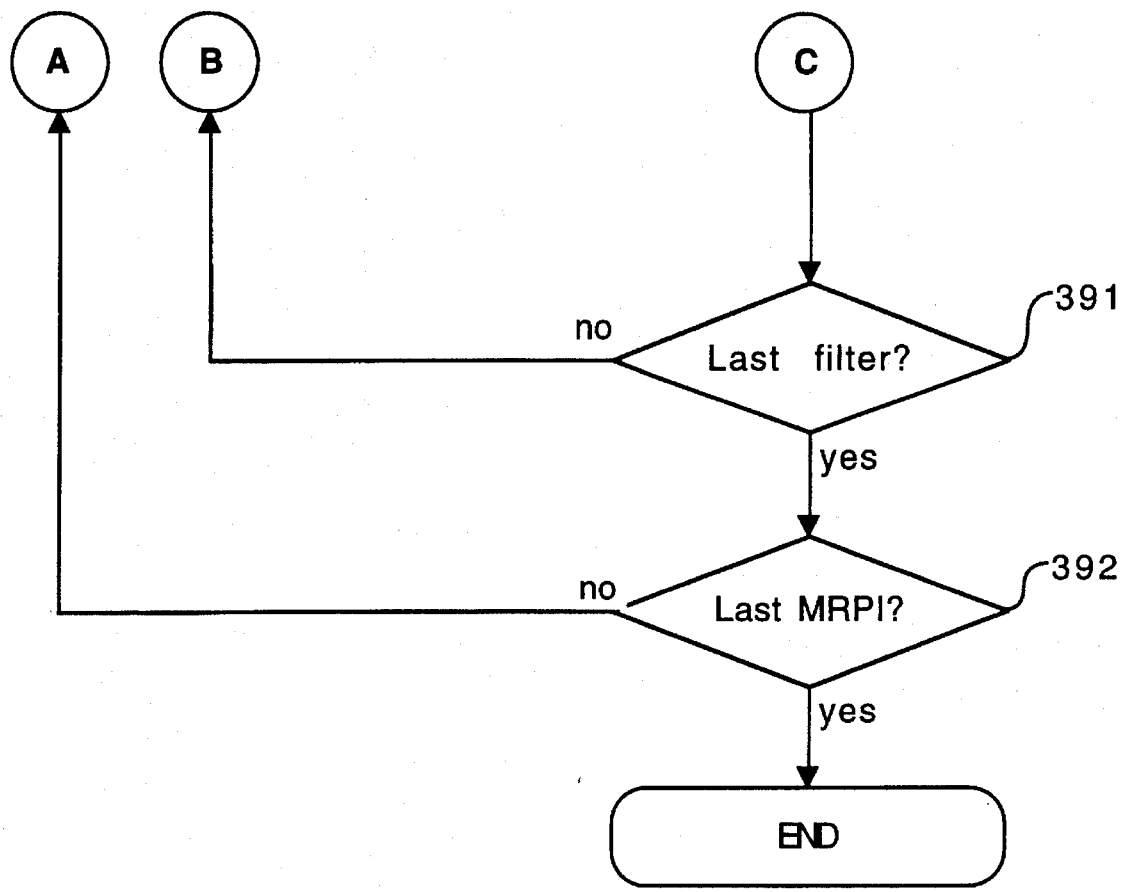
Figure 19D:
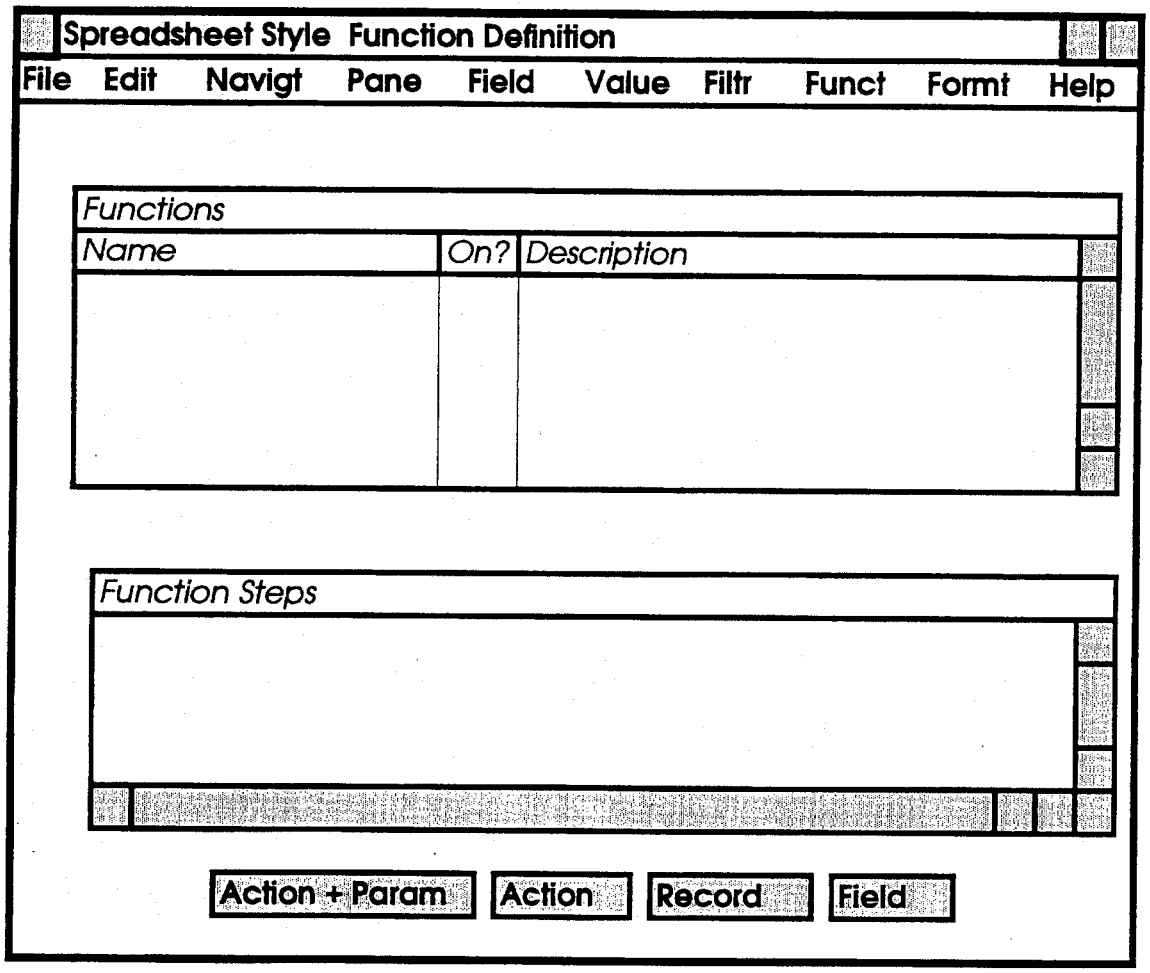
Figure 19F:
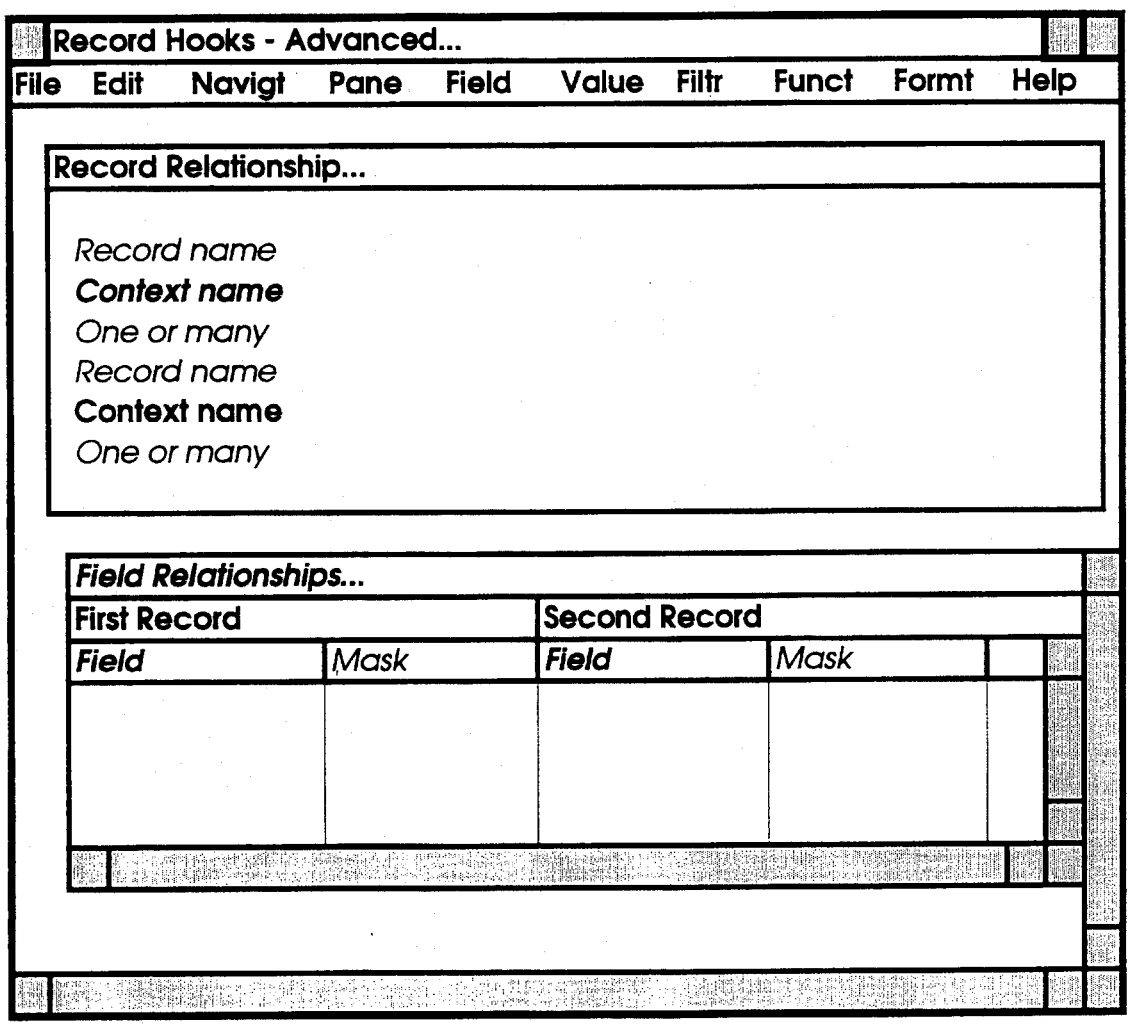
Figure 19G:
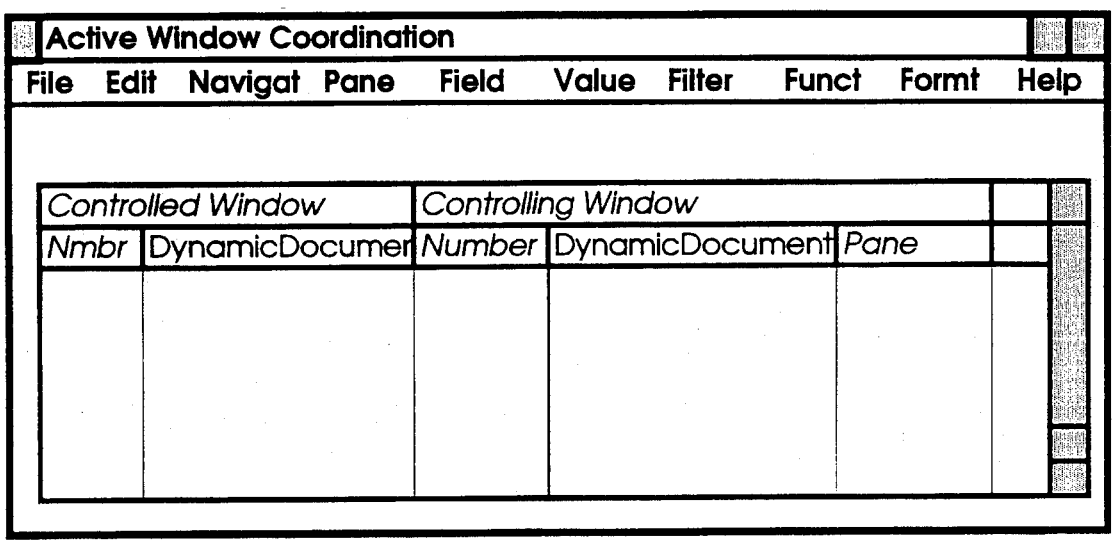

FIGS. 18A and 18B illustrate the preferred process for executing filters when a dynamic document pointer is created or revised. DDs have three sets of filters: filters for determining what data to display on the screen, filters for determining what data to print on a report, and filters to determine which changes to send to targeted production databases. All three types of DD filters work almost identically to MR filters. The calculation logic is the same except DDPs correspond to MRPIs, Panes correspond to MRPFs. MR filters are always executed prior to DD filters. Unlike MR filters, DD filters are not all executed at the same time for a single DDP. When first constructing a DD's DDPs to minimize the number of MRPFs processed in arriving at the pointers for a pane, the present invention categorizes filters into four categories and executes them at different times during the creation and updating of DDPs: 1) Prejoin filters are executed on a pane's MRPF's MRPIs prior to joining them with the other MRPIs for the pane. Filters that have operands on only the fields in the PRTs for the MRPF are in this category. Also filters which meet the first criteria and also use a calculated field from the MRPF and lead PRT for the MRPF is in the current pane or any parent pane are in this category; 2) Postjoin filters are executed after all of a pane's MRPIs are joined together with its parent pane's MRPIs. Filters that meet the above criteria but used fields from more than one MRPF are in this criteria; 3) Post summarize filters are executed after the joined MRPIs are summarized into Pane Pointers. Filters which do not use calculated fields from DD functions are not in either of the above two categories; and 4) Post function filters are executed after the select functions but prior to the display filters. All filters that use calculated fields that are the result of DD functions are in this category.

The process begins by reading any new or changed DDP in step 380. Then a filter from the dynamic document definition is read in step 381. Next, in step 382, an operand is tested, and the result is saved. Since all filter operations are on fields in the dynamic document, each dynamic document can be fully tested to see if it should be filtered out by reading only the DDP's calculated fields. For improved processing efficiency, the present invention executes all of a DDPIs filters one after the other. The operation tests are simple Boolean tests to see if the field's value equals the value stored in the list (Dynamic Document) specified. The present invention stores the result (true or false) of each operation. The method then determines if this operand is the last operand to test in step 383. If not, the process returns to step 382 to test the next operand. If all the operands have been tested, then the process continues to step 384. In the step 384, the method looks at the results of each operand to determine if the full filter results in a pass or fail. If the DDP passes the filter, the method proceeds to step 386 where the method appends to the DDP a flag for each filter indicating the filter includes that particular DDP. If the DDP fails the filter, the method jumps to step 388 to evaluate the filter type. In step 388, further tests are performed to determine if the filter is a delete type. If the filter is a delete type, the DDP and its children DDPs are deleted in step 389. Any DDP which has any parent DDP which are excluded is itself excluded. If the filter is not a delete type, then the flag is set to exclude for this filter in the current DDP's filter affects list in step 390. Any DDP that is excluded by any active filter is not displayed in the currently open DDs. Next, step 391 determines whether there are additional filters to be processed. If so the method loops to 381, otherwise the method tests whether this is the last MRPI to be processed in step 392. If there are more MRPIs to process, the method returns to step 380, otherwise, the process is complete.

Finally, it should be understood that the present invention also uses conventional sorting and display techniques. Sorting occurs dynamically when the DDPs are joined to the PRTs and displayed as pane rows. Sorting is done pane by pane in the same manner employed by conventional report write and query tools. The rows in a pane can be sorted by any of PRT and/or calculated fields in the pane. The user specifies the order in which each field sort is executed and whether to use an ascending or descending order. The user can also specify which, if any, sort levels should have total lines and what group by operand to use for each field for each level. The user can also have the present invention suppress displaying the row details and just display the totals. When the user selects (highlights) a total row in a pane, that pane's child panes display the rows for all the parent pane's detail rows that comprise the selected total row.

The display and reporting component of the present invention works similarly to many conventional query and reporting tools. By the time the present invention hands over the data to be displayed, it has already organized it, executed its calculations, filtered and sorted it. The present invention hands over one record (a DDP and its corresponding PRIs) to the screen forms display tool. All that remains is to place the record's values in the proper fields. Display rules entered by the user control the appearance of the panes, positioning the format of the PRT's fields, and what type of maintenance users can do to actual field values.

Users can open as many Dynamic Documents at once as their hardware supports. Each DD can be autonomous or any DD can be linked to another. To link DD all the user need do is specify which on primary record types within the two DDs the link occurs. The two primary record types must be hooked together, or the primary record type in both DD must be identical. At least one of the DDs must be linked at its top pane and a core linked DD must be designated as the controlled DD. Any DD can have only one controlling DD and circular controls are not permitted. When the user selects a new record instance in the controlling DD, the controlled DD is updated to display the record instance(s) that are hooked to the new controlling record instance. The present invention does this by executing the "find" function on the controlled DD; the find parameter is the foreign key or pointer of the controlling DD's current record type instance.

The present invention can save all the contents of memory it is currently using as a single file. If the user wishes to leave the terminal for a while, the user can save it and then recall it whenever required. This save is not shared with other users. Multiple copies of a session can be made and later modified just like as can be done with spreadsheets an word processors. In a multiple user environment, the changes to PRTs are stored in a relational database and multiple users can access those changes. The definitions of MRs, hooks, DDs, functions, filters, and sorts are also stored in the same database in special tables setup by the present invention. Optionally MRPIs and DDPs can also be stored and maintained by the present invention in the same relational database. It is useful to store these pointers in the repository because they do not need to then be regenerated for each user when he/she resumes working on the shared model.

While the present invention has been described with reference to certain preferred embodiments, those skilled in the art will recognize that various modifications may be provided. For example, there may be other embodiments for the method of executing the functions, filters and sorts used in FIG. 4 in addition to those described above. Similarly, there may be other embodiments for the particular structure used for the management records, the pointer families, and dynamic documents. These and other variations upon and modifications to the preferred embodiment are provided for by the present invention which is limited only by the following claims.

APPENDIX A

Record Layouts
    Hook
        Hook Id (System Assigned)
        Hook Name
        Links
            Primary Record Type #1
                Primary Record Type Id
                Fields
                    Name
                    From Record Position
                    To Record Position
                    One Or Many Occurences
            Primary Record Type #2
                Fields
                    Name
                    From Record Position
                    To Record Position
                    One Or Many Occurrences
    Primary Record Definition
        Primary Record Definition Id
        Primary Record Name
        Production Database Source File/Table/Object
        Management Records Where Used
            Management Record Id
            Management Record Pointer Family Id
        Dynamic Documents Where Used
            Dynamic Document Id
            Panes
                Pane Id
        Fields
            Functions Where Used
                Function Id
            Filters Where Used
                Filter Id
            Sort Id
            Db Update Transaction Types Where Used
                Db Update Transaction Type Id
            Hooks Used In
                Hood Id
                Where Hook Used
                    Management Record Type ID
                    Management Record Pointer Family Id
                Source Record Field Name
                Source Record Start Position
                Source Record End Position
    Update Production Database Transaction Type (UT)
        Update Production Database Transaction Type Id
        Update Production Database Transaction Name
        Database Connection Id
        Database File/Table/Object
        Fields
            Field Id
            Field Name
            Key?
            Database Field/Column/Object Name
            Start Position
            End Position
    Management Record Definition
        Management Record Definition Id
        Management Record Definition Name
        Unique Primary Record Type Id
        Primary Record Assignment
            Primary Record Assignment Id
            Primary Record Type Id
            Hook Id
            Record Usage Name
            Filters Used
                Filter Id
                On/Off

APPENDIX A-continued

Pointer Families
    Family Type Id
    Parent Family Types
        Parent Family Type Id
    Lead Primary Record Type Id
    Single Occurrence Primary Record Types
        Primary Record Type Id
    Dynamic Document Panes Where Used
        Dynamic Document Id
        Pane Id
    Prt Fields Used In Other Pointer Families
        Field Id
        Group Bys Where Used
            Target Management Record Pointer.Family Id
            Function Id
        Functions Where Used
            Function Id
    Calculated Fields
        Calculated Field Id
        Field Name
        Field Type
        Function Id
        From Select Or Display Function
        Group Bys Where Used
            Target Management Record Pointer Family Id
            Function Id
        Functions Where Used
            Function Id
    Filters Used
        Filter Id
        On/Off
    Sorts Used
        Sort Id
        On/Off
    Versions
        Management Record Version Id
        Management Record Version Name
        Record Types
            Record Type Id
            Record Version Id
Management Record Instance Id
    Management Record Level Filter Affects
        Filter Id
        Pass/Fail
Management Record Pointer Instances
    Management Record Definition Id
    Management Record Version Id
    Management Record Instance Id
    Pointer Family Type Id
    Pointer Family Instance Id
    Parent Family Pointer Instances
        Pointer Family Type Id
        Pointer Family Instance Id
        Pointer Family Instance Disk Pointer
        Pointer Family Instance Memory Pointer
    Lead Primary Record Instance Pointer
        Primary Record Type Id
        Primary Record Instance Id
        Primary Record Instance Disk Pointer
        Primary Record Instance Memory Pointer
    Single Occurrence Primary Record Instances Pointers
        Primary Record Type Id
        Hook Field Value
        Primary Record Instance Id
        Primary Record Instance Disk Pointer
        Primary Record Instance Memory Pointer
    Calculated Field Values
        Calculated Field Id
        Function Type
        Targeted By Function Id
        Field Value
        Group By Recalculation Support Fields
            Field Type
            Value
    Filter Affects
        Filter Id
        Include/Exclude

APPENDIX A-continued

Dynamic Document Definition
    Management Record Definition Id
    Dynamic Document Definition Id
    Dynamic Document Definition Name
    Production Database Update Transactions
        Db Update Transaction Type Id
        Database Connection Id
        Create When This DD Is The Source/Is Active/ Always
        Aggregate By Commits
    Panes
        Pane Id
        Name
        Description
        Parent Panes
        Hierarchy Level Number
        Display Attributes
            Title
            Type
            Button Set
            Number Of Rows
            Position
            Size
        Print Attributes
            Title
            Type
            Position
            Size
            Page Break
        Production Database Update Targets
            Db Update Transaction Type Id
            Production Database Target File/Table/Object
        Group By Required
        Primary Records
            Primary Record Assignment Id
            Subpane Type
            Expandable?
            List Of Values Dynamic Document
            Changes Allowed?
            Inserts Allowed?
            Maintenance Dynamic Document
            Reassignments Allowed
            Fields (Including Management Record Calculated)
                Field Id
                Display Attributes
                    Prompt
                    Size
                    Format
                    Maintainable
                    Pane Location
                    When Display
                Print Atributes
                    Prompt
                    Size
                    Format
                    Pane Location
                Production Database Update Targets
                    Production Db Update Transaction Type Id
                    Production Database Target File/Table/Object
                    Prodcution Database Field/Table/ Nested Object
                    New Value/Net Change Amount/ Literal Value
                    Aggregate Group By Operand
            Pane Fields Used In Other Panes
                Field Id
                Group Bys Where Used
                    Target Management Record Pointer Family Id
                    Function Id
                Functions Where Used
                    Function Id
                Production Database Target File/Table/Object Where Used
                    Production Database Target File/Table/ Object Id

APPENDIX A-continued

Calculated Fields
  Calculated Field Id
  Field Name
  Field Type
  Display Attributes
    Prompt
    Size
    Format
    Maintainable
    Pane Location
    When Display
  Print Attributes
    Prompt
    Size
    Format
    Pane Location
  Production Database Update Targets
    Production Db Update Transaction Type Id
    Production Database Target File/Table/
    Object
    Production Database Field/Table/Nested
    Object
    New Value/Net Change Amount
    Aggregate Group By Operand
  Function
    Function Id
    Select/Display Function
    When Executed
  Hroup Bys Where Used
    Target Management Record Pointer Family
    Id
    Function Id
  Functions Where Used
    Function Id
Filters
  Filter Id
  Display On/Off
  Print On/Off
  Production Db Update Transaction Type
    Id
    On/Off
Sorts
  Sort Id
  On/Off
Dynamic Document Pointer Instances
  Dynamic Document Pointer Instance Id
  Management Record Definition Id
  Management Record Version Id
  Dynamic Document Id
  Pane Id
  Primary Record Instance Pointers (This And Its Parent
  Panes)
    Primary Record Type Id
    Primary Record Pointer Instance Id (Foreign Key)
    Primary Record Pointer Instance Disk Pointer
    Primary Record Pointer Instance Memory Pointer
  Calculated Field Values
    Calculated Field Id
    Function Type
    Targeted By Function Id
    Display/Print/Production Db Update Transaction
    Type Id
      Field Value
      Group By Recalculation Support Fields
        Field Type
        Value
  Management Record Calculated Field Values
    note: actual values instead of pointer to the MRPI
    because in summarized pane these values have to be
    grouped by when created and whenever the MRPI
    changes. SQUIRE stores the group by amount and the
    values needed to recalculate it for a single change to
    improve performance.
    Calculated Field Id
    Field Value
    Group By Recalculation Support Fields
      Field Type
      Value
Sort Sequences
  Sort Id
  Sequence Number (Uses Decimals For Subsequent
  Insertions)
Filter Affects
  Filter Id
  Include/Exclude
Function Definition
  Function Id
  Name
  Management Record/Dynamic Document
  Target Management Record Type Id Or Dynamic
  Document Type Id
  Target Management Record Pointer Family Id Or Pane
  Id
  Target Field Name
  Description
  On/Off
  Select/Displayfunction Steps
    Sequence Number
    Open Parentheses Yes/No
    Action
    Close Parentheses Yes/No
    Parameters
      Parameter Type
      Parameter Value
  Limit To Filters
    Filter Id
Filter Definition
  Filter Id
  Name
  Management Record/Dynamic Document
  Target Management Record Type Id Or Dynamic
  Document Type Id
  Taget Management Record Pointer Family Id
  Pane Id
  Description
  Use For Fetching?
  Remove From Squire Or Hide
  When Execute (Prejoin/Post Join/Post Summarize/Post
  Function)
  On/Off
  Filter Rules
    And/Or
    Number Of Open Parentheses
    Field
    Field Group By Operand
    Operand
    Value
    Dynamic Document (For The In Operand)
    Dynamic Document Row Field (For Run Time
    Variables)
    Number Of Close Parentheses

I claim:

1. A computer implemented method for dynamically displaying and optionally entering and updating data from a database, the database storing the data as primary records, said method Comprising the steps of:

reading a plurality of primary record types for the database and a plurality of relationships between the primary record types;

defining a management record by selecting a plurality of primary record types for inclusion in the management record;

generating management record pointer families for each management record, each management record pointer family comprising a data structure defining a group of related primary record types within the management record, the management record pointer families generated by performing the substeps of:

1) retrieving a management record;

2) retrieving a unique primary record type of the management record;

3) using the unique primary record type as the current primary record type;

4) creating a family pointer type for the current primary record type;

5) retrieving a set of primary record definitions related to the current primary record type;

6) creating a child record type to the family pointer for each primary record type retrieved in substep 5) that has a one to many relationship with the current primary record type: and 7) for each primary record type retrieved in substep 5) that has a many to one relationship with the current primary record type, repeating substeps 4–7 with the primary record type retrieved as the current primary record type;

defining a dynamic document that specifies a display format for data from the database, the display format independent of the structure of the management record;

fetching data from the database and constructing a primary record instance and a management record pointer instance by performing the substeps of:

1) creating a database command to query the database by performing the additional substeps of:

a) reading a leaf level management record pointer family;

b) reading a parent management record pointer family for each leaf level management record pointer family;

c) creating a Data Manipulation Language (DML) query that selects the management record pointer family's primary record type;

d) reading any filters for the management record pointer family, each filter specifying a set of data selection criteria;

e) creating a WHERE clause for the DML query using the filters for the management record pointer family; and f) repeating substeps a–e for each leaf level management record, pointer family;

2) executing the database command; and 3) constructing the management record pointer instance;

creating a dynamic document instance for the management record pointer instance; and displaying data from the database using the dynamic document instance.

2. The method of claim 1, wherein the step of defining a management record further comprises the step of identifying one of the selected primary record types as the unique identifying primary record for the management record.

3. The method of claim 1, wherein the step of defining a dynamic document includes any of the steps of:

defining a function that uses the data of the database;

defining a filter that operates on the data of the database, the filter specifying a set of data selection criteria; and defining a sort that operates on the data of the database.

4. The method of claim 1, wherein the steps of executing and constructing, further comprise the steps of:

1) executing the query and fetching a resultant table 2) for each primary record type, grouping the resultant table by a key field of each primary record type into a temporary table;

3) inserting a primary record instance for each primary record type key field grouped by temporary table row;

4) for each management record pointer family, grouping each temporary table by the key field of a lead primary record type; and 5) reformatting the rows of each temporary table into a management record pointer instance.

5. The method of claim 1, further comprising the step of executing a function on the management records.

6. The method of claim 1, wherein the method execute user input sorts on the data in the dynamic documents before the step of displaying the data.

7. The method of claim 1, wherein the step of displaying data from the database the using the dynamic document instance comprises the steps of:

sending the data in an organized format to a screen forms display tool;

placing values into proper fields, and using display rules entered by the user to control the appearance of a set of display panes, positioning the format of fields within the primary record type, and the type of maintenance that can be performed.

8. The method of claim 1, further comprising the step of executing a filter on the dynamic document, the filter execution corresponding to a data selection, the filter specifying a set of data selection criteria.

9. The method of claim 8, wherein the step of executing a filter on the dynamic documents further comprises the steps of:

reading the dynamic document pointer;

reading the filter from a dynamic document definition;

comparing a filter value to an appropriate field of the dynamic document pointer;

displaying the dynamic document pointer if the filter value matches the appropriate field of the dynamic document pointer;

determining whether the filter is a delete type filter; and deleting any dynamic document pointer and its children if it is a delete type filter and the filter value matches the appropriate field of the dynamic document pointer.

10. The method of claim 1, further comprising the step of executing a function on the management records.

11. The method of claim 10, wherein the step of executing a function further comprises the steps of:

retrieving the dynamic document definition and a dynamic document instance;

retrieving a lowest level unprocessed display pane hierarchy level for the dynamic document definition;

retrieving a set of functions associated with the display pane;

executing each of the functions;

updating the dynamic document pointers corresponding to the display pane;

updating the parent dynamic document pointer of other display panes that use the function; and updating a group by accumulator, wherein the group by accumulator stores a result corresponding to a calculation performed upon a group of data fields.

12. The method of claim 1, further comprising the step of executing a filter on the management records, the filter execution corresponding to a data selection, the filter specifying a set of data selection criteria.

13. The method of claim 12, wherein the step of executing a filter further comprises the steps of:

reading the management record pointer instance;

reading the filter from a management record definition;

comparing a filter value to an appropriate field of the management record pointer instance;

displaying the management record pointer instance if the filter value matches the appropriate field of the management record pointer instance;

determining whether the filter is a delete type filter; and deleting any management record pointer instance and its children if it is a delete type filter and the filter value matches the appropriate field of the management record pointer instance.

14. The method of claim 12, wherein the step of executing a function further comprises the steps of:

retrieving a management record definition and a management record instance;

retrieving a lowest level unprocessed management record pointer family for the management record definition;

retrieving a set of functions associated with the management record pointer family;

executing each function retrieved;

updating the management record pointer instances corresponding to the management record pointer family;

updating the parent management record pointer instances of other management record pointer families that use the function; and updating a group by accumulator, wherein the group by accumulator Stores a result corresponding to a calculation performed upon a group of data fields.

15. The method of claim 14, wherein the method maintains a pass sequence number that is incremented for each level of function nesting in a management record, and the step of executing the function is performed a plurality of times equal in number to the pass sequence number.

16. The method of claim 14, wherein the method maintains a pass sequence number that is incremented for each level of function nesting in a dynamic document, and the step of executing the function is performed a plurality of times equal in number to the pass sequence number.

17. The method of claim 1, wherein the step of defining a dynamic document comprises the step of defining dynamic document pointers, said dynamic document pointers indicating the primary record types to be displayed.

18. The method of claim 17, the step of defining dynamic document pointers further comprises the steps of:

1) retrieving a dynamic document definition;

2) determining a highest hierarchy level display pane definition not yet processed, the display pane definition defining a display window;

3) reading the primary record type and a corresponding management record pointer family for the pane definition of step 2;

4) determining whether a display pane exists for the primary record type and the corresponding management record pointer family, the display pane corresponding to a display window;

5) if the display pane does not exist, creating a display pane for the primary record type and the corresponding management record pointer family by joining management record pointer instances for this display pane and its parent display pane.

19. The method of claim 18, further comprising the step of executing filters before and after the step of creating a display pane.

20. The method of claim 18, further comprising the steps of:

determining whether any child display panes exist; and storing a copy of the joining management record pointer instances for each child display pane.

21. The method of claim 1, further comprising the steps of:

accepting user revisions to the data displayed;

determining whether the revision is a data revision;

updating the management record pointer instances if the revision is a data revision;

determining whether the revision affects a function;

maintaining and executing the affected functions if the revision affects a function;

determining whether the revision affects a filter;

maintaining and executing the affected filters if the revision affects a filter, each filter execution corresponding to a data selection according to a set of data selection criteria;

determining whether the revision is a sort revision; and maintaining and executing the affected sort if the revision is a sort revision, 22. The method of claim 21, wherein the step of maintaining and executing the affected functions if the revision affects a function comprises the steps of:

retrieving user changes to the function;

replacing calculated fields used in the function with their function;

updating primary record types used to point to the changed function;

updating the management record pointer family to point to the changed function;

reading the management record pointer instance executing the changed function.

23. The method of claim 21, wherein the step of maintaining and executing the affected functions if the revision affects a function comprises the steps of:

retrieving user changes to the function;

replacing calculated fields used in the function with their function;

updating primary record types used to point to the changed function;

updating the dynamic document pointer to point to the changed function;

reading the dynamic document pointer;

executing the changed function.

24. The method of claim 21, wherein the step of maintaining and executing the affected filters if the revision affects a filter comprises the steps of:

retrieving user changes to the filter;

updating the management record type definition to point to the changed filter;

reading the management record pointer instance for the filter's management record pointer family;

executing the filter.

25. The method of claim 21, wherein the step of maintaining and executing the affected filters if the revision affects a filter comprises the steps of:

retrieving user changes to the filter;

updating the dynamic document display pane definition to point to the changed filter, the display pane definition defining a display window;

reading a display pane row for a display pane associated with the filter;

executing the filter.

26. The method of claim 21, wherein the display is updated after the step of maintaining and executing the affected sort if the revision is a sort revision.

27. The method of claim 21 wherein the step of updating the management record pointer instances if the revision is a data revision, comprises the substeps of:

determining whether a record has been changed;

updating the management record pointer instances for a changed primary record instance if a record has been changed;

determining whether an record has been added;

updating the management record pointer instances for a new primary record instance if a record has been added;

executing the management record filters;

executing the management record functions;

updating the dynamic documents;

creating transactions to update the database; and re-displaying the dynamic documents to show the data revision.

28. The method of claim 27, wherein the substep of updating the management record pointer instances for a changed primary record instance comprises the steps of:

determining whether field values for a set of related fields are equal; and removing a pointer within the management record pointer instance.

29. The method of claim 27, wherein the substep of updating the management record pointer instances for a new primary record instance comprises the steps of:

retrieving the new primary record instance;

determining where the new primary record instance is used by reading the primary record type definition and the management record type definition corresponding to the primary record instance;

determining whether the primary record type is a lead primary record of a management record pointer family;

creating a management record pointer instance and executing functions and filter associated with the management record pointer instance, if the primary record type is a lead primary record;

if the primary record type is not a lead primary record, reading the management record pointer instance for the management record pointer family determining whether a field related to the primary record instance is a management record pointer instance; and adding a primary record instance pointer the management record pointer instance.

30. The method of claim 27, wherein the substep of executing the management record functions comprises the steps of:

retrieving the changed primary record instance and its corresponding primary record type;

retrieving the function that uses the changed primary record instance;

retrieving the management record pointer family of the function that uses the changed primary record instance;

retrieving the management record pointer instance for the changed primary record instance;

executing the function; and executing functions using the management record pointer instance.

31. The method of claim 27, wherein the substep of updating the dynamic documents comprises the steps of:

retrieving changed management record pointer instances and their changed primary record instances;

comparing the changed management record pointer instances and their changed primary record instances to the unchanged management record pointer instances and their changed primary record instances to determine the changed fields, pointers and filters;

identifying the dynamic document pointer instances that use the changed fields, pointers and filters;

determining whether any of the changed fields, pointers and filters are used in other nested calculations, and identifying the dynamic document pointer instances that use the other nested calculations;

executing the filters for the identified dynamic document pointers, each filter execution corresponding to a data selection according to a set of data selection criteria;

executing the functions for the identified dynamic document pointers;

re-sorting the rows of dynamic document pointers; and re-displaying the rows of dynamic document pointers.

32. The method of claim 27, wherein the substep of creating transactions to update the database comprises the steps of:

retrieving update transaction definitions in the management records definition;

retrieving the dynamic document pointer instances for the highest level unprocessed display pane in a display pane hierarchy;

creating an update transaction if the update transaction has not been created and the display pane has changed field to updated to the data base;

updating an update transaction if the update transaction has been created and the display pane has a changed field to be updated to the data base;

creating an update transaction for each child display pane if an update transaction has not been created for the child display pane and the child display pane has a changed field to updated to the data base; and executing the update transactions.

33. The method of claim 32, wherein the substep of creating transactions to update the database further comprises the following steps before the step of executing the update transactions: determining whether the update transaction are to be aggregated; and summarizing the update transactions on the first field.

* * * * *